US006477589B1

(12) United States Patent
Suzuki et al.

(10) Patent No.: US 6,477,589 B1
(45) Date of Patent: Nov. 5, 2002

(54) INFORMATION PROCESSING APPARATUS AND METHOD

(75) Inventors: Naohisa Suzuki, Yokohama (JP);
Atsushi Nakamura, Kawasaki (JP);
Makoto Kobayashi, Yokohama (JP);
Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/270,210

(22) Filed: Mar. 15, 1999

(30) Foreign Application Priority Data

Mar. 13, 1998 (JP) .......................... 10-063665
Mar. 12, 1999 (JP) .......................... 11-066329

(51) Int. Cl.[7] ............................................. G06F 3/00
(52) U.S. Cl. ............................. 710/18; 710/9; 710/10; 710/19
(58) Field of Search ............................. 710/18, 9, 10, 710/19, 8

(56) References Cited

U.S. PATENT DOCUMENTS 5,353,399 A   10/1994   Kuwamoto et al. ......... 395/159
5,832,298 A * 11/1998   Sanchez et al. ................ 710/8
6,044,411 A *  3/2000   Berglund et al. .............. 710/9

FOREIGN PATENT DOCUMENTS

EP        0 745 929 A1    12/1996

OTHER PUBLICATIONS

Wiener, P., et al. "Meeting USB and IEEE 1394 Overcurrent Protection Requirements Using PolySwitch Devices", Wescon/97. Conference Proceedings (Cat. No. 97CH36149), Nov. 4–6, 1997, pp. 442–475.

* cited by examiner

*Primary Examiner*—Peter Wong
*Assistant Examiner*—Tim Vo
(74) *Attorney, Agent, or Firm*—Fitzpatrick, Cella, Harper & Scinto

(57) ABSTRACT

In a 1394 network where a number of devices are connected, it is not easy to specify corresponding between a displayed device and a real device. Accordingly, "selection-candidate update processing, to find a new device and "processing for displaying candidates meeting set conditions" to display candidates which meet set conditions are provided, so as to display a device list window displaying selection candidates in a case where a set condition is, e.g., "printer".

26 Claims, 61 Drawing Sheets

FIG. 6
CSR CORE REGISTER

| OFFSET (hexadecimal) | REGISTER NAME | FUNCTION |
|---|---|---|
| 000 | STATE_CLEAR | INFORMATION ON STATUS AND CONTROL |
| 004 | STATE_SET | INFORMATION ON WRITE ENABLE/DISABLE STATUS OF STATE_CLEAR |
| 008 | NODE_IDS | BUS ID + NODE ID |
| 00C | RESET_START | TO RESET BUS BY WRITING INTO THIS AREA |
| 010~014 | INDIRECT_ADDRESS, INDIRECT_DATA | REGISTER TO ACCESS ROM AREA GREATER THAN 1KB |
| 018~01C | SPLIT_TIMEOUT | TIMER VALUE TO DETECT TIME-OUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE 1394 |
| 050~054 | INTERRUPT_TARGET, INTERRUPT_MASK | REGISTER OF INTERRUPTION NOTIFICATION |
| 058~07C | CLOCK_VALUE, CLOCK_TICK_PERIOD, CLOCK_STROBE_ARRIVED, CLOCK_INFO | NOT INSTALLED IN IEEE 1394 |
| 080~0FC | MESSAGE_REQUEST, MESSAGE_RESPONSE | REGISTER FOR MESSAGE NOTIFICATION |
| 100~17C | | RESERVATION |
| 180~1FC | ERROR_LOG_BUFFER | TO RESERVE FOR IEEE 1394 |

FIG. 7
SERIAL BUS REGISTER

| OFFSET (hexadecimal) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER RELATING TO POWER SUPPLY |
| 20C | POWER_SOURCE | |
| 210 | BUSY_TIMEOUT | TO CONTROL RETRY IN TRANSACTION LAYER |
| 214~218 | | RESERVATION |
| 21C | BUS_MANAGER_ID | NODE ID OF BUS MANAGER |
| 220 | BANDWIDTH_AVAILABLE | TO MANAGE ISOCHRONOUS TRANSFER BAND |
| 224~228 | CHANNELS_AVAILABLE | TO MANAGE CHANNEL NUMBER FOR ISOCHRONOUS TRANSFER |
| 22C | MAIN_CONTROL | REGISTER FOR DIAGNOSIS |
| 230 | MAIN_UTILITY | |
| 234~3FC | | RESERVATION |

FIG. 10

SERIAL-BUS NODE RESOURCE REGISTER

| OFFSET (hexadecimal) | REGISTER NAME | FUNCTION |
|---|---|---|
| 800~FFC | | RESERVATION |
| 1000~13FC | TOPOLOGY_MAP | INFORMATION ON SERIAL BUS STRUCTURE |
| 1400~1FFC | | RESERVATION |
| 2000~2FFC | SPEED_MAP | INFORMATION ON TRANSFER SPEED OF SERIAL BUS |
| 3000~FFFC | | RESERVATION |

EXCLUSIVE-OR SIGNAL BETWEEN Data AND Strobe p : PORT CORRESPONDING TO PARENT NODE
c : PORT CORRESPONDING TO CHILD NODE F I G. 18A REQUEST FOR BUS USE RIGHT
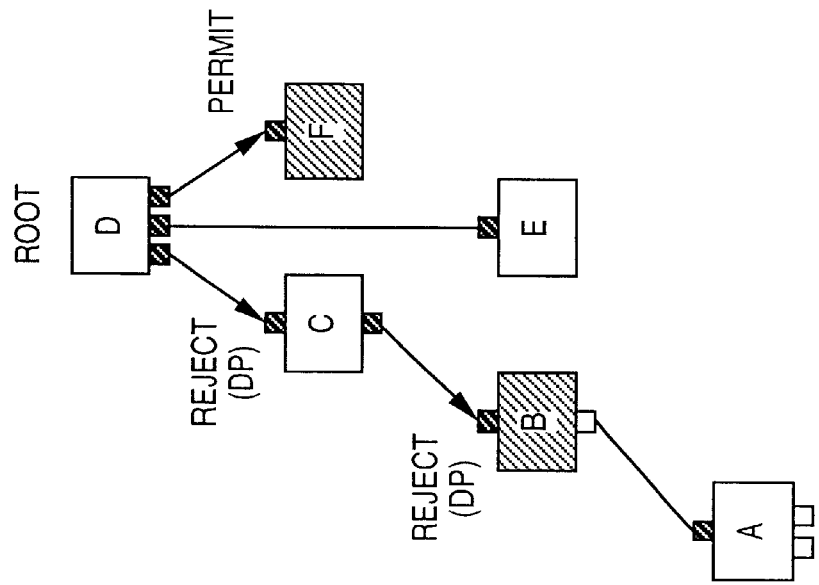
F I G. 18B PERMISSION OF BUS USE
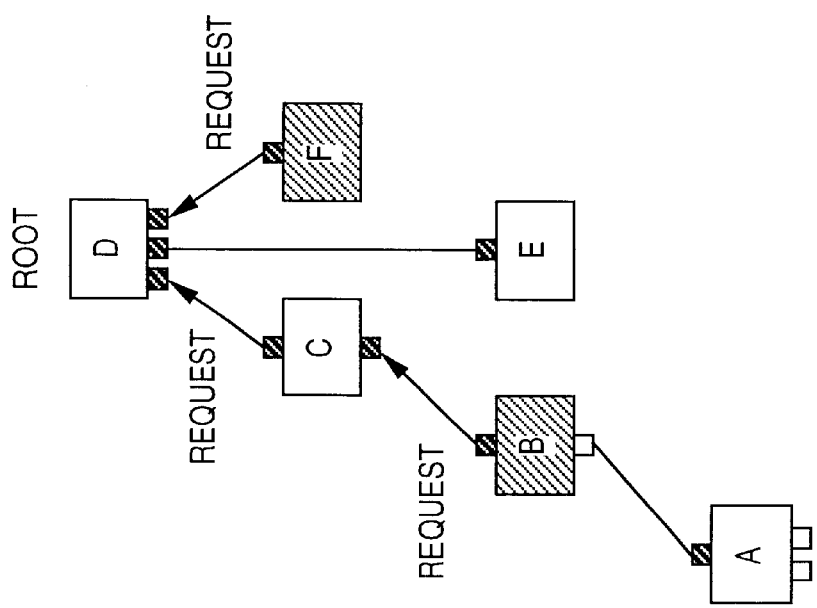

ISOCHRONOUS DATA PACKET

FIG. 44

| function-ID | func.info. | OUI-64 | company/model |
|---|---|---|---|
| Printer-1 | 0 | xxxxxxxxx | Canon BJC400 |

| protocol/appli. | | layer type |
|---|---|---|
| SBP-2 | SAM2 | LIPS3 | L1 |
| THIN | DPP | | L2 |

| func.info1 |
|---|
| Color LBP |

| CASSETTE 3+MANUAL FEED | | PAPER QUALITY | NUMBER OF SHEETS | DIRECTION |
|---|---|---|---|---|
| TOP | A4 | NORMAL PAPER | 200/300 | LATERAL |
| MIDDLE | A5 | OHP | 50/300 | VERTICAL |
| BOTTOM | A6 | COATED PAPER | 10/100 | LATERAL |
| MANUAL FEED | A3 | NORMAL PAPER | --/-- | LATERAL |

| PRINTING GRADE 2 grade | dpi | GRADE |
|---|---|---|
| | 1200 | PICTORIAL |
| | 600 | TEXT |

| TONER | 60% |
|---|---|

| ADDITIONAL FUNCTION PROVIDED | LANGUAGE | PS |
|---|---|---|
| | FINISHER | option |

| STATUS OF USE | protocol | DATE OF LATEST CONNECTION |
|---|---|---|
| CONNECTED | SBP-2 | |

| RECORD OF USE | NUMBER OF CONNECTION | |
|---|---|---|
| L1 | NO | --/-- |
| L2 | 97 | 1998/4/30 |

| LOCATION INFORMATION | | | ADDRESS SPECIFIED |
|---|---|---|---|
| LIVING ROOM | 1F | OGAWA | |

PRINTING SPEED
1ppm
8pm

FIG. 45

| function-ID | func info. | available | OUI-64 | campany / model |
|---|---|---|---|---|
| Printer-1 | 000 | yes | xxxxxxxxxx | Ganon BJxxxa |
| Printer-2 | 000 | no | xxxxxxxxxx | Bxxx Hoxxxy |
| Printer-3 | 000 | yes | xxxxxxxxxq | Ganon BJxxxa |
| Printer-5 | 000 | yes | xxxxxxxxye | Ganon BJxxxa |
| VTR-1 | 000 | yes | yyyyyxxxxy | Sxxxxx VTR-xx |
| Scanner-3 | 000 | yes | uuuuxxxxx | Mvvvv SCvvvv |
| Scanner-4 | 000 | no | xxxxxxxxxq | Ganon BJxxxa-SC |
| Fax-2 | 000 | yes | aaaannnnn | Axxxxx faxyyyy |
| PC-1 | 000 | yes | Ddddxxxxe | Dxxxxx PCVnmn |
| PC-2 | 000 | no | Hhhhxxxxo | Hxxxxx Fvoooo |

FIG. 46

| function-ID | func info. | available | OUI-64 | campany / model |
|---|---|---|---|---|
| Printer-1 | 000 | yes | xxxxxxxxxx | Ganon BJxxxa |
| Printer-2 | 000 | no | xxxxxxxxxx | Bxxx Hoxxxy |
| Printer-3 | 001 | no | xxxxxxxxxq | Ganon BJxxxa |
| Printer-5 | 000 | yes | xxxxxxxxye | Ganon BJxxxa |
| VTR-1 | 000 | yes | yyyyyxxxxy | Sxxxxx VTR-xx |
| Scanner-3 | 000 | yes | uuuuxxxxx | Mvvvvv SCvvvv |
| Scanner-4 | 001 | yes | xxxxxxxxxq | Ganon BJxxxa-SC |
| Fax-2 | 000 | yes | aaaannnnn | Axxxxx faxyyyy |
| PC-1 | 000 | yes | Ddddxxxxe | Dxxxxx PCVnnn |
| PC-2 | 000 | no | Hhhhxxxxo | Hxxxxx Fvooo |

FIG. 52
| UNIQUE ID | NODE ID | STATUS | CAPABILITY |
|---|---|---|---|
|  |  |  |  |
|  |  |  |  |
| ≈ | ≈ | ≈ | ≈ |
|  |  |  |  |
FIG. 53
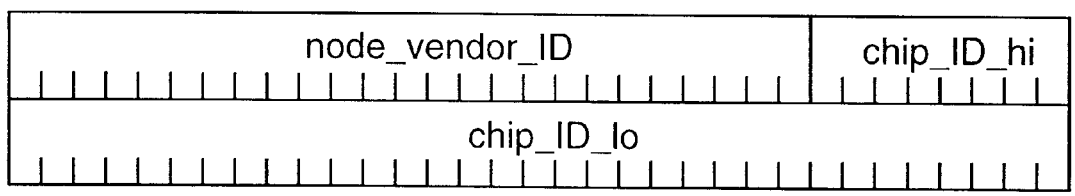
FIG. 54

INFORMATION PROCESSING APPARATUS AND METHOD

BACKGROUND OF THE INVENTION

1. Field of the Invention

The present invention relates to information processing apparatus and method and storage medium, and more particularly, to a plurality of information processing apparatuses connected via a serial bus such as an IEEE 1394 serial bus, an information processing method and a storage medium containing program code for executing the information processing.

2. Description of Related Art

Various types, of systems which transfer data to a printer via a bus are known. For example, a known technique is to output data from a computer to the printer by using a defacto standard interface such as a SCSI (Small Computer System Interface) or Centronics interface.

However, printer manufacturers respectively provide a printer protocol unique to their printer for transferring data to the printer via these interfaces. That is, a communication protocol upon execution of data communication between a host device and a target device is limited by the target device, which lacks versatility.

Particularly, upon data transfer via an interface capable of connecting various types of devices, e.g., a serial bus interface such as an IEEE 1394, it is significant to solve the above problem of lack of versatility.

In a serial bus interface such as an IEEE 1394 interface, a plurality of devices, such as a digital video camera (DV), a digital still camera (DC), a host computer, a scanner, a printer and a digital video tape recorder are collectively connected, different from one-to-one connection as that between host and device in RS 232C interface or the like. Accordingly, the serial bus interface may be applied to a data communication network system where these plural devices are connected.

In case of serial bus interface adapted to or based on the IEEE1394 standard (hereinbelow, simply referred to as a "1394 interface"), each device holds a node-unique ID as device identification means. The ID is 64-bit data where higher 24 bits indicate a maker ID of the device allocated by the IEEE (the Institute of Electrical and Electronics Engineers), and the lower 48 bits indicate a unique ID that the maker can freely set. Accordingly, regardless of the maker and model of the device, a specific node-unique ID is set in the device. By this device identification means, devices can be specified in data communication on a network using the IEEE 1394 serial bus where a plurality of devices are connected(hereinbelow, referred to as a "1394 network"). Further, display means for recognizing a plurality of devices by using node unique IDs and displaying device connection information in the network called a topology map, may be provided to manage status of use of the 1394 network and improve usefulness of the network.

If the above display means is introduced into the 1394 network environment where a plurality of devices are connected, as the device information on makers, device models and the like can be obtained by the node unique IDs, a user knows the correspondence between a displayed device and an actually connected real device.

However, if a plurality of devices of the same model by the same maker are connected in the 1394 network, the user, who has to specify a real device only from information on the maker and device model, has difficulty to specify the correspondence between the displayed device and the real device.

Further, even if the relative connection relation among the devices on the 1394 network is displayed as a topology map, the user has to compare the physical connection of the 1394 network with displayed contents so as to specify the connection between the displayed device and the real device. Accordingly, in the 1394 network where a number of devices are connected, it is difficult to specify the correspondence between a displayed device and a real device.

Further, it is also difficult for the user to specify real devices within a necessary range, based on desired conditions. Further, once the devices are removed from the 1394 network then connected again, the method of specification changes, which confuses the user.

Further, some devices change their functions by replacing parts with other parts. For example, an ink-jet printer which also functions as a scanner, if its printhead is replaced with a scanner head, is known. If such device is connected to the 1394 network or the like, it is difficult to know via the network that the function has been changed.

SUMMARY OF THE INVENTION

Accordingly, the present invention has its object to provide information processing apparatus and method for searching a network environment where a plurality of devices are connected, to find a desired device easily and quickly.

The foregoing object is attained by providing an image processing apparatus comprising:

acquisition means for acquiring device information from a memory of a device connected to a serial bus, wherein the device information being related to the device and read only through the serial bus; setting means for setting search conditions for searching for devices connected to the serial bus; and control means for generating a list of devices meeting the set search conditions, based on the device information acquired by the acquisition means.

Further, another object of the present invention is to provide information processing apparatus and method for displaying detected devices in a manner such that a user can easily recognizes them and easily select a device in accordance with his/her purpose.

The above object is attained by providing an information processing apparatus comprising: acquisition means for acquiring device information from a memory of a device connected to a serial bus, wherein the device information being related to the device and read only through the serial bus; setting means for setting search conditions for searching for devices connected to the serial bus, priorities of the search conditions and a search range; and control means for acquiring the device information within the set search range by using the acquisition means, and generating a list of devices meeting the set search conditions, in descending order of the set priorities.

Further, the above object is attained by providing an apparatus having the above construction, further comprising display means for displaying the list, wherein if a device is selected from the list displayed by the display means, the control means causes the display means to display detailed information of the selected device.

Further, another object of the present invention is to provide information processing apparatus and method for enabling the same method for recognizing a once-detected device.

The above object is attained by providing an information processing apparatus comprising: acquisition means for acquiring device information from a memory of a device connected to a serial bus, wherein the device information being related to the device and read only through the serial bus; setting means for setting search conditions for searching for devices connected to the serial bus, priorities of the search conditions and a search range; and control means for acquiring the device information within the set search range by using the acquisition means, and generating a list of devices meeting the set search conditions, in descending order of the set priorities.

Further, the above object is attained by providing an apparatus having the above construction, wherein in the list, model-based serial numbers of the devices are used.

Further, another object of the present invention is to provide information processing apparatus and method, in a network environment where a plurality of devices are connected, for facilitating recognition of change in device function or the like in some of the devices.

The above object is attained by providing an information processing apparatus connected to a serial bus, comprising a memory for storing device information which relates to the apparatus, wherein update information indicative of update status of the device information is further stored in the memory, and wherein the device information and the update information are read only through the serial bus.

Further, another object of the present invention is to provide information processing apparatus and method for sending update information to other devices upon function change or the like.

The above object is attained by providing an information processing apparatus connected to a serial bus, comprising a memory for storing device information which relates to the apparatus, wherein update information indicative of update status of the device information is further stored in the memory, and wherein the device information and the update information are read only through the serial bus.

Further, the above object is attained by providing an apparatus having the above construction, further comprising notification means for, if the device information is updated, notifying the update information to the device connected to the serial bus.

Further, another object of the present invention is to provide information processing apparatus and method for selecting a device of a desired type such as an image input device, existing on a serial bus, and obtaining data such as print data from the selected device.

The above object is attained by providing an information processing method which switches a protocol for plural types of devices, comprising the steps of: executing an initial protocol regardless of the switched protocol; and executing protocols unique to the plural types of devices, subsequently to the initial protocol, wherein the initial protocol includes first processing to examine a topology map of a first type of devices on the serial bus, and second processing to examine a topology map of a second type of devices to output data to the first type of devices on the serial bus.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table showing addresses and functions of information stored in a CSR core register;

FIG. 7 is a table showing addresses and functions of information stored in a serial bus register;

FIG. 10 is a table showing addresses and functions of information stored in a serial bus device register in unit space;

FIGS. 18A and 18B are explanatory views showing arbitration in the 1394 network;

FIG. 44 is an example of individual device information included in a function list;

FIG. 45 is a table showing an example of the function list before it is updated;

FIG. 46 is a table showing an example of the function list after it has been updated;

FIG. 52 is a table explaining a printer map generated by a host device;

FIG. 53 is an example of the format of node ID in a CSR architecture;

FIG. 54 is an example of the format of a command for printer-map generation;

DETAILED DESCRIPTION OF THE PREFERRED EMBODIMENTS

Preferred embodiments of the present invention will now be described in detail in accordance with the accompanying drawings.

In the embodiments described below, as a digital interface connecting the respective devices, an IEEE 1394-1995 serial bus (High Performance Serial bus; hereinbelow, simply referred to as a "1394 serial bus") is employed. For this reason, the outline of the 1394 serial bus will be described first. Note that the details of the IEEE 1394-1995 standard are given in "IEEE Standard for a High Performance Serial Bus" (IEEE, Aug. 30, 1996).

Outline of 1394 Serial Bus

With appearance of a digital video tape recorder, a digital video disk (DVD) and the like for private use, there is a need for transferring realtime and data of large amount of information such as video data and audio data (hereinbelow, generally referred to as "AV data"). To transfer AV data in a real-time manner to a personal computer (PC) or other digital devices, an interface capable of high-speed data transfer is required. The 1394 serial bus has been developed from that point of view.

Figure 1:
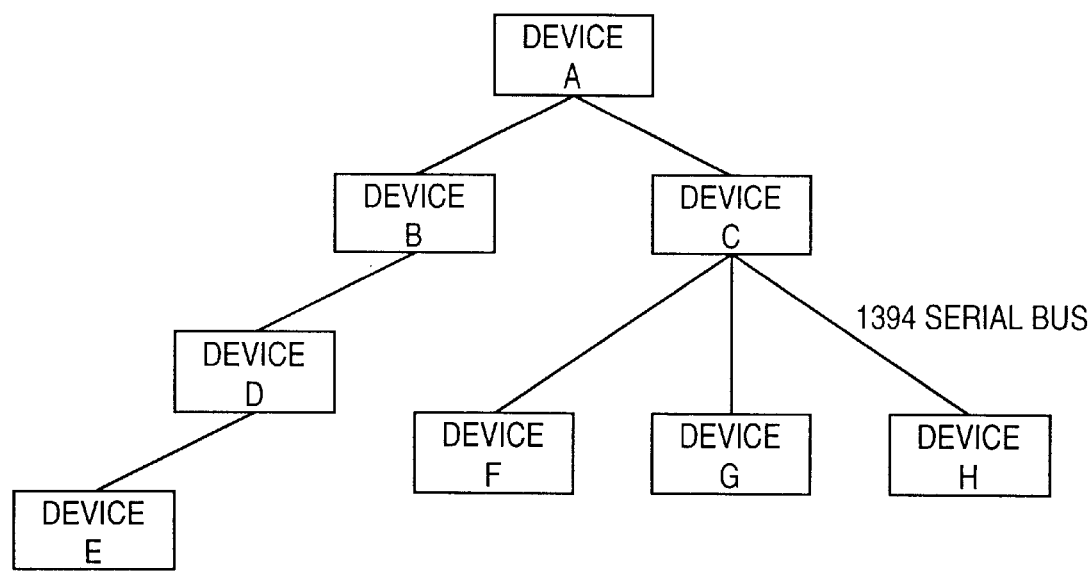
FIG. 1 is a block diagram showing an example of a network system constructed with an IEEE 1394 serial bus.

FIG. 1 shows an example of a network system constructed by using the 1394 serial bus.

In FIG. 1, devices A to H as nodes of the network respectively have a digital interface adapted to or based on the IEEE 1394 standard. The 1394 network constructs a bus-type network enabling serial data communication.

The devices A and B, A and C, B and D, D and E, C and F, C and G and; C and H are respectively connected via a twisted pair cable for the 1394 serial bus. These devices A to H may be a host computer such as a personal computer and computer peripheral devices. The computer peripheral devices may be all the computer peripheral devices including a digital video cassette recorder, a digital video disk (DVD) player, a digital still camera, a storage device using a medium such as a hard disk or an optical disk, a monitor having a CRT, an LCD or the like, a tuner, an image scanner, a film scanner, a printer, a MODEM, and a terminal adapter (TA). Note that the printing method of the printer may be an electrophotographic method using a laser beam or LED, an ink-jet method, an ink-melting or ink-sublimation type thermal transfer method, a thermal printing method, or any other printing method.

The connection among the respective devices may be made by mixedly using the daisy-chain and node-branching methods, thus attaining high connecting freedom. Further, the devices respectively have an ID, and construct a network within a range connected via the 1394 serial bus by recognizing the IDs with each other. For example, the devices respectively play a relaying role if they are daisy-chain connected respectively with a single 1394 serial bus cable, thus constructing a network.

Further, the 1394 serial bus, corresponding to the Plug and Play function, has a function to automatically recognize a device when connected to it and recognize the connection state. Further, in the system as shown in FIG. 1, the 1394 serial bus has a function to automatically perform bus reset (i.e., to reset the network construction information by that time) when a device is removed from the network or newly added to the network, and reconstruct a network. By this function, the network construction can be set or recognized at any time. The bus reset is also performed when the power of device already existing on the network is turned on/off.

Further, the 1394 serial bus has a function to relay data transferred from another device. By this function, all the devices on the network can grasp bus operation status.

Further, transfer speed 100/200/400 Mbps is defined as the data transfer speed of the 1394 serial bus. A device having the higher transfer speed supports a lower transfer speed, thus maintaining compatibility. As the data transfer modes, an asynchronous transfer mode (ATM) for transferring asynchronous data such as a control signal, and an isochronous transfer mode for transferring isochronous data such as realtime AV data are available. The asynchronous data and the isochronous data are mixedly transferred, in each cycle (generally 125 $\mu$m/cycle), following a cycle start packet (CSP) indicative of start of the cycle, such that the isochronous data is transferred prior to the asynchronous data. Note that the transfer bandwidth of the isochronous transfer mode is assured within each communication cycle.

The asynchronous transfer mode is advantageous in transfer of data to be asynchronously transferred in accordance with necessity, such as a control signal or file data. The isochronous transfer mode is advantageous in transfer of data to be continuously transferred by a predetermined amount at a constant data rate, such as video data or audio data.

Architecture

Figure 2:
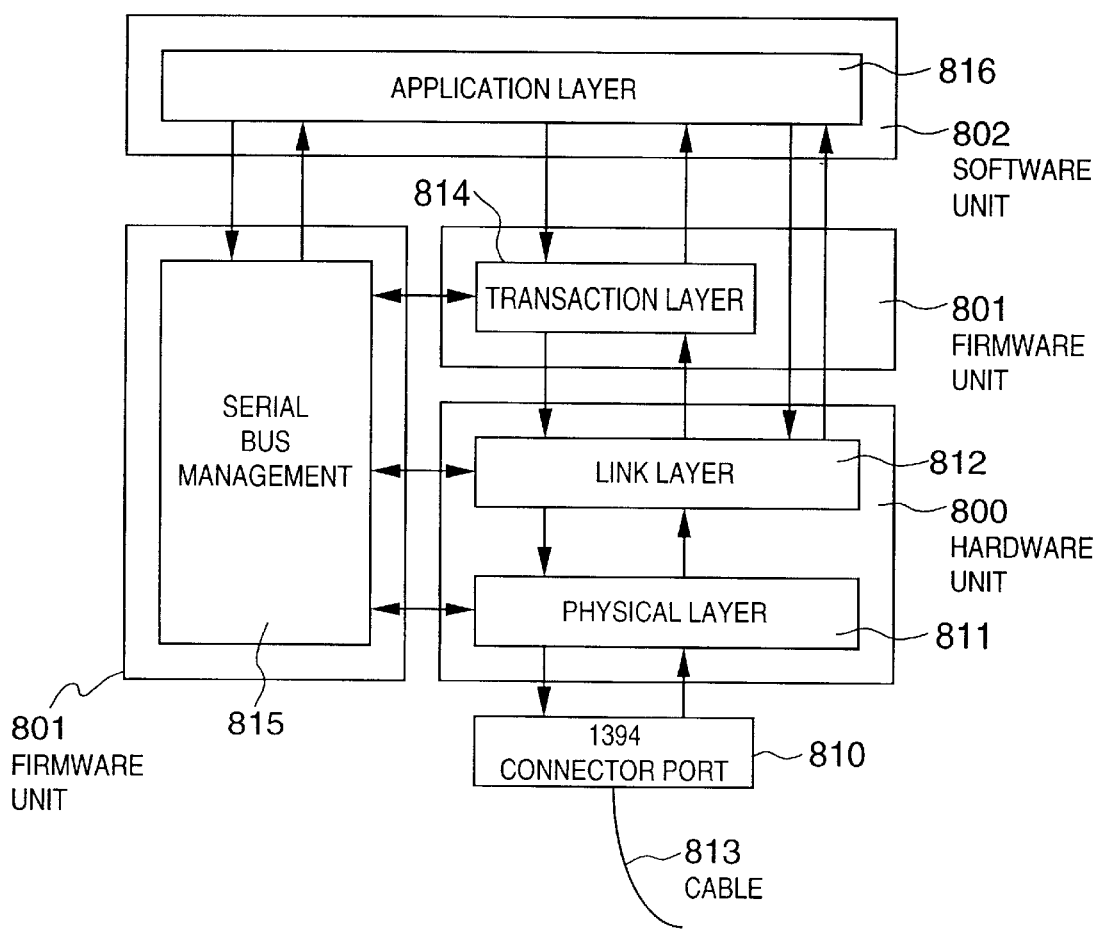
FIG. 2 is a block diagram showing the construction of an IEEE 1394 interface.

FIG. 2 shows an example of the construction of the 1394 interface, as a layer structure. As shown in FIG. 2, a connector port 81d is connected to a connector at the end of a cable 813 for the 1394 serial bus. A physical layer 811 and a link layer 812 in a hardware unit 800 are positioned above the connector port 810. The hardware unit 800 comprises an interface chip. The physical layer 811 performs coding and connection-related controls, and the link layer 812 performs packet transfer, cycle-time control and the like.

In a firmware unit 801, a transaction layer 814 manages data to be transferred and provides read, write and lock transactions. A serial bus management layer 815 in the firmware unit 801 manages connection statuses and IDs of the respective devices connected to the 1394 serial bus, thus manages the construction of the 1394 network. The above described hardware and firmware substantially constructs the 1394 serial bus.

Further, in a software unit 802, an application layer 816 differs in accordance with a software program used by the system, and how to transfer data on the interface is defined by a protocol such as a printer protocol or an AV/C protocol.

Link Layer

Figure 3:
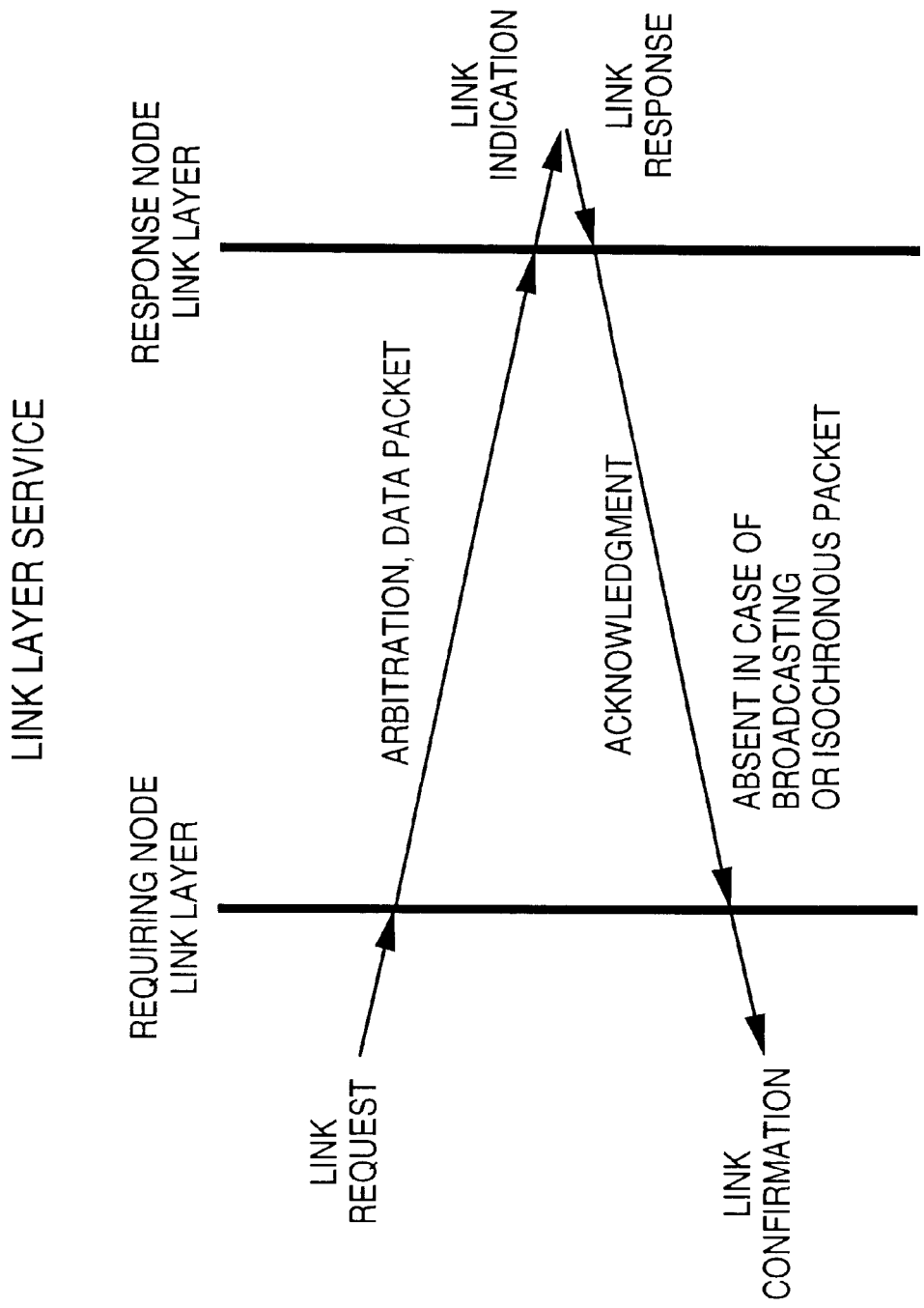
FIG. 3 is a timing chart showing services provided by a link layer.

FIG. 3 shows services provided by the link layer 812. More specifically, the link layer 812 provides the following four services:
(1) Link request (LK_DATA.request) to request for transfer of a predetermined packet to a response node
(2) Link indication (LK_DATA.indication) to notify the response node of reception of the predetermined packet
(3) Link response (LK_DATA.response) to indicate reception of acknowledge from the response node
(4) Link confirmation (LK_DATA.confirmation) to confirm an acknowledge from a requiring node Note that the link response (LK_DATA.response) does not exist in case of broadcast communication and isochronous packet transfer. Further, the link layer 812 realizes the two types of transfer methods, the asynchronous transfer mode and the isochronous transfer mode, based on the above services.

Transaction Layer

Figure 4:
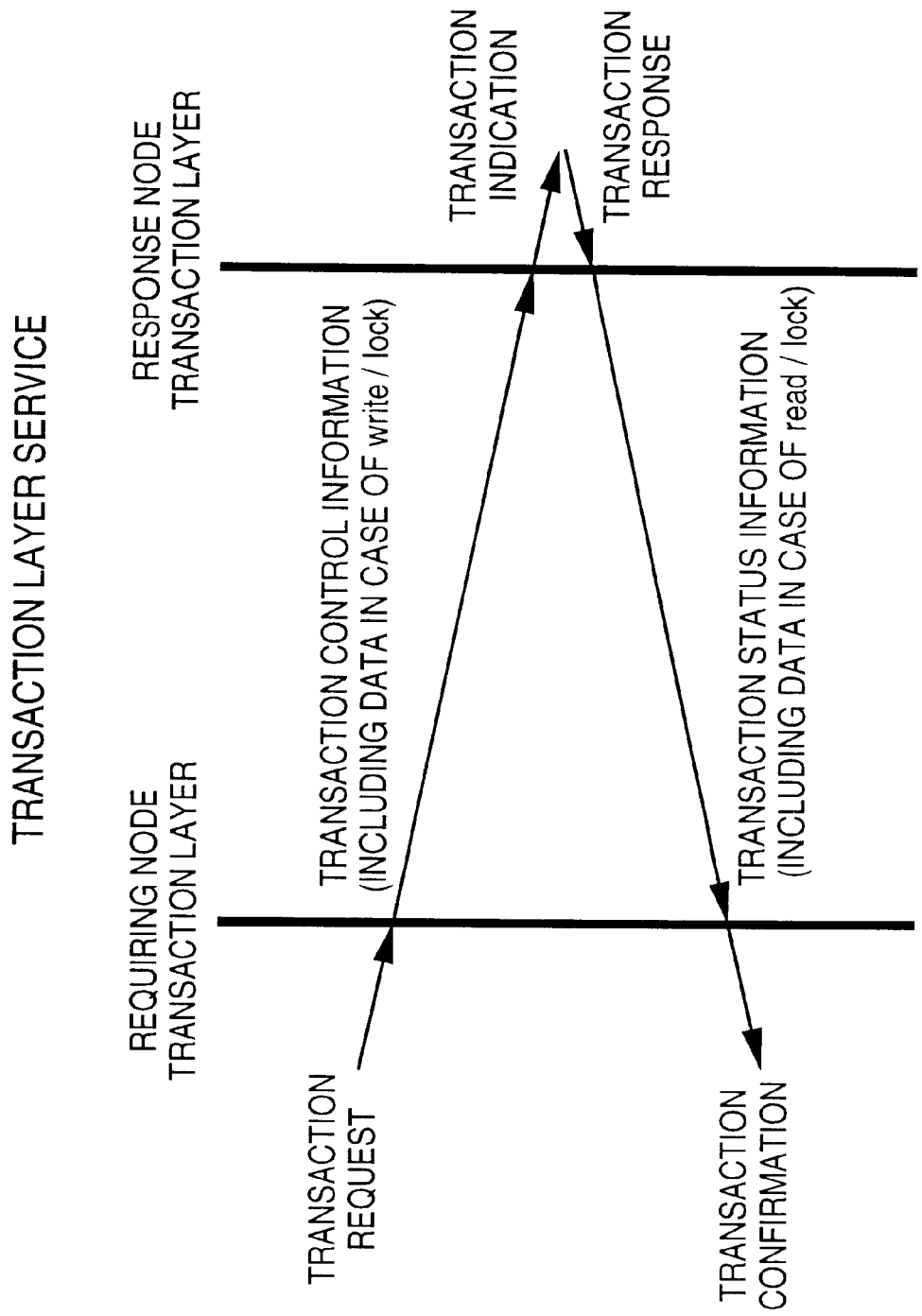
FIG. 4 is a timing chart showing services provided by a transaction layer.

FIG. 4 shows :services provided by the transaction layer 814. More specifically, the transaction layer 814 provides the following four services:
(1) Transaction request (TR_DATA.request) to request for a predetermined transaction to a response node
(2) Transaction indication (TR_DATA.indication) to notify the response node of reception of the predetermined transaction request
(3) Transaction response (TR_DATA.response) to indicate reception of status information (including data in case of write or lock) from the response node
(4) Transaction confirmation (TR_DATA.confirmation) to confirm status information from a requiring node The transaction layer 814 manages the asynchronous transfer based on the above services, and realizes the three types of transactions, read, write and lock transactions:
(1) Read transaction: a requiring node reads information stored at a specific address of a response node
(2) Write transaction: the requiring node writes predetermined information into a specific address of the response node
(3) Lock transaction: the requiring node transfers reference data and update data to the response node. The response node compares the received reference data with information at a specific address, and updates the information at the specific address with the update data in correspondence with the result of comparison.

Serial Bus Management

The serial bus management layer 815 provides the following three functions, node control, isochronous resource manager (IRM), and a bus manager.
(1) Node control: to manage the above respective layers and manage asynchronous transfer performed between another node
(2) IRM: to manage isochronous transfer performed between another node; specifically, to manage information necessary for allocation of transfer bandwidth and channel number, and provide these information to another node.

IRM is solely exists on a local bus, and is dynamically selected from candidates (nodes having the IRM function) upon each bus reset. Further, the IRM may provide a part of function (management of connection construction, power source and speed information, and the like) that can be provided by a bus manager to be described later.
(3) Bus Manager: the bus manager has the IRM function, and provides a bus management function higher than the IRM, more specifically, to perform higher power management (manage information as to power supply via a communication cable is possible or not, power supply is necessary or not, and the like, for respective nodes), to perform higher speed information management (manage the maximum transfer speed between respective nodes), to perform higher connection construction management (generation of a topology map), to perform bus optimization or the like, based on these management information, further, to provide these information to another node.

Figure 5:
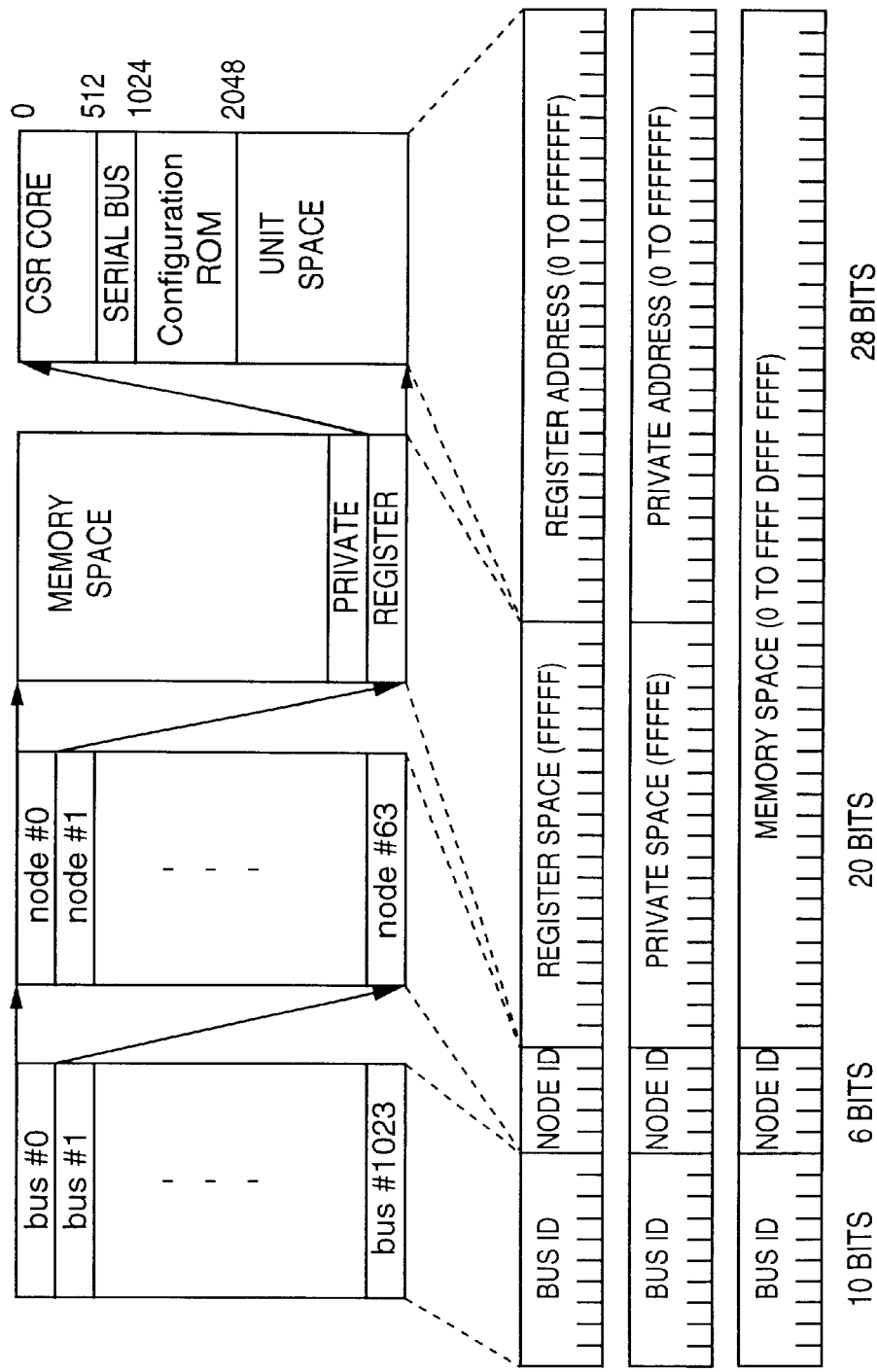
FIG. 5 is an explanatory view showing address space of the IEEE 1394 serial bus.

Further, the bus manager provides services to control the 1394 network to application software. These services include a serial bus control request (SB__CONTROL.request), a serial-bus event control confirmation (SB__CONTROL.confirmation) and serial-bus event indication (SB__CONTROL.indication):
(1) SB__CONTROL.request: a service for application software to request bust rest
(2) SB__CONTROL.conrfirmation: a service to confirm. SB__CONTROL.request: to the application software
(3) SB__CONTROL.indiication: a service to notify an event which occurs asynchronously to application software Address Designation FIG. 5 is an explanatory view showing address space of the 1394 serial bus. Note that in the 1394 serial bus, 64-bit with address space is defined in accordance with the Command and Status Register (CRS) architecture based on the ISO/IEC13213-1994.

In FIG. 5, a first 10-bit field 601 is used for storing an ID number designating a predetermined bus; and the next 6-bit field 602 is used for an ID number designating a predetermined device (node). These higher 16-bits are referred to as a "node ID". The nodes respectively recognize other nodes by the node IDs. Further, the nodes respectively recognize a communication destination node by using the node ID, and perform conmmunication with the recognized node.

The remaining 48-bit field is used for designating address space (256 Mbyte structure) of each node, in which a 20-bit field 603 is used for designating a plurality of areas constructing the address space, and the last 28-bit field 604 is used for designating an address for storing common or unique information in each node.

In the field 603, an address area from "0" to "0xFFFD" is called "memory space"; "0xFFFFE", "private space; and "0xFFFFF", "register space". The private space is freely used by each node. Further, the register space is used for storing common information to nodes connected to the bus. Communication among the nodes can be managed by using the information stored in the register space.

For example, the first 512 bytes in the register space are used as a CSR-architecture core (CSR core) register. The addresses and functions of information stored in the CSR core register are as shown in FIG. 6. FIG. 6 shows the addresses by offsets from "0xFFFFF0000000".

The following 512 bytes are used as a serial bus register. The addresses and functions of information stored in the serial bus register are as shown in FIG. 7. FIG. 7 shows the addresses by offsets from "0xFFFFF0000200".

Figure 8:
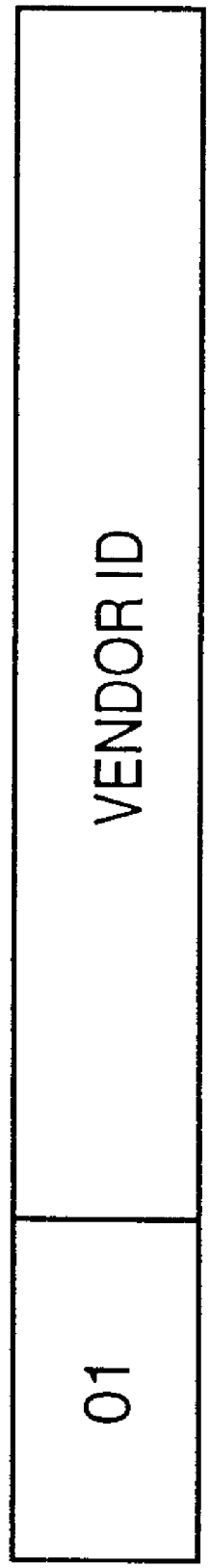
FIG. 8 is a table showing the structure of a minimum format configuration ROM.

The following 1024 bytes are used as a configuration ROM. The configuration ROM has a minimum format ROM and a general format ROM, arranged from "0xFFFFF0000400". FIG. 8 shows the minimum format configuration ROM, wherein a 24-bit vendor ID is a numerical value uniquely allotted to each vendor based on the IEEE standards.

Figure 9:
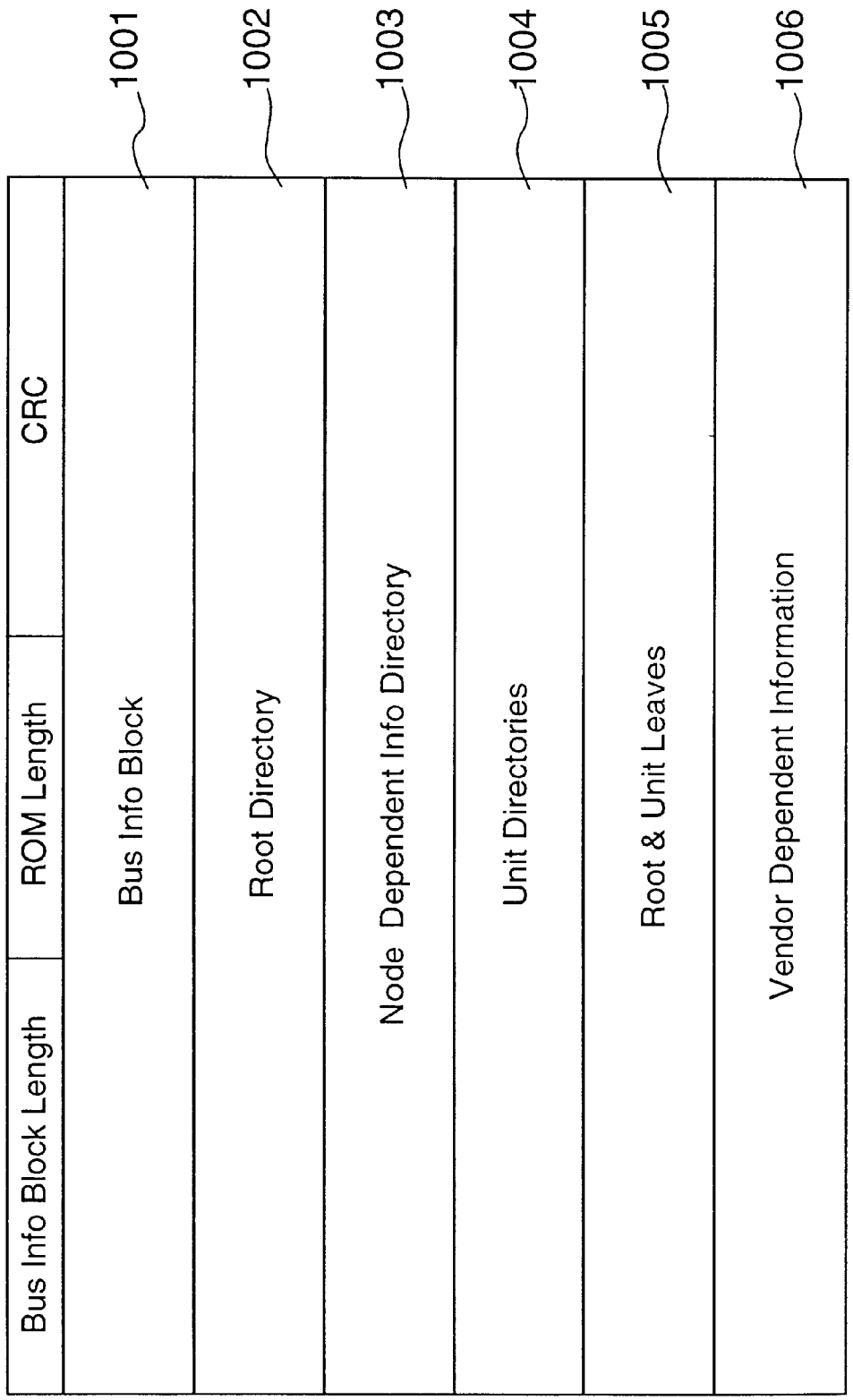
FIG. 9 is a table showing the structure of a general format configuration ROM.

FIG. 9 shows a general format configuration ROM. The vendor ID is stored in a root directory (Root Directory) 1002. As unique ID information to recognize each node, node unique ID can be held in a bus information block (Bus Info Block) 1001 and a root and unit leaves (Root & Unit Leaves) 1005.

The node unique ID can be set as a unique ID to specify one node regardless of maker or device model. The node unique ID is a 64-bit data where higher 24 bits indicate the above-described vendor ID and lower 48 bits indicate information freely set by the maker of the node device, such as a serial number of the device. Note that the node unique ID is used, even after occurrence of bus reset, to continuously recognize a specific node.

Further, information on basic function of the node can be held in the root directory (Root Directory) 1002. The detailed function information is stored in a subdirectory (Unit Directories) 1004 offset from the root directory (Root Directory) 1002. For example, information on a software unit supported by the node device is stored in the unit directories (Unit Directories) 1004. Specifically, information on a data transfer protocol for data communication among the nodes, and on a command set defining a predetermined communication protocol are held.

Further, information unique to the device can be held in a node dependent information directory (Node Dependent Info Directory) 1003. The node dependent information directory (Node Dependent Info Directory) 1003 is offset from the root directory (Root Directory) 1002.

Further, information unique to the vendor that manufactures or sells the node device can be held in a vendor dependent information (Vendor Dependent Information) 1006.

In FIG. 5, the remaining area is called "unit space", used for designating addresses where information unique to each node such as identification information of each device (vendor name, model name or the like) and use conditions is stored. FIG. 10 shows addresses and functions of the information stored in a serial bus device register in the unit space. FIG. 10 show the addresses by offsets from "0xFFFFF0000800".

Generally, to simplify design of bus system of different type, each node should use only the initial 2048 bytes in the unit space. That is, the register space preferably consists of 4096 bytes, including the 2048 bytes of the register space having the CSR core register, the serial bus register and the configuration ROM, and the initial 2048 bytes of the unit space.

Communication Cable

Figure 11:
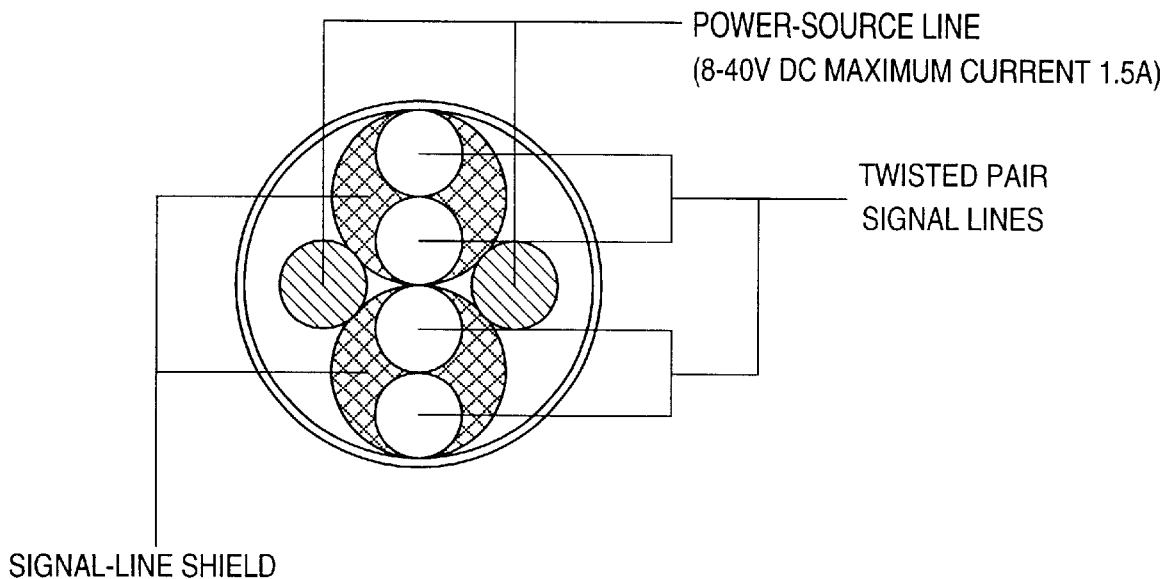
FIG. 11 is a cross-sectional view showing a communication cable in conformity with the IEEE 1394 standard.

FIG. 11 shows a cross-section of a communication cable in conformity with the IEEE 1394 standard.

The communication cable comprises two sets of twisted pair signal lines and two power-source lines. The 1394 serial bus supplies electric power even to a device with its main power turned off, a device with reduced electric power due to a fault, and the like, by the power-source lines. Note that the voltage of direct-current electric power supplied via the power-source lines is 8 to 40 V; the maximum current value is 1.5 A.

DS-Link

Figure 12:
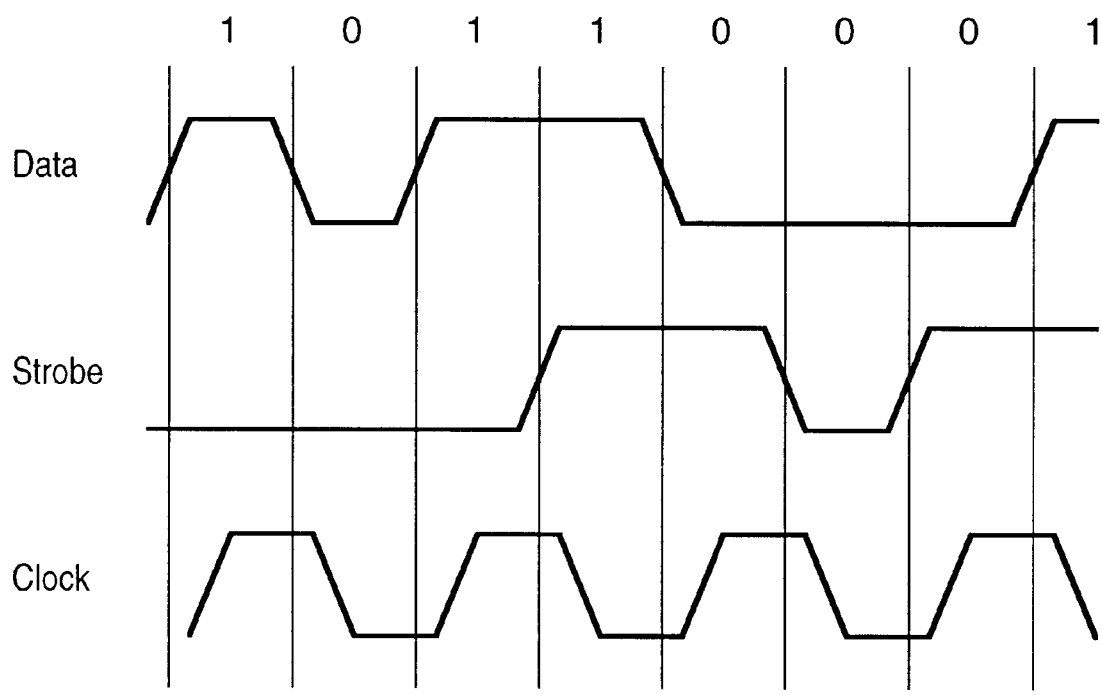
FIG. 12 is a timing chart explaining a DS-Link method.

Information is transmitted on the two sets of twisted pair signal lines by the DS-Link (data/Strobe Link) method. FIG. 12 is a timing chart explaining the DS-Link method.

The DS-Link method is appropriate to high-speed serial data communication. The method requires two sets of twisted pair signal lines. One set of twisted pair signal lines is used for sending a data signal, and the other set of twisted pair signal line is used for sending a strobe signal. On the receiving side, an EXCLUSIVE-OR between the data signal and the strobe signal is obtained so as to reproduce a clock signal. Note that the 1394, serial bus using the DS-Link method has the following advantages:
(1) As it is not necessary to insert a clock signal into a data signal, the transfer efficiency is higher than that of other serial data transfer methods.

(2) As a phase locked loop (PLL) circuit can be omitted, the circuit scale of controller LSI can be reduced.

(3) As it is not necessary to send information indicative of idle status when there is no data to be transferred, a transceiver circuit can be easily set to a sleep status, and electric consumption can be reduced.

Bus Reset

The 1394 interface of each node automatically detects a change in;network connection construction. In this case, the 1394 network performs processing called bus reset by a procedure to be described below. Note that the change in the connection construction can be detected by the change in bias voltage applied to the connector port 810 of each node.

A node that has detected a change in the network connection construction, i.e., the increment/decrement of the number of nodes due to e.g. connection/removal of network device or power ON/OFF operation, or a node that must newly recognize the network connection construction transmits a bus reset signal via the 1394 interface onto the 1394 serial bus.

The physical layer 811 receives the bus reset signal, then transmits the occurrence of bus reset to the link layer 812 and at the same time transfers the bus reset signal to another node. The node receives the bus reset signal, and clears the network connection construction recognized by that time and the node IDs allocated to the devices. When all the nodes have received the bus reset signal, the respective nodes automatically perform initialization processing accompanying the bus reset, i.e., recognition of new network connection construction and new node ID allocation.

Note that the bus reset is started by direct instruction from the application layer 816 to the physical layer 811 by host control, as well as the change in the network connection construction as described above. Further, when the bus reset starts, data transfer is temporarily suspended, and after the completion of initialization processing accompanying the bus reset, the data transfer is restarted on the new network.

Bus Reset Sequence

After the bus reset has started, the 1394 interface of each node performs recognition of the new network connection construction and new node ID allocation. Hereinbelow, the basic sequence from the start of bus reset to the end of node ID allocation will be described with reference to FIGS. 13 to 15.

Figure 13:
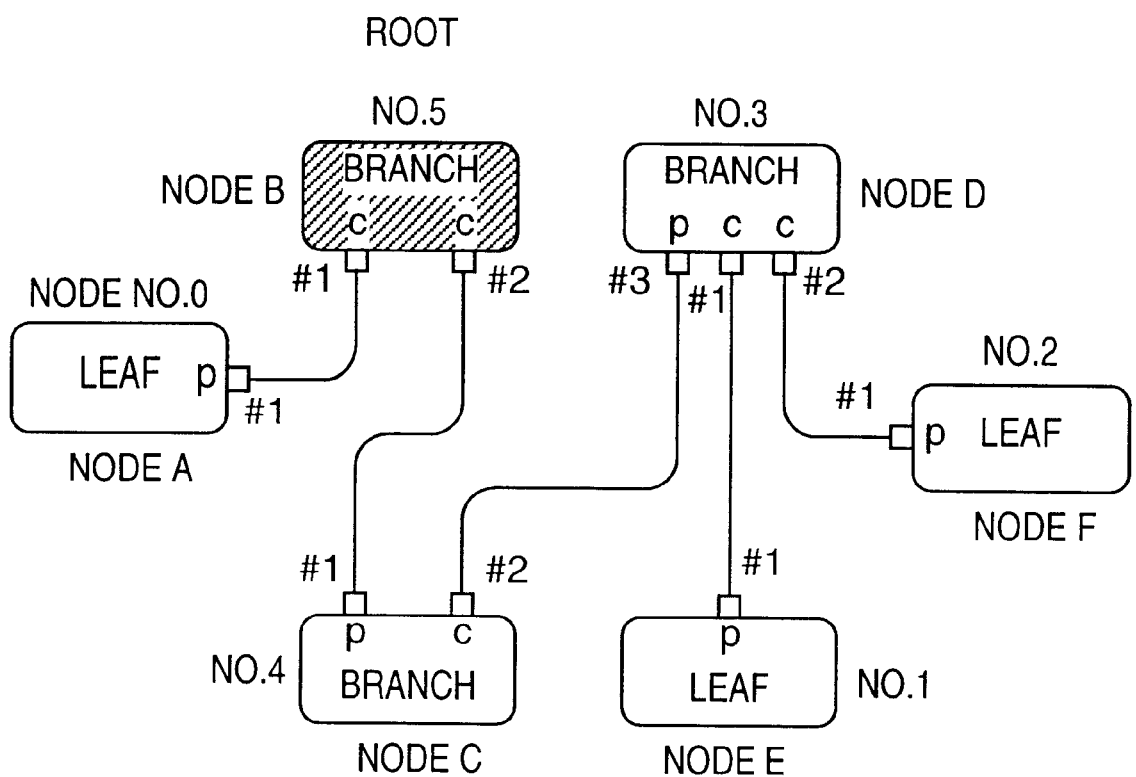
FIG. 13 shows a status since start of bus reset in the network.

FIG. 13 shows a status after the start of bus reset in the network. Nodes A to F respectively have one to three connector ports 810. The connector port 810 of each node is allocated a port number for discrimination of the respective ports. Hereinbelow, the procedure from the start of bus reset to the node ID allocation in the 1394 network having the construction as shown in FIG. 13 will be described with reference to the flowchart of FIG. 14.

Figure 14:
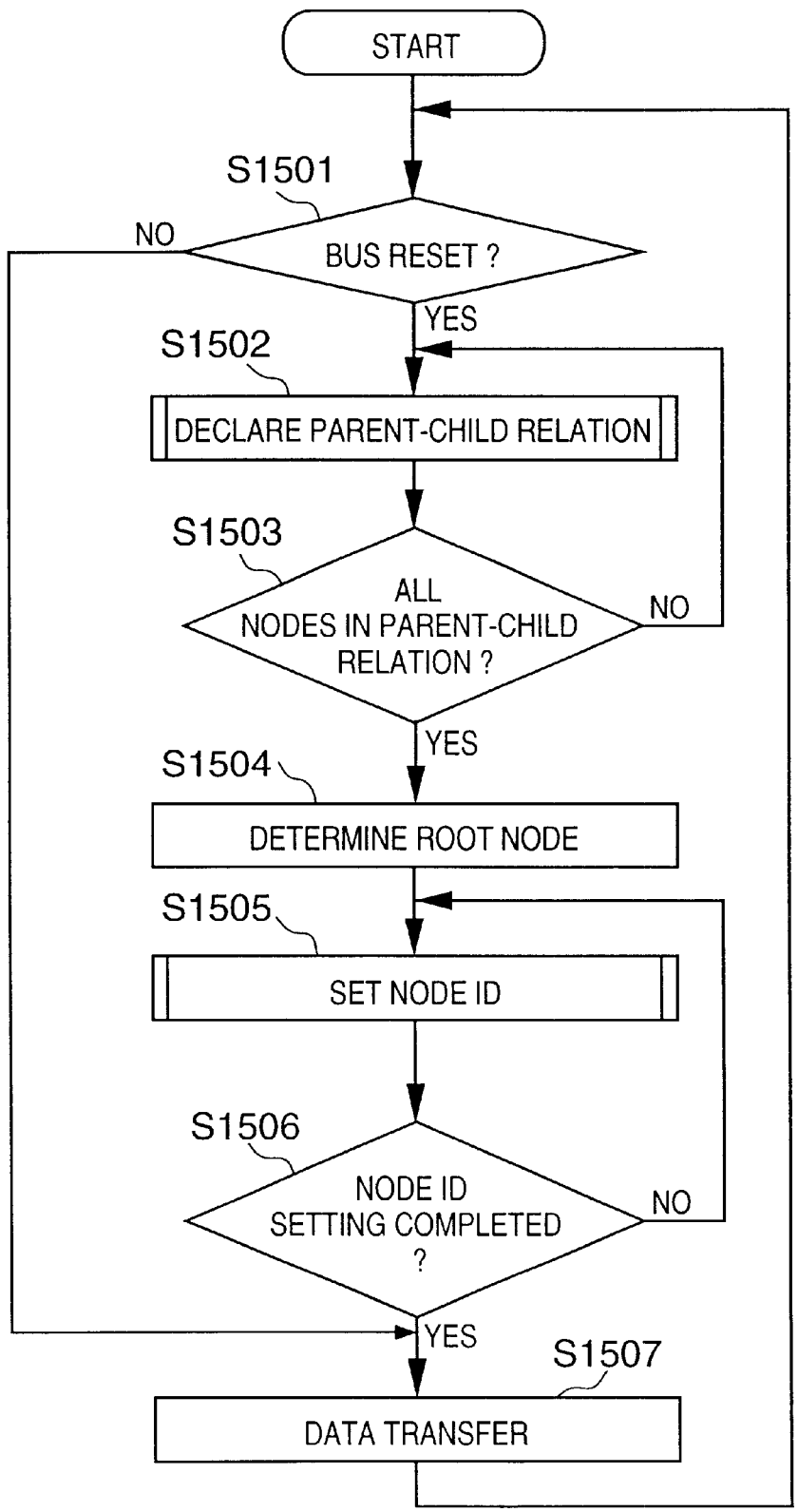
FIG. 14 is a flowchart showing a procedure from the start of bus reset to node ID allocation in the 1394 network.

In FIG. 14, the nodes A to F always monitor whether or not bus reset has occurred respectively (step S1501). When a node, which has detected that the network connection construction changed, outputs a bus reset signal (start of bus reset), the respective nodes perform the following processing.

When the bus reset has started, the nodes respectively declare parent-child relation (step S1502), and step S1502 is repeated until it is determined at step S1503 that parent-child relation has been determined among all the nodes.

When the parent-child relation has been determined among all the nodes, a node to perform arbitration in the 1394 network, i.e., a root node is determined (step S1504). When the root has been determined, the respective nodes start to set their own node IDs (step S1505). Step S1505 is repeated until it is determined at step S1506 that the node IDs of all the nodes have been set.

When the node IDs are set in all the nodes, the respective node perform isochronous transfer or asynchronous transfer (step S1507). The respective nodes perform data transfer at step S1507, and at the same time, monitor start of bus reset at step S1501. If the bus reset has started, the respective nodes perform the processing at step S1502 and the subsequent steps.

By the above procedure, each time bus reset has started, the respective nodes recognize a new network connection construction and perform node ID allocation.

Declaration of Parent-Child Relation

Figure 15:
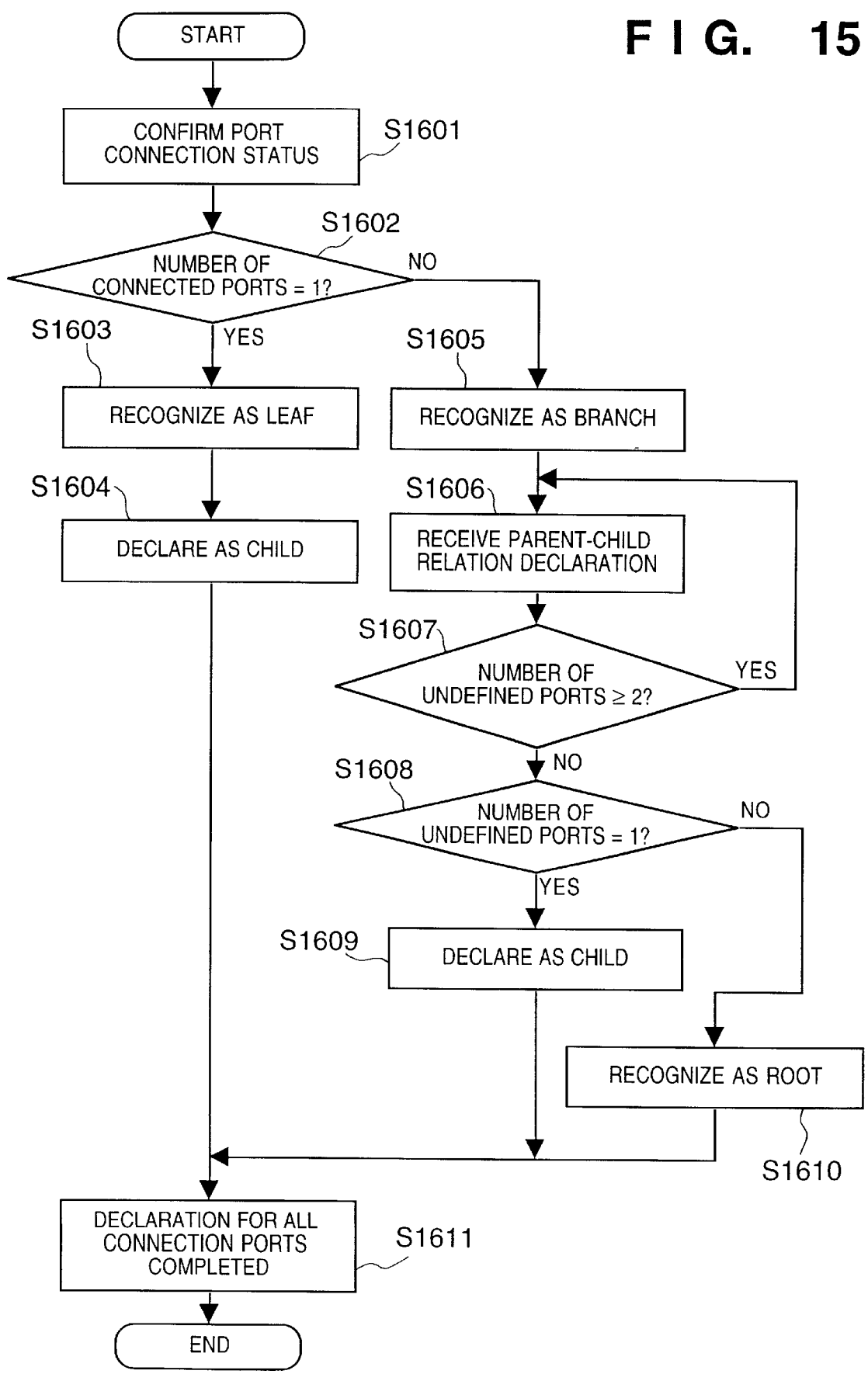
FIG. 15 is a flowchart showing details of processing for parent-child declaration.

FIG. 15 is a flowchart showing details of the processing for parent-child declaration at step S1502.

In FIG. 15, when the bus reset has started, the nodes A to F respectively check connection status (connected or unconnected) of the connector ports 810 (step S1601), then count the connector ports 810 connected to other nodes (hereinbelow referred to as "connected ports") (step S1602).

A node having one connected port recognizes itself as a "leaf" (step S1603). Note that "leaf" means a node connected to only one node. The leaf declares that it is a "child" against the connected node, and recognizes the connected node as a "parent".

In this manner, the parent-child relation is first declared between a leaf positioned at the end of the network and a "branch". Next, the parent-child relation is sequentially declared between branch and branch. Note that "branch" means a node having two or more connection ports.

The parent-child relation is determined sequentially from a node which can declare its parent-child relation. Further, a connection port of a node which has declared as a "child" is recognized as a "parent port" connected to a parent node, and a connection port of the parent node which has received the declaration is recognized as a "child port" connected to the child node. For example, in FIG. 13, the nodes A, E and F recognize themselves as leaves, and declare the parent-child relation based on the recognition. Accordingly, the parent-child relation between the nodes A and B, E and D and F and D are determined as "child-parent".

Further, a node having two or more connection ports recognizes itself as a "branch" (step S1605). The branch receives parent-child declaration from nodes connected to the respective connection ports (step S1606). The connection port that received the parent-child relation declaration is recognized as a "child port".

When the branch has recognized one connection port as a "child port", it detects whether or not there are two or more connection ports for which parent-child relation has not been determined (undefined ports) (step S1607). If there are two or more undefined ports, the processing at step S1606 is performed again. Further, if the number of undefined ports is one (step S1608), the branch recognizes the undefined port as a "parent port", and declares that the branch is a child" of the node connected to the "parent" connection port (step S1609).

A branch cannot declare parent-child relation that it is a "child" until the number of undefined ports becomes one. For example, in FIG. 13, the nodes B, C and D recognize themselves as branches, and receive parent-child declaration from leaf(ves) or other branch(es). When the parent-child relation has been determined between the nodes D and E and between D and F, the node D declares parent-child relation against the node C. The node C receives the parent-child relation declaration from the node D and declares parent-child relation against the node B.

If it is determined at step S1608 that there is no undefined port, i.e., all the connection ports are recognized as "children ports", the branch recognizes itself as a root (step S1610).

For example, in FIG. 13, the node B where all the connection ports are children ports, is recognized by the other nodes as a root which arbitrates communication on the 1394 network. FIG. 13 shows an example where the node B has been determined to be a root, however, if the parent-child relation is declared by the node B before the parent-child relation declaration by the node C, the other node becomes a root. That is, every node can be a root depending on timing of parent-child relation declaration, and the node recognized as a root is not necessarily the same node even if the network construction is the same.

As the parent-child relation has been declared among all the connection ports, the respective nodes can recognize the network connection construction of the 1394 network as a hierarchical structure (tree structure) (step S1611). Note that the above-described parent node is a higher node in the hierarchical structure, and the child node is a lower node in the structure.

Node ID Allocation

Figure 16:
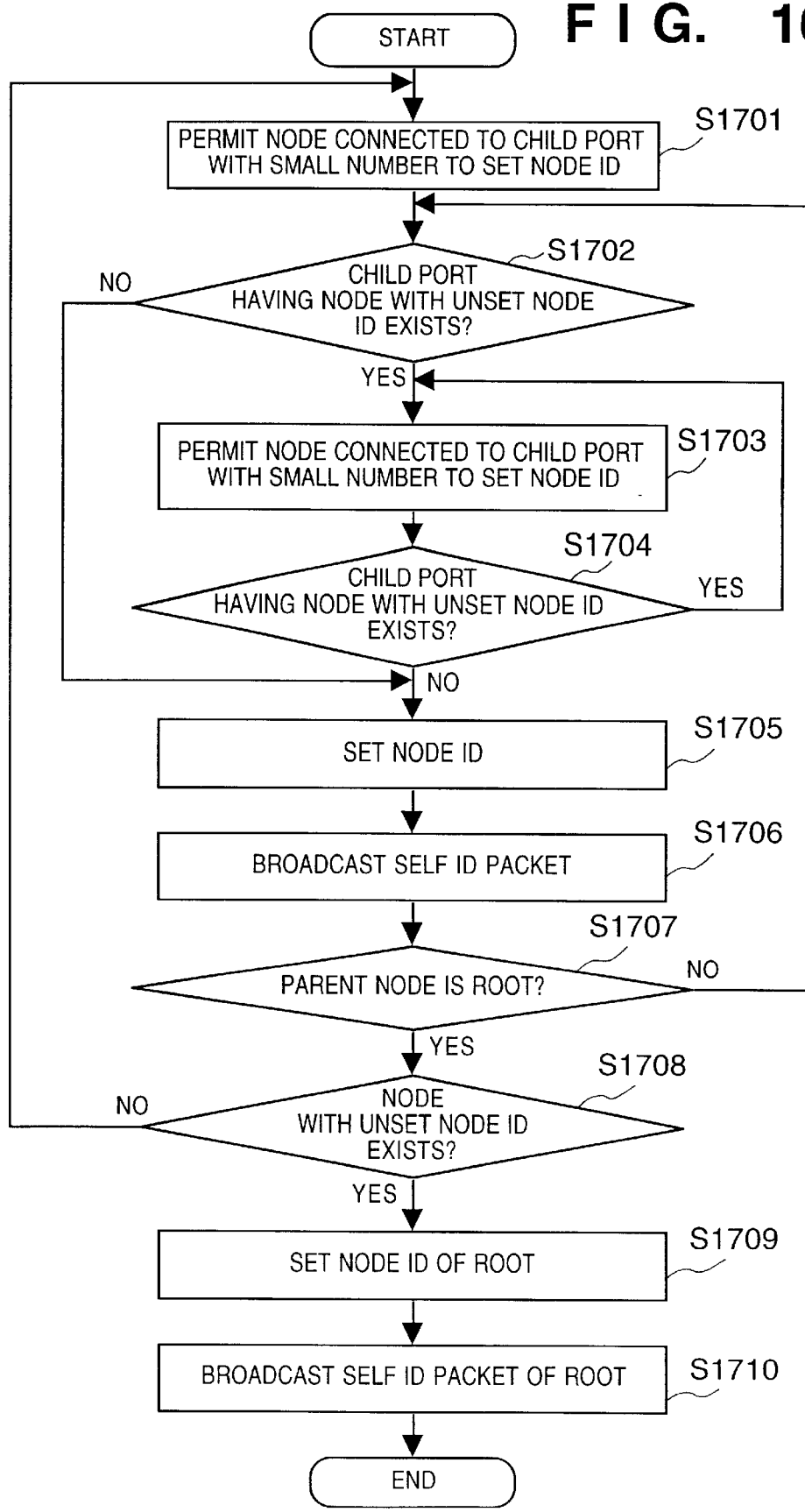
FIG. 16 is a flowchart showing details of node ID allocation processing.

FIG. 16 is a flowchart showing details of the node ID allocation processing at step S1505. The node ID has a bus number and anode number. In the present embodiment, the respective nodes are connected on the same bus, and the same bus number is allocated to the nodes.

In FIG. 16, the root provides node-ID setting permission to a connector port 810 having the minimum number among the children ports connected to nodes with unset node IDs (step S1701). When all the node IDs of the nodes connected to the minimum-numbered child port have been set, the root regards the child port as setting-completed port, then provide node-ID setting permission to a child port having the second minimum number. When all the node IDs of the nodes connected to the child port have been set by the processing at steps S1702 to S1708, the root sets its own node ID (step S1709). Note that the node numbers in ascending order of 0, 1, 2, . . . are allocated basically to the leaves, then branch, and the root. Accordingly, the root has the greatest node number.

A node that has obtained node-ID setting permission determines whether or not there is a child port including a node with unset node ID among its children ports (step S1702), and if a child port including a node width unset node ID is detected, provides node-ID setting permission to the node directly connected to the child port (step S1703).

The node that obtained the node-ID setting permission at step S1703 determines whether or not there is a child port including a node with unset node ID among its children ports (step S1704), and if a child port including a node with unset node ID is detected, provides node-ID setting permission to the node directly connected to the child port (step S1703).

Further, at step S1702 or S1704, if a child port including a node with unset node ID is not detected, the node sets its own node ID (step S1705). Then, the node that has set its own, node ID broadcasts a self ID packet including information on the node ID, the connection status of the connector ports 810 and the like (step S1706). Note that broadcasting is transfer of a communication packet of a node to an undefined number of nodes connected to the network.

The respective nodes receive self ID packets and recognize node numbers already allocated to the other nodes and available node numbers. For example, in FIG. 13, the node B as the root provides node-ID setting permission to the node A connected to a connector port 810 having the minimum port number "#1". The node A allocates a node number "0" to itself, sets the node ID having the bus number and the node number, and broadcasts a self ID packet including the node number.

If the parent node of the node that has broadcasted the self ID packet at step S1706 is not the root, the process returns from step S1707 to S1702, and the parent node performs the processing at step S1702 and the subsequent steps, to provide node-ID setting permission to a node with an unset node ID.

Further, if the parent node of the node that has broadcasts the self ID packet at step S1706 is the root, the process proceeds from step S1707 to S1708, at which it is determined whether or not the node IDs of the nodes connected to all the children ports of the root have been set. If there is a node with an unset node ID, the root provides node-ID setting permission to a child port with the minimum number among children ports of the node (step S1701). Further, when node IDs of all the nodes have been set, the root sets its own node ID (step S1709), and broadcasts the self ID packet (step S1710).

By the above processing, the nodes on the 1394 network respectively allocate a node ID to themselves.

Self ID Packet

Figure 17:
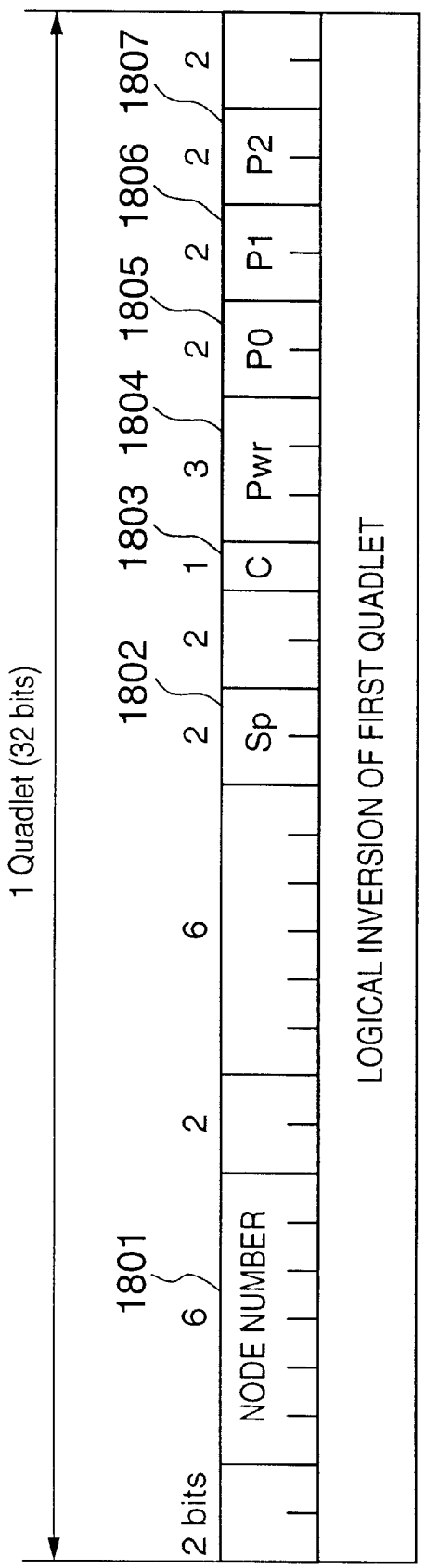
FIG. 17 is an explanatory view showing the structure of a self ID packet.

FIG. 17 shows the structure of a self ID packet. The self ID packet comprises a field 1801 for storing a node number of a node which has transmitted a self ID packet, a field 1802 for storing information on available transfer speed, a field 1803 indicative of presence/absence of bus management function (presence/absence of bus manager capability or the like), a field 1804 for storing information on electric consumption and power-supply characteristics, and fields 1805 to 1807 for storing information on connection statuses ("connected", "unconnected" statuses, parent-child relations of the ports and the like) of respective connector ports 810 with port numbers "#0" to "#2".

A contender bit of the field 1803 becomes "1" when the node to transmit the self ID packet has a capability to be a bus manager, otherwise, becomes "0". The "bus manager" means a node having functions to perform management described below based on various information included in a self ID packet, and provide these information to another node. The bus manager performs bus management all over the 1394 network by these functions:

(1) Bus power management: to manage information as to whether or not power supply is possible via the communication cable, whether or not power supply is necessary, and the like, for each node.

(2) Speed information management: to manage the maximum transfer speed among the respective nodes from information on available transfer speeds for the respective nodes.

(3) Topology map information management: to manage the network connection construction from parent-child relation information of the communication ports.

(4) Bus optimization based on the topology map information.

After the node ID setting, if a plurality of nodes have a capability to be a bus manager, a node with the greatest node number becomes a bus manager. That is, if the root with the greatest node number within the 1394 network has functions to be a bus manager, the root becomes a bus manager. However, if the root does not have the functions, a node having the second greatest node number becomes a bus manager. The node that has become the bus manager can be known by checking the contender bit 1803 in the self ID packet broadcasted by each node.

Arbitration

FIGS. 18A and 18B are explanatory views showing the arbitration in the 1394 network. The 1394 network performs arbitration of bus use right prior to data transfer. As the 1394 network is a logical bus-type network which relays a packet sent from each node to other nodes, thus transfers the same packet to all the nodes within the network. Accordingly, to avoid packet conflict, arbitration is necessarily performed such that only one node can transmits a packet at one timing.

In FIG. 18A, nodes B and F request a bus use right. Specifically, the nodes B and F request their parent nodes to provide them the bus use right. The parent node of the node B (node C) receives the request from the node B, and relays the request to its parent node (node D). These requests are finally sent to the root node that performs arbitration. The root that has received the requests for bus use right performs arbitration to determine a node to be provided with the bus use right. The arbitration can be performed only by the root. A node which has dominated in the arbitration is provided with the bus use right.

In FIG. 18B, the node F is provide with the bus use right, and the request by the node B is rejected. The root sends a DP (Data Prefix) packet to the node that lost in the arbitration to notify the node that its request has been rejected. The node notified of the rejection must wait for the next arbitration when it can request for the bus use right.

By the above-described arbitration, the bus use right is controlled and managed in the 1394 network.

Communication Cycle

Figure 19:
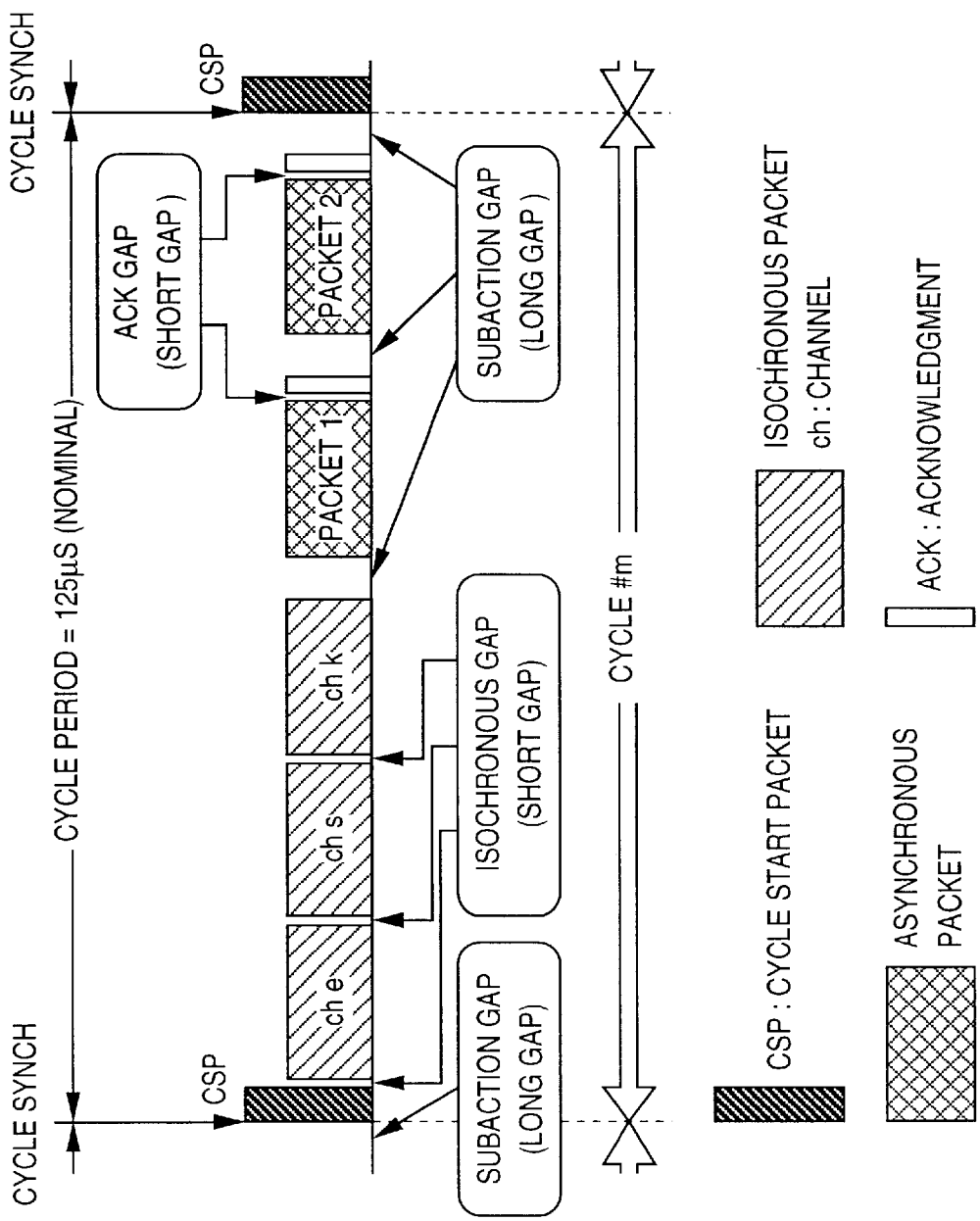
FIG. 19 is a timing chart showing a status where isochronous transfer mode and asynchronous transfer mode are mixedly performed within one period of communication cycle.

The isochronous transfer mode and asynchronous transfer mode can be set time-divisionally within each communication cycle period. Generally, the period of communication cycle is 125 μs. FIG. 19 shows a status where the isochronous transfer mode and asynchronous transfer mode are mixedly performed within one period of communication cycle.

The isochronous transfer mode is executed prior to the asynchronous transfer mode, since after a cycle start packet (CSP), an idle period (subaction gap) necessary for starting the asynchronous transfer is set to be longer than an idle period (isochronous gap) necessary for starting the isochronous transfer. By the settings of these different idle periods, the isochronous transfer mode is executed prior to the asynchronous transfer mode.

In FIG. 19, upon start of each communication cycle, a cycle start packet (CSP) is transferred from a predetermined node. The nodes respectively obtain the same timing as that of other nodes by performing timing control by the cycle start packet (CSP).

Isochronous Transfer Mode

The isochronous transfer mode is a synchronous-type transfer method which can be performed in a predetermined period after the start of communication cycle. Further, the isochronous transfer mode is necessarily performed in each cycle to maintain realtime transfer.

The isochronous transfer mode is appropriate to transfer data requiring realtime transfer, especially including moving image data and sound data including voice information. The isochronous transfer mode is broadcast communication different from one-to-one communication such as the asynchronous transfer mode. In the isochronous transfer mode, a packet transmitted from a node is uniformly, transferred to all the nodes on the network. Note that acknowledgment (ack) as a response code for reception acknowledgment does not exist in the isochronous transfer.

In FIG. 19, a channel e (ch e), a channel s (ch s) and a channel k (ch k) respectively indicate isochronous transfer periods for the respective nodes. In the 1394 serial bus, to discriminate a plurality of different isochronous transfer operations, different channel numbers are provided to these transfer operations. Thus, the isochronous transfer can be made among plural nodes. Note that the channel numbers do not specify transmission destinations but merely provide logical numbers to data.

Further, in FIG. 19, "isochronous gap" indicates a bus idle status. When the idle status has continued for a predetermined period, a node to perform the isochronous transfer determines that the bus can be used, and makes a request for the bus use right.

Figure 20:
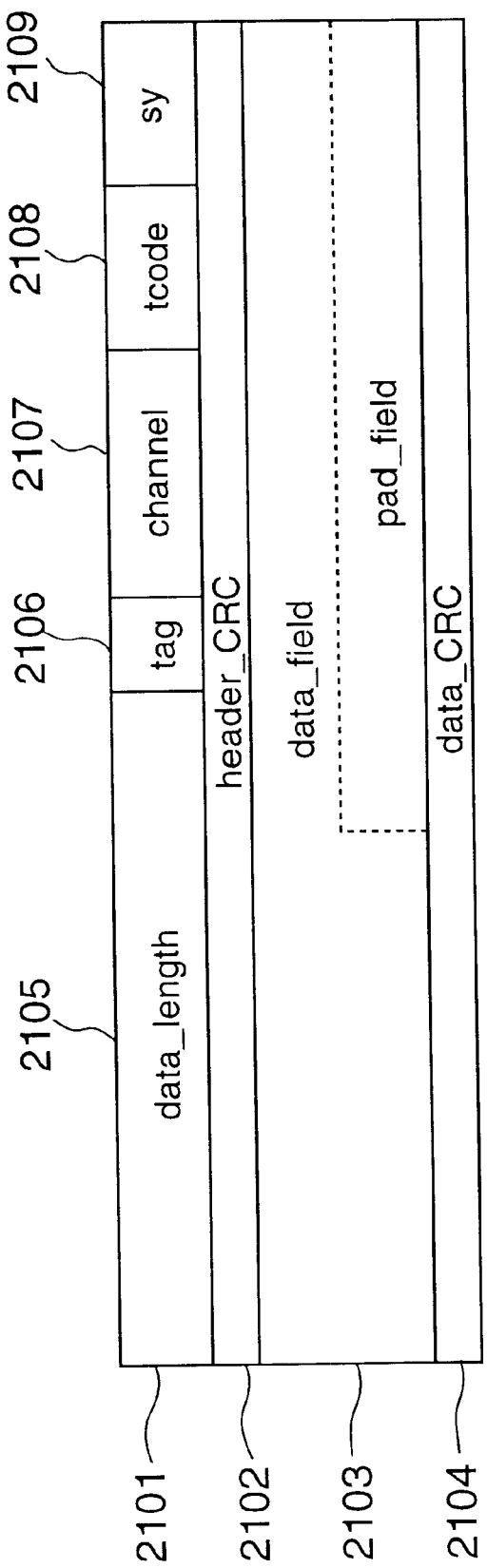
FIG. 20 is a table showing the format of a packet transferred in the isochronous transfer mode.

FIG. 20 shows the format of a packet transferred in the isochronous transfer mode. Hereinbelow, the packet transferred in the isochronous transfer mode will be referred to as an "isochronous packet".

In FIG. 20, the isochronous packet comprises a header 2101, a header CRC 2102, a data field 2103 and a data CRC 2104.

The header 2101 has a data_length field 2105 for storing a data length of data in the data field 2103, a tag field 2106 for storing format information of the isochronous packet, a channel field 2107 for storing a channel number of the isochronous packet, a tcode field 2108 for storing a transaction code (tcode) to discriminate the format of the packet and processing to be executed, and an sy field 2109 for storing a synchronizing code.

Asynchronous Transfer Mode

The asynchronous transfer mode is asynchronous-type transfer mode. The asynchronous transfer can be performed during a period between an isochronous transfer period and start of the next communication cycle, i.e., before transfer of cycle start packet (CSP) of the next communication cycle.

In the communication cycle of FIG. 19, the initial subaction gap indicates an bus idle status. When the idle status has continued for a predetermined period, a node to perform the isochronous transfer determines that the bus can be used, and makes a request for the bus use right.

Figure 21:
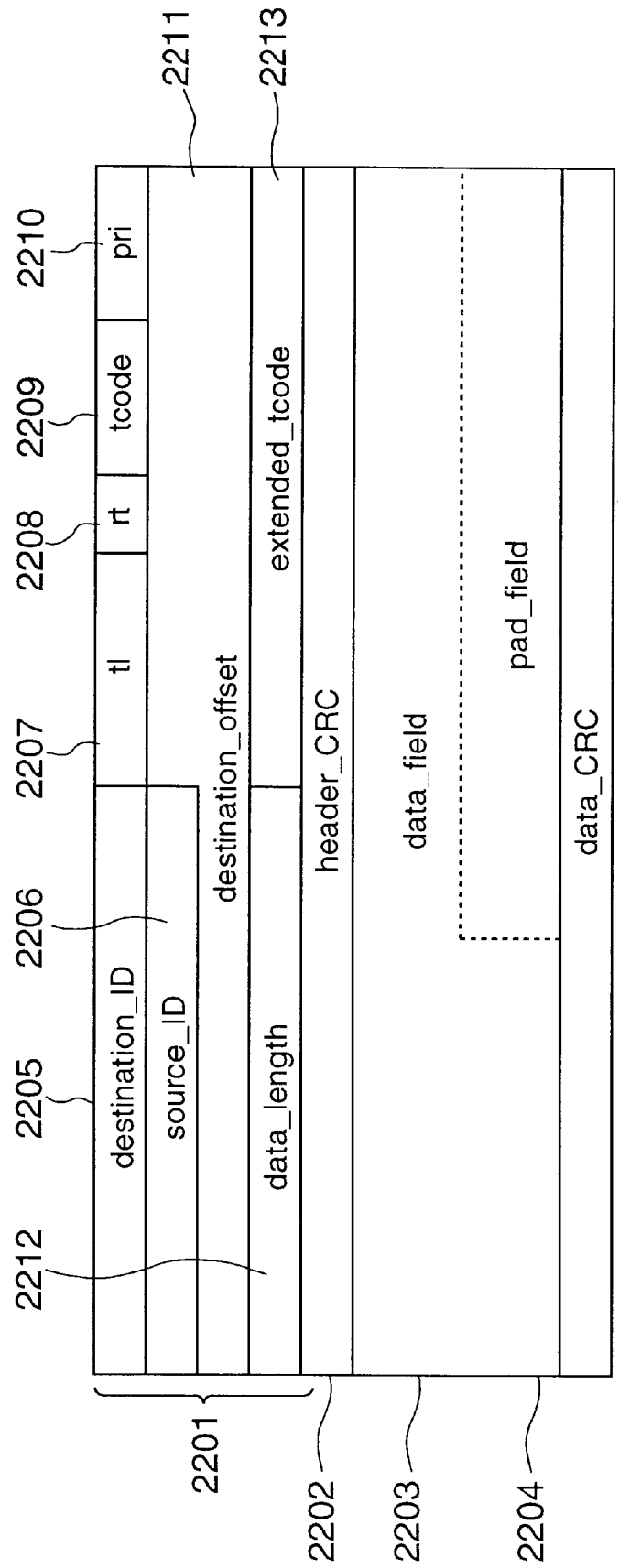
FIG. 21 is a table showing the format of a packet transferred in the asynchronous transfer mode.

The node obtains the bus use right from the arbitration, and transmits a packet as shown in FIG. 21 to a predetermined node. The predetermined node receives the packet, and returns the ack code or a response packet after an acknowledge gap (ack gap).

FIG. 21 shows the format of a packet transferred in the asynchronous transfer mode. Hereinbelow, the packet transferred in the asynchronous transfer mode will be referred to as an "asynchronous packet".

In FIG. 21, the asynchronous packet comprises a header 2201, a header CRC 2202, a data field 2203 and a data CRC 2204.

The header 2201 has a destination_ID field 2205 for storing a node ID of a packet destination node, a source_ID field 2206 for storing a node ID of a packet source node, a t1 field 2207 for storing a label indicative of a series of transactions, an rt field 2208 for storing a code indicative of a retransmission status, a tcode field 2209 for storing a transaction code (tcode) to discriminate the format of the packet and processing to be executed, a pri field 2210 for storing a priority order, a, destination_offset field 2211 for storing a memory address of the destination node, a data-length field 2212 for storing a data length of data in the data field, and an extended_tcode field 2213 for storing an extended transaction code.

The asynchronous transfer is one-to-one communication from a node to another node. A packet transmitted from a source node is sent to the respective nodes in the 1394 network. However, as each node ignores packets other than a packet addressed to the node itself, only the destination node reads the packet.

Note that during the asynchronous transfer, if time to transfer the next CSP comes, the asynchronous transfer is not forcibly suspended, but the next CSP is transmitted after the completion of the transfer. By this arrangement, when one communication cycle continues for 125 μs or longer, the next communication cycle is reduced by the extended communication cycle. Accordingly, the 1394 network can maintain approximately constant communication cycles.

Preparation for Device Map Generation

The construction and functions of the network using the 1394 serial bus are as described above. Hereinbelow, the outline of a method of preparation for a device map generation will be described.

To generate a device map by application software, the 1394 serial bus comprises the following means for obtaining the connection topology of the 1394 network:
(1) Means for reading a topology map register of a bus manager
(2) Means for reasoning the topology from self ID packets upon bus reset By the above means, the topology in 1394 cable connection order can be known from the parent-child relation of the respective nodes, however, the topology of physical positional relation cannot be known. Further, even uninstalled ports are known.

Further, means having information to generate a topology map as a data base other than the configuration ROM may be provided. In such case, the means for obtaining the various information depends on a protocol for data base access, data transfer or the like.

On the other hand, the configuration ROM itself and the function for reading the configuration ROM are necessarily installed in a device adapted to or based on the IEEE 1394 standard. Accordingly, by storing information on device position, device function and the like in the configuration ROM of the respective nodes, and providing a function to read these information from application software, a so-called device map display function can be realized in the application software of the respective node independent of a specific protocol for data base access, data transfer or the like. in the configuration ROM, physical position information or function information can be stored as node unique information, and can be used for realizing the device map display function.

In this manner, the application software reads the information from the configuration ROM of each node, upon bus reset or in response to a request from a user, and obtains the topology of the 1394 network by physical positional relation. Further, the application software obtains the function information of each node with the physical position information of the node by reading the various node information on the functions and the like, described in the configuration ROM.

When the application software obtains the information in the configuration ROM of each node, an application interface (API) is employed to obtain the information in an arbitrary configuration ROM of a designated node. By using this means, the application software on the device on the 1394 network generates various device maps and lists such as a physical topology map and a map of functions of the respective nodes, in accordance with purposes. Further, it is possible for the user to select a device having a necessary function, by using the application software.

First Embodiment

In the present embodiment, in a network using the 1394 serial bus, function information including device unique information is stored into the configuration ROMs of the respective devices connected to the network. Then, the functions of the devices are displayed utilizing the function information stored in the configuration ROMs, in accordance with purposes. Further, a service as application software, to search and determine a connection destination device can be easily realized.

Construction

Figure 22:
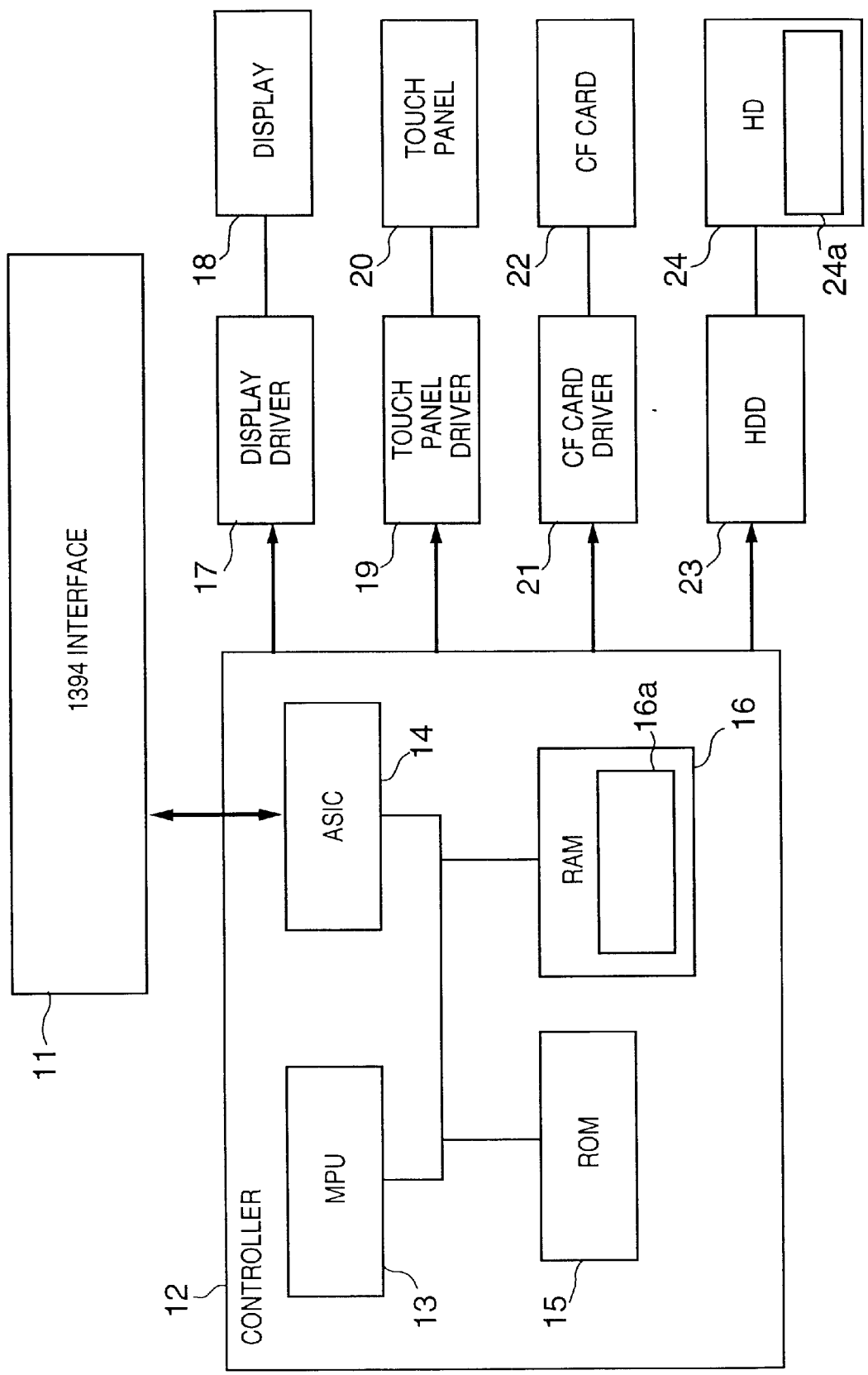
FIG. 22 is a block diagram showing the construction of an image processing apparatus for performing a search and display method according to a first embodiment of the present invention.

FIG. 22 is a block diagram showing an image processing apparatus for performing a search and display method according to a first embodiment of the present invention. In the image processing apparatus, image data obtained by a digital camera or the like is stored via a compact flash (CF) card 22 or a 1394 interface 11 into a predetermined area in a hard disk (HD) 24. Then, the image data stored in lithe HD 24 can be arbitrarily edited by the user by using a display 18 and a touch panel 20. Further, the image processing apparatus has a function to send image data via the 1394 interface 11 to a printer or the like. connected to the 1394 network, so as to print an image represented by the image data, and a selection-candidate generation function for selecting a desired device on the 1394 network.

The display 18, the touch panel 20, the CF card 22, the HD 24 and the 1394 interface 11, and a controller 12 comprising a ROM 15, a RAM 16, an MPU 13, an ASIC 14 and the like, can be freely controlled from higher application software by drivers for these elements or firm software.

Figure 23:
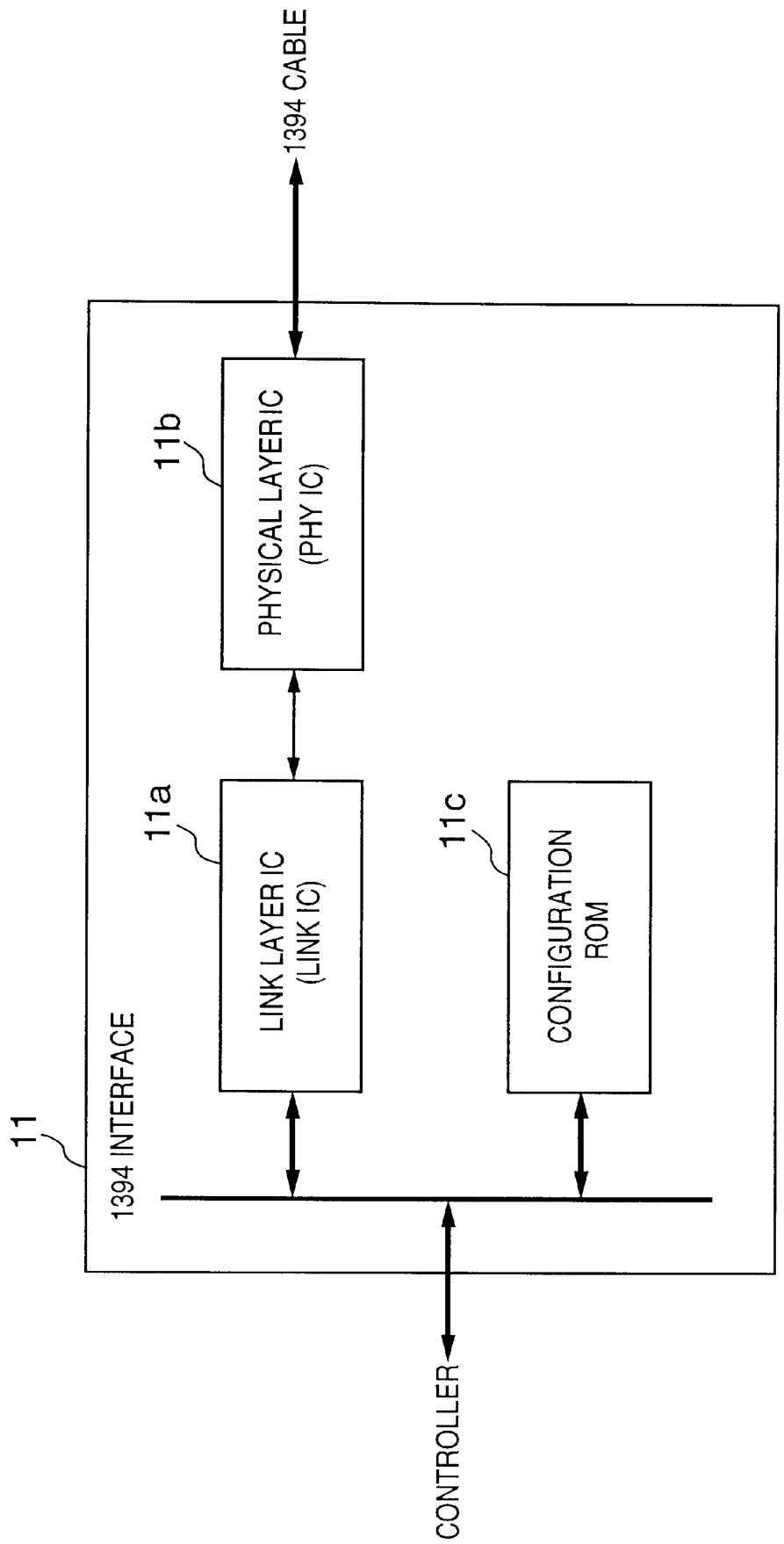
FIG. 23 is a block diagram showing the construction of the 1394 interface in FIG. 22.

FIG. 23 is a block diagram showing the construction of the 1394 interface 11. The 1394 interface 11 comprises a physical layer IC (PHY IC) 11b realizing the physical layer 811, a link layer IC (LINK IC) 11a realizing the link layer 812 and a configuration ROM 11c. The configuration ROM 11c, comprising an EEPROM or the like, which is not writable from outside via the 1394 serial bus cannot be made but rewritable from the MPU 13 of the controller 12.

The application software installed in the image processing apparatus has functions of image editing, printing, selection of a desired device on the 1394 network and the like. The program code of the application software where the above functions are programmed are stored in a predetermined area in the ROM 15 or the HD 24, and developed on the RAM 16 for execution of predetermined processing.

Further, selection setting information, necessary for executing a function to select a desired device on the 1394 network, is stored in a selected setting-information storage area of the HD 24, such that even when the power of the image processing apparatus is turned off, previous information remains. Further, an area 16a, used for storing a necessary variable or for temporary status storage, is ensured in the RAM 16.

Processing

Figure 24:
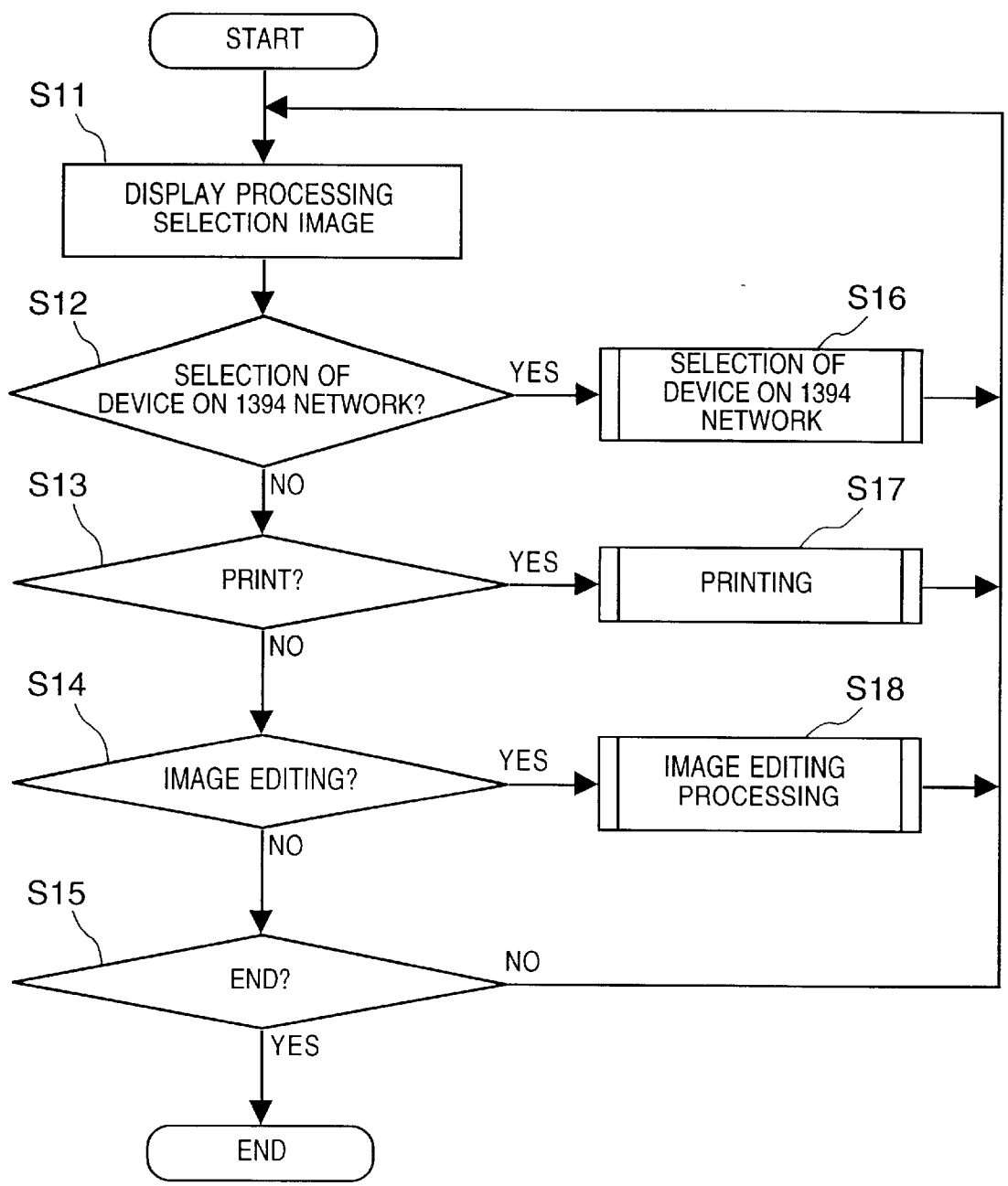
FIG. 24 is a flowchart showing the outline of processing by application software in an image processing apparatus.

FIG. 24 is a flowchart showing the outline of processing by the application software in the image processing apparatus. When the application software is started, a processing selection image is displayed at step S11. The process branches at steps S12 to S15 in accordance with a user's selection. That is, if "selection of device on 1394 network" is selected, "selection of device on 1394 network" is performed at step S16. If "print" is selected, "print processing" is performed at step S17. If "image editing" is selected, "image editing processing" is performed at step S18. Further, if "and" is selected, the application software ends the process. Although not shown in FIG. 24, other processings than the above processings may be provided, and appropriate processing may be performed in accordance with the user's selection.

Selection of Device on Network

Figure 25:
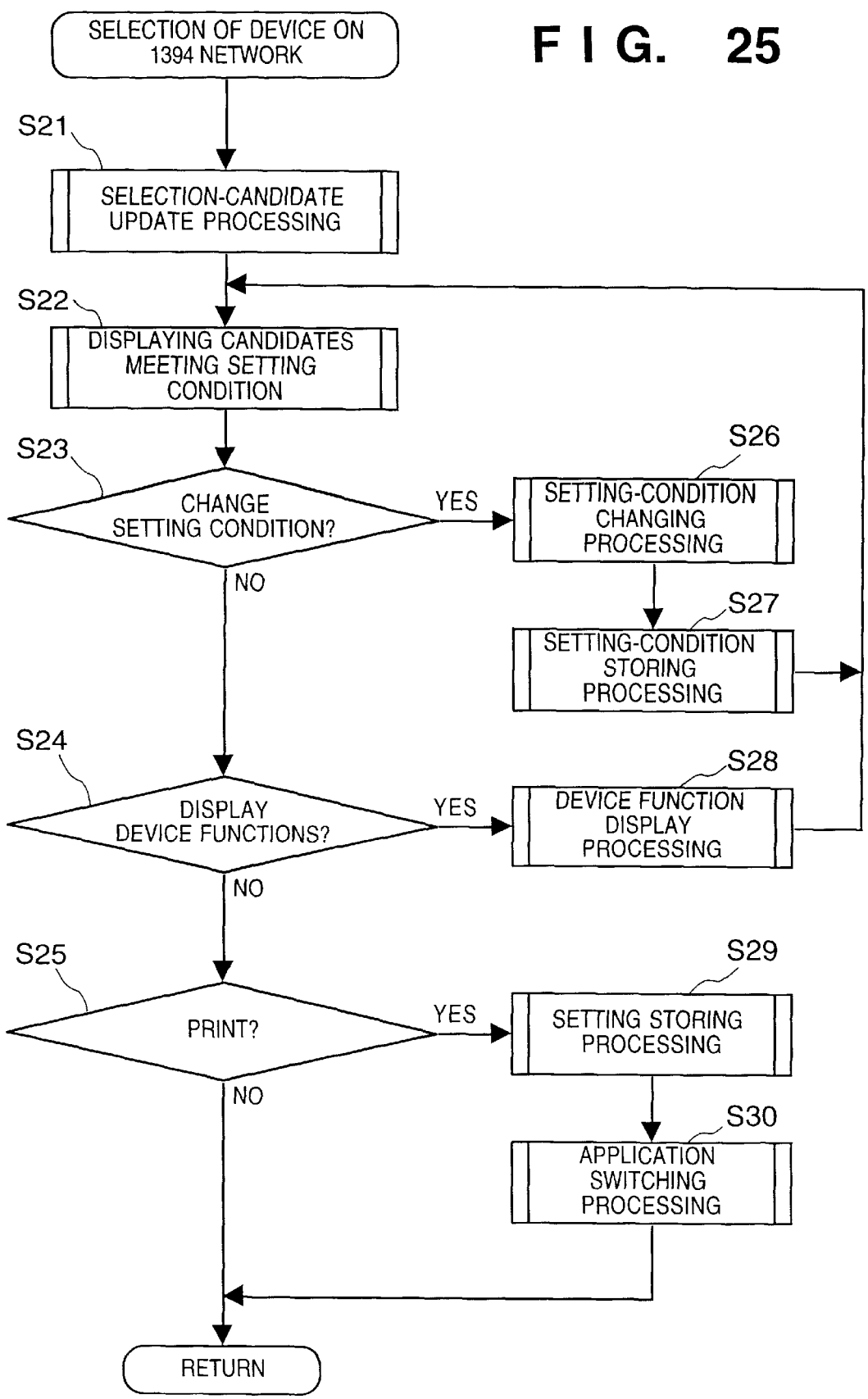
FIG. 25 is a flowchart showing "selection of device on 1394 network"

FIG. 25 is a flowchart showing the processing "selection of device on 1394 network".

Figure 26:
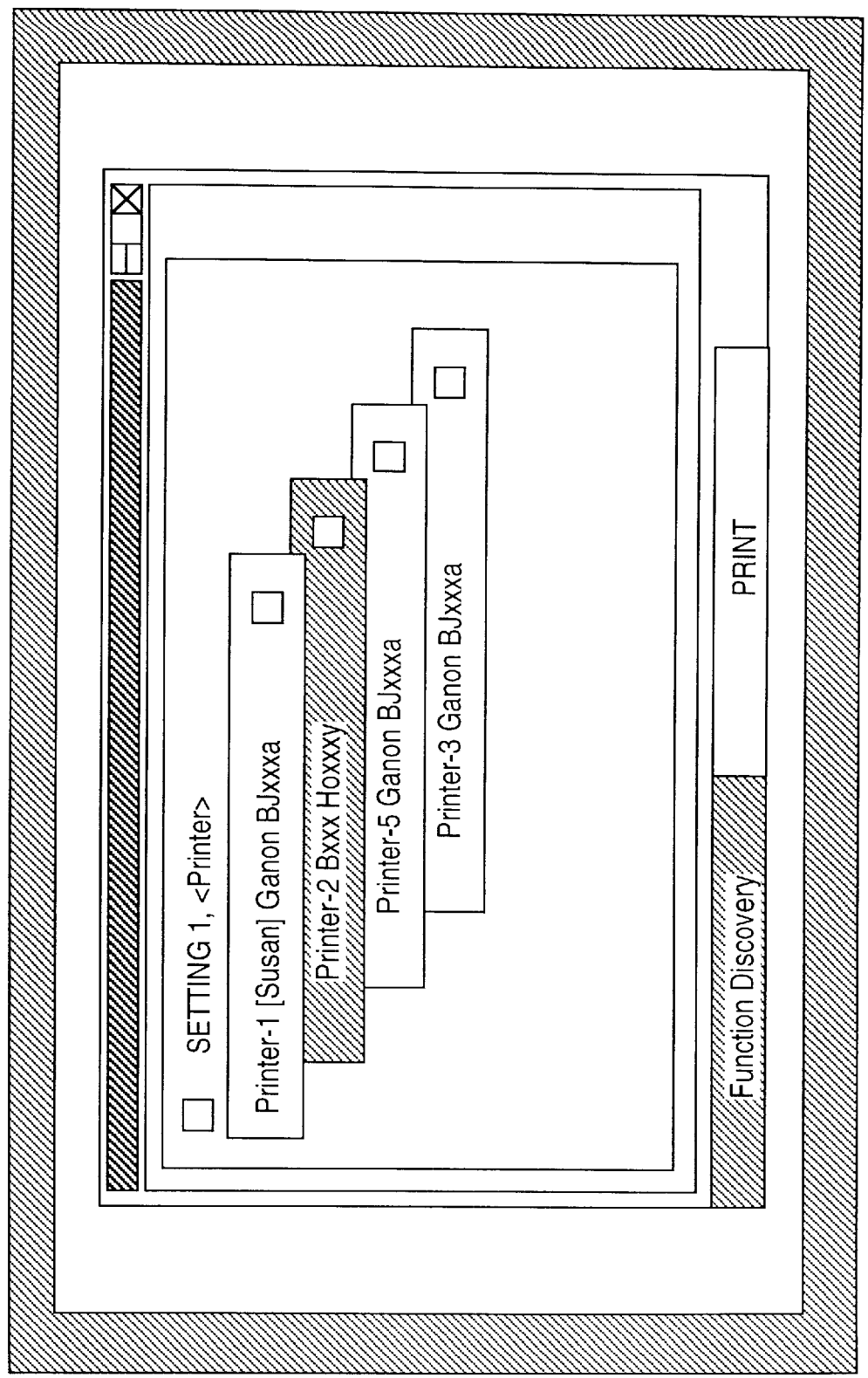
FIG. 26 is an example of a window showing a selection-candidate device list.

In the processing, a device list window showing selection candidates as shown in FIG. 26 is displayed by "selection-candidate update processing" (step S21) to find new devices and "displaying candidates meeting setting condition" (step S22) to display candidates meeting the setting condition. Note that the display in FIG. 26 is an example of device list on a setting condition "printer".

Next, the process branches in accordance with determination at steps S23 to S25, to change the setting condition, to display details of device included in the device list, or to switch the current application software to another application software. Note that switching to another application software means performing processing such as printing by a selected device. Note that in any processing, when the process returns to the main routine as shown in FIG. 24, the setting is stored.

In FIG. 26, if changing of the setting condition is selected by a check box in an upper left position in the window box, "setting-condition changing processing" at step S26 and "setting-condition storage processing" at step S27 are performed. Further, when a check box within a window box to display a device name is selected, "device function display processing" at step S28 is performed. Thereafter, the process returns to step S22, to perform "displaying candidates meeting setting condition" again.

Further, if printing is selected by a "Print" key displayed below the window, "setting storing processing" at step S29 and "application switching processing" at step S30 are performed.

Note that if a close box in an upper right position of the window as shown in FIG. 26 is selected, the "selection of device on 1394 network" terminates, and the process returns to the main routine as shown in FIG. 24.

Print

Figure 27:
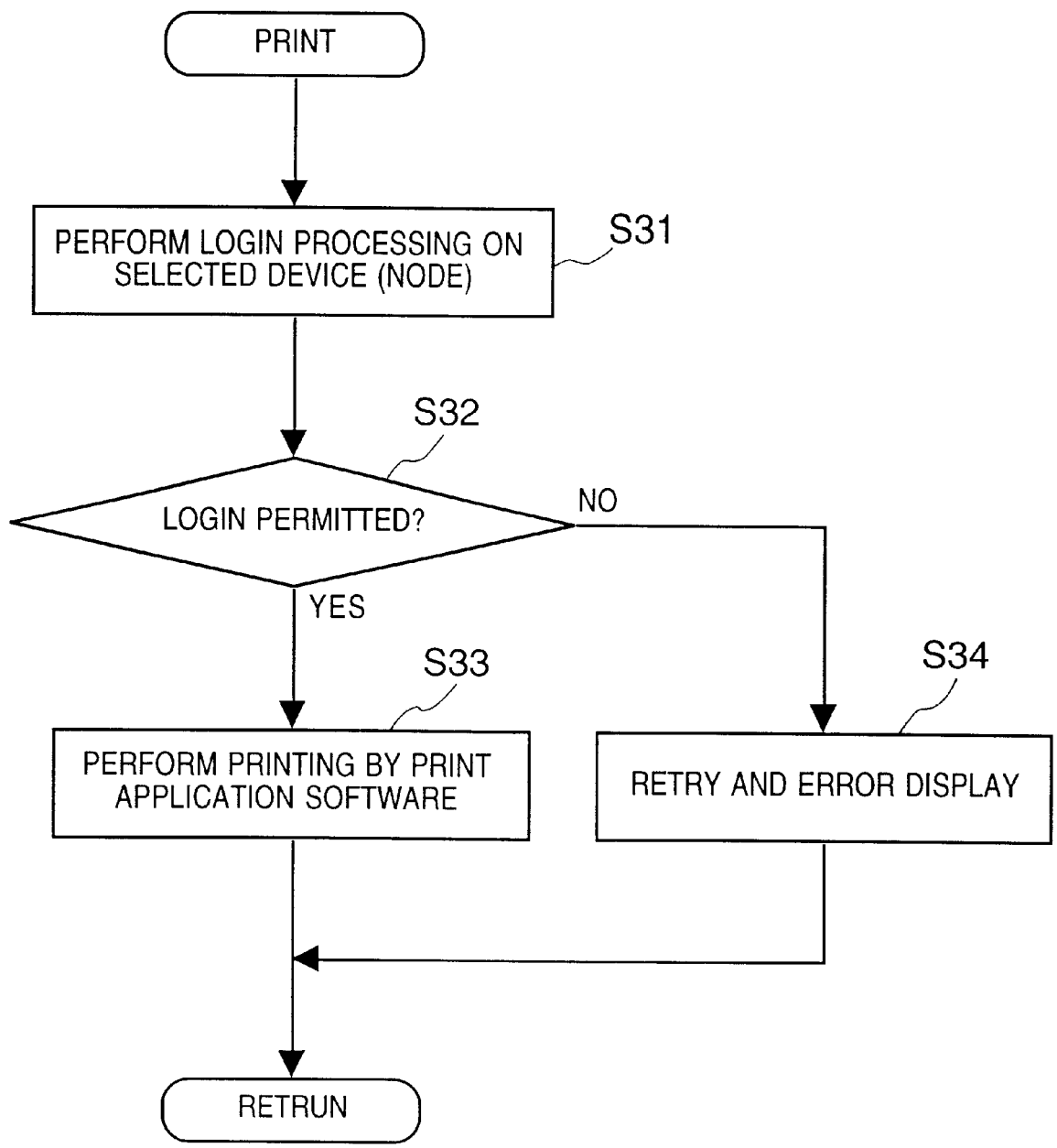
FIG. 27 is a flowchart showing processing for selecting a device from the device list and performing printing.

FIG. 27 is a flowchart showing the processing for selecting a device from the device list and performing printing, corresponding to the processing at step S30 in FIG. 25.

At step S31, to establish connection with a selected device and ensure a communication channel, LOGIN processing is performed on the selected device, and at step S32, it is determined whether or not LOGIN has been permitted. If LOGIN has been permitted, print application software is operated at step S33, to select image data for printing, and perform print processing with the ensured communication channel. If LOGIN has not been permitted, LOGIN processing is retried. If connection is not established, error status is displayed, and the process returns to the routine as shown in FIG. 25.

Update of Selection Candidate

Figure 28:
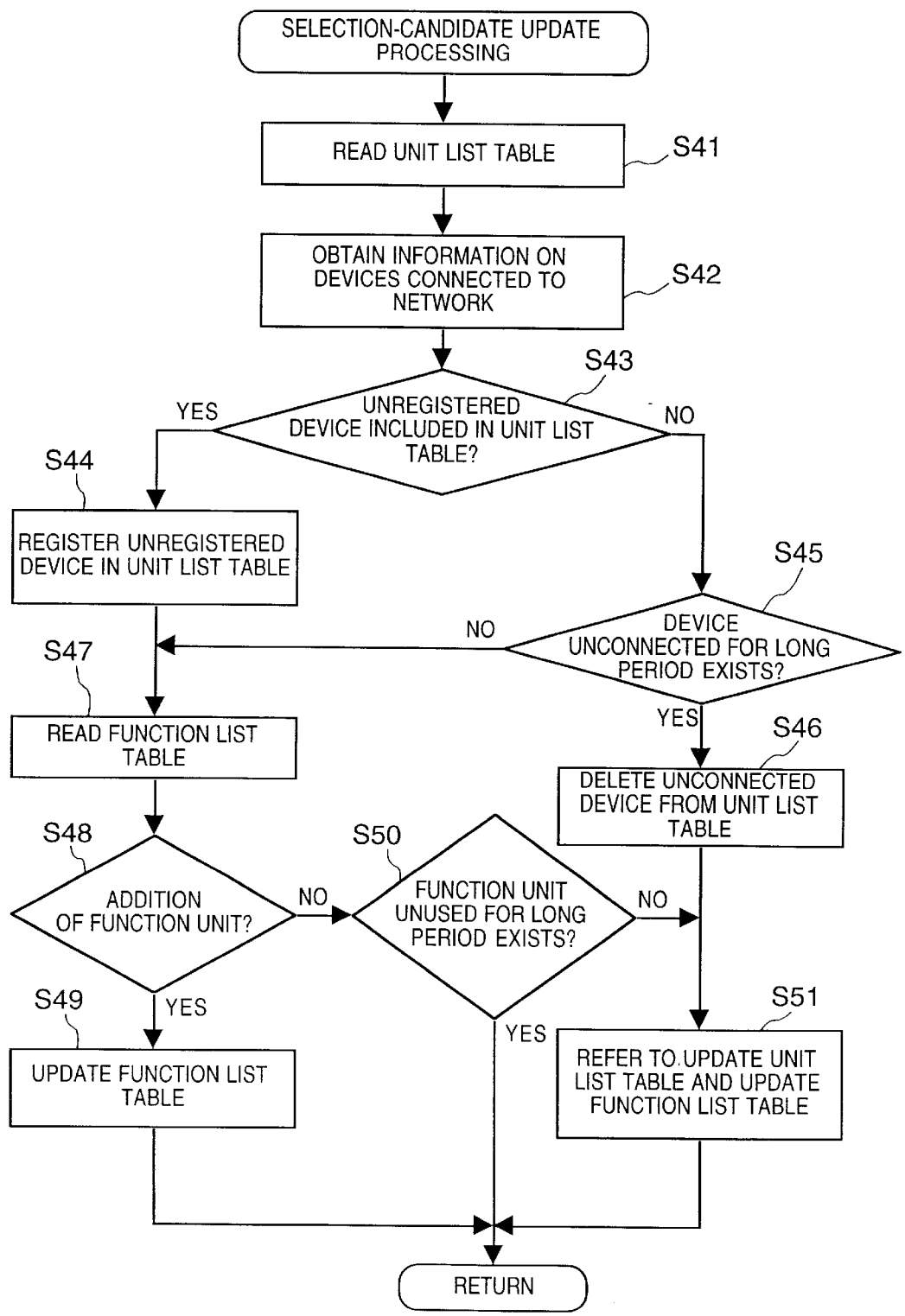
FIG. 28 is a flowchart showing details of "selection-candidate update processing"

FIG. 28 is a flowchart showing details of the "selection-candidate update processing" at step S21 in FIG. 25.

A unit list table previously stored in the HD 24 is read (step S41), and device information is obtained from configuration ROMs of all the devices connected to the 1394 network (step S42). Then, it is determined whether or not there is a device not registered in the unit list table, based on the obtained device information (step S43), and if there is an unregistered device, the information on the device is added to the unit list table (step S44).

Further, if there is no unregistered device, it is examined whether or not there is a device which has not been connected to the network for a long period, among the registered devices (step S45). If there is a device not connected to the network for a long period, the information on the device is deleted from the unit list table (step S46). Note that the unconnected period used as a reference for deletion of device information from the unit list table can be arbitrarily set. For example, it may be arranged such that such information is deleted after a predetermined number of bus reset operations or a predetermined period.

Next, if the information of an unregistered device is added to the unit list table at step S44, or if it is determined at step S45 that there is no device unconnected for a long period, a function list table covering the contents of the configuration ROMs of the devices is read (step S47). Next, it is examined whether or not a function unit is added or updated in the device registered in the unit list table (step S48). If a function unit is addled or updated, the unit list table is referred to, and the function list table is updated based on the new function serial number (#) and information on the function (step S49). Then, the process returns to the routine as shown in FIG. 25.

Further, if there is no additional function unit, it is examined whether or not there is a function unit which has not been used for a long period (step S50). If there is a function unit unused for a long period, the process proceeds to step S51 to be described later. If there is no function unit unused for a long period, the process returns to the routine as shown in FIG. 25.

On the other hand, if the information of an unused device is deleted from the unit list table at step S46, or if there is a function unit which has not been used for a long period, the function list table is read, then the information in the unit list table is referred to, and information relating to the device deleted from the unit list table, or the function serial number of the unused function unit and information on the function are deleted (step S51). Then the process returns to the routine as shown in FIG. 25.

Note that the details of the unit list table and the function list table will be described later.

Display of Selection-Candidates

Figure 29:
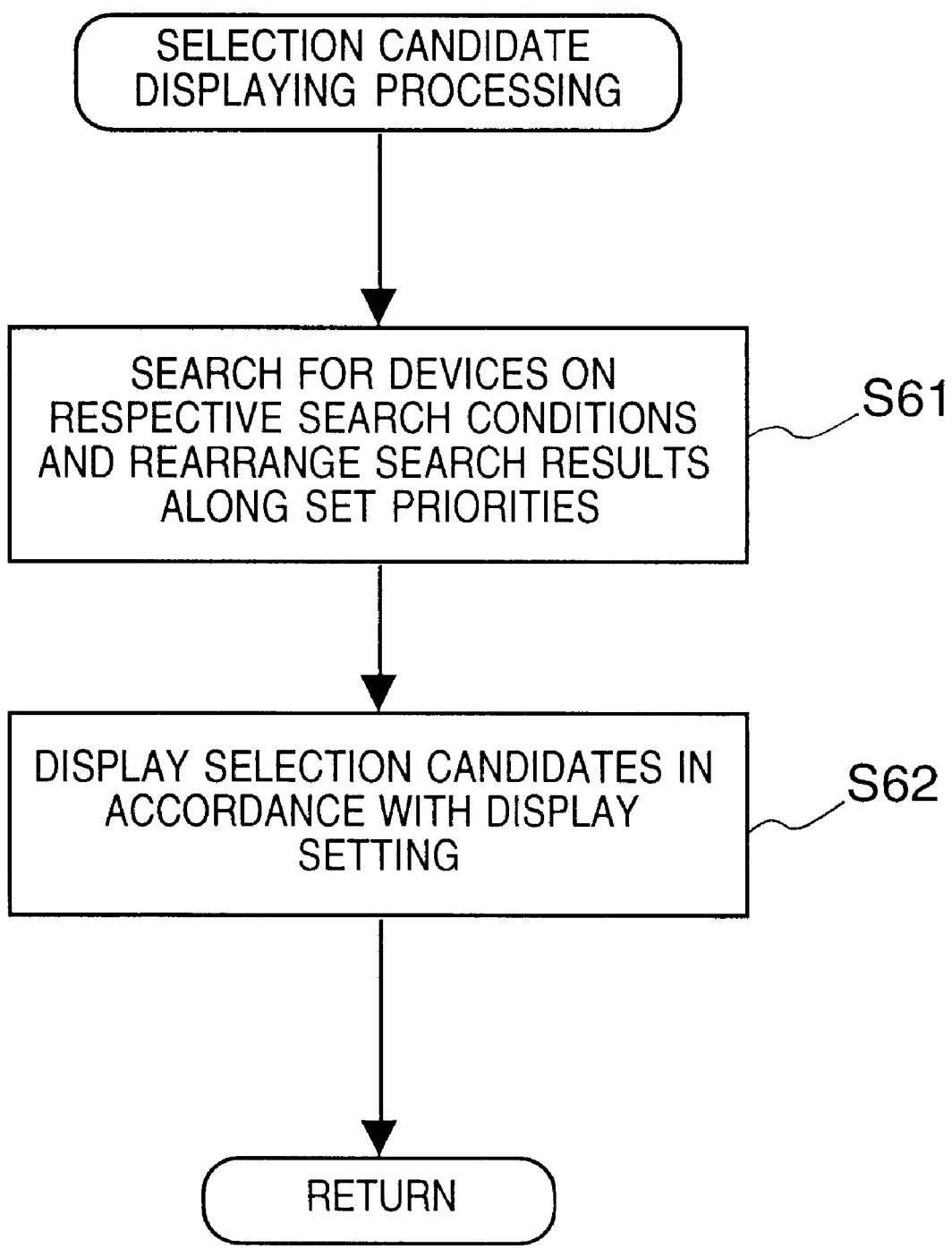
FIG. 29 is a flowchart showing "displaying candidates meeting setting condition"

FIG. 29 is a flowchart showing the "displaying candidates meeting setting condition" at step S22 in FIG. 25. At step S61, search is performed on the devices based on set respective search conditions, and search results are arranged in accordance with a set priority order. At step S62, selection candidates are displayed in accordance with display setting linked to a specific search condition, then the process returns to the routine as shown in FIG. 25.

FIG. 26 shows an example of a window where selection candidates, detected by search on condition "setting 1", are displayed, in accordance with "display setting 1" linked to a search condition "setting 1". In this example, the results of search on condition "printer connected or once-connected", as the search condition "setting 1", are displayed in accordance with a display condition "display in order of frequency of use" set as the "display setting 1".

In the window box shown in FIG. 26, a check box and "Printer" as the search condition of "setting 1" are displayed in an upper left position. The window box includes a plurality of device-based window boxes displayed in the order set on the display condition of "display setting 1" linked to the "setting 1". For example, the top device-based window box "Printer-1" comprises "a general name of a specific function device and a number to specify an individual device" (hereinbelow, simply referred to as a "function-based specific number"), a bracketed ([ ]) "user nickname", "device maker", "model" and a check box. Note that a darkened window box such as "Printer-2" indicates that the device has connected in the past but not connected to the network now.

Further, in window boxes "Printer-5" and "Printer-3", user nicknames are not set, and device makers and models are the same. That is, the "Printer-5" and "Printer-3" are devices of the same model by the same maker. These devices are discriminated only by the function-based specific numbers "printer-5" and "Printer-3".

In this example, as the device-based window boxes are displayed in the order of the frequency of use, it is indicated that the frequency of use is gradually decreases in the order "Printer-1", "Printer-2", "Printer-5" and "Printer-3".

Further, a device-based window box corresponding to "Printer-4" is not displayed in the window box in FIG. 26. This means that the device corresponding to "Printer-4" has not been connected to the network for a predetermined period or longer, or that even if it is physically connected, power is not supplied to the device and connection information, unique setting information, device information and the like have been deleted with the function-based specific number.

Change of Setting Condition

Figure 31:
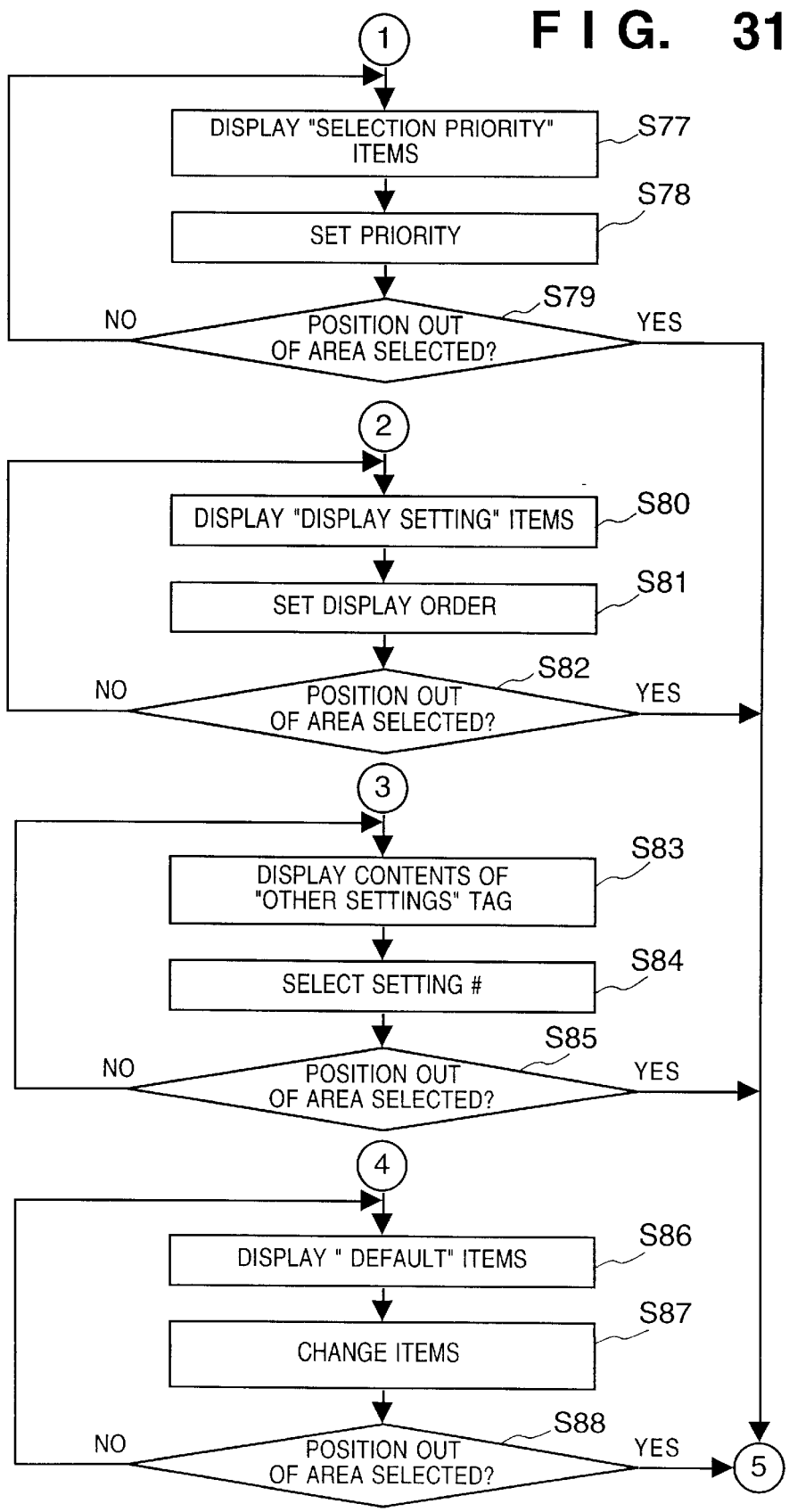

In the window box in FIG. 26, if the check box in the upper left position is checked, setting condition update changing processing as shown in FIGS. 31 and 31 is performed.

At step S71, a setting condition list is read, and the process branches at steps S72 to S76, by the user's operation.

If a "selection priority" tag is selected, an item of selection priority is displayed (See FIG. 32) at step S77, and a priority. is set by the user at step S78. If a position out of. the tag area is selected at step S79, the process proceeds to step S89. Unless a position out of the tag area is selected, the processing at steps S77 to S79 is repeated.

Figure 32:
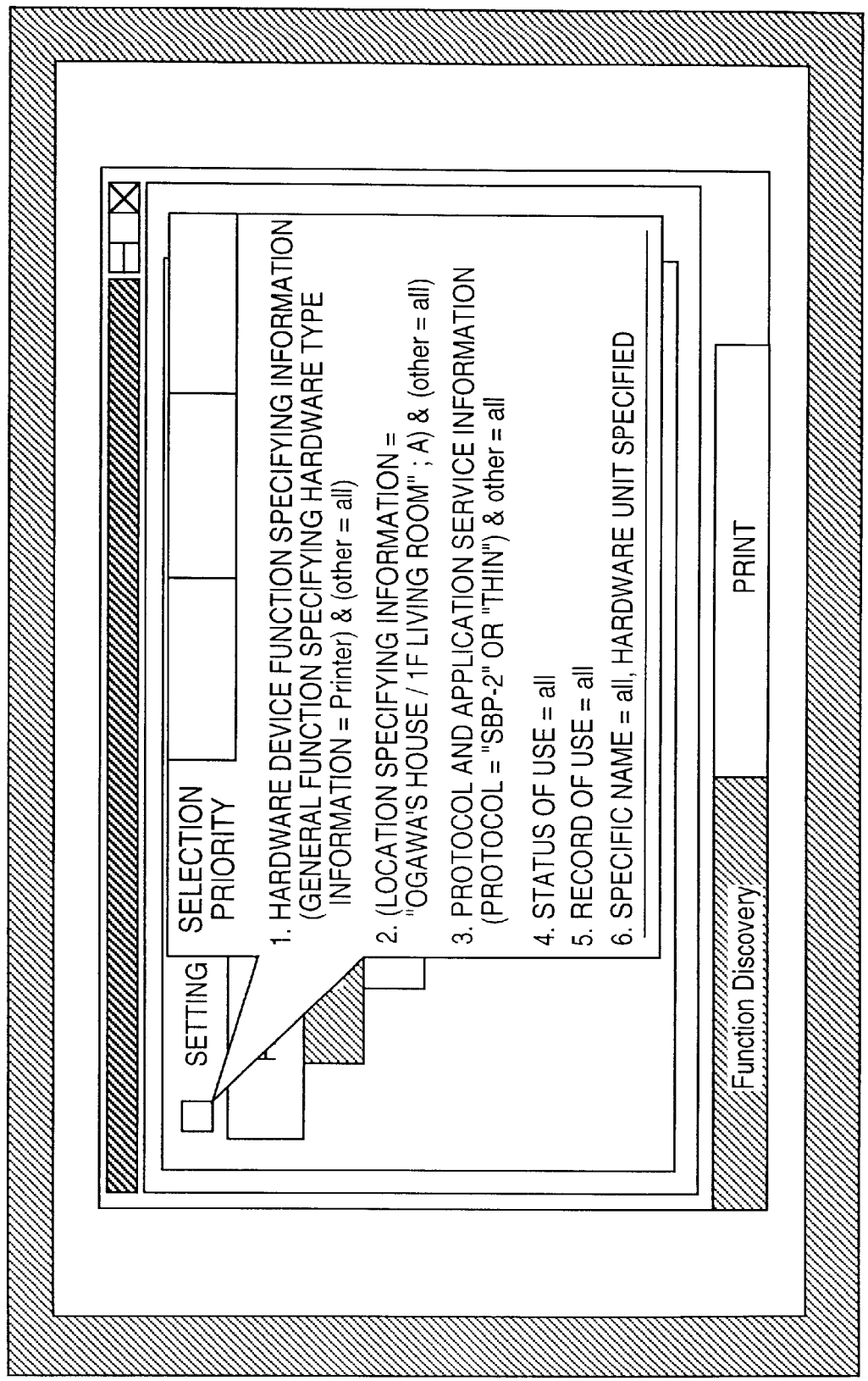
FIG. 32 is;, an example of a pop-up window showing an item of selection priority.

Note that in FIG. 32, the example of selection-priority tag shows priorities as selection items from the highest priority. That is, the first priority is "hardware device function specifying information". In this case, all the "Printer" function hardware are selected. The second priority is "location specifying information". In this case, all the hardware in "Ogawa's house/1F living room (this place is represented as "A" for convenience of display)" are selected. The third priority is "Protocol and application service information" to select all the hardware having protocol "SBP-2" or "Thin". The fourth priority is "status of use, the fifth priority, "record of use", and the sixth priority, "specific name". The fourth to sixth priority are set to cover all, the situations of use, all the records of use, all the specific names.

If a "display, setting" tag is selected, display setting items are displayed at step S80 (See FIG. 33), and the order of display is set by the user at step S81. If a position out of the tag area is selected at step S82, the process proceeds to step S89. Unless a position out of the tag area is selected, the processing at steps S80 to S82 is repeated.

Figure 33:
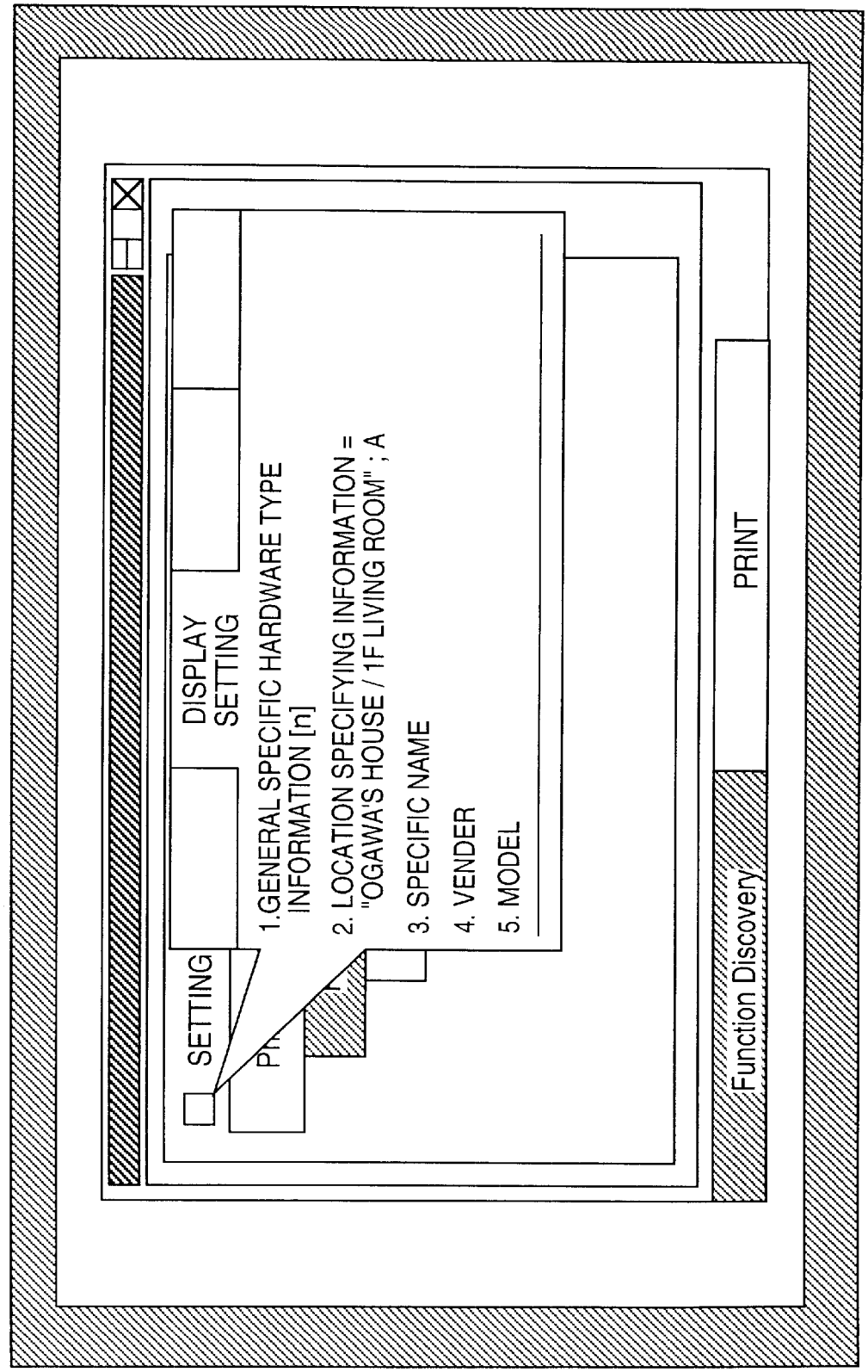
FIG. 33 is an example of a pop-up window showing an item of display setting.

Note that in FIG. 33, the example of display setting tag shows order for displaying items. The first display item is a set of "specific hardware type information" and its individual identification number (n). The second display item is "location specifying information" indicating the place "A". The third display item is "specific name", the fourth display item, Vendor name (VENDOR)", and the fifth display item is "Model name (MODEL)".

Figure 34:
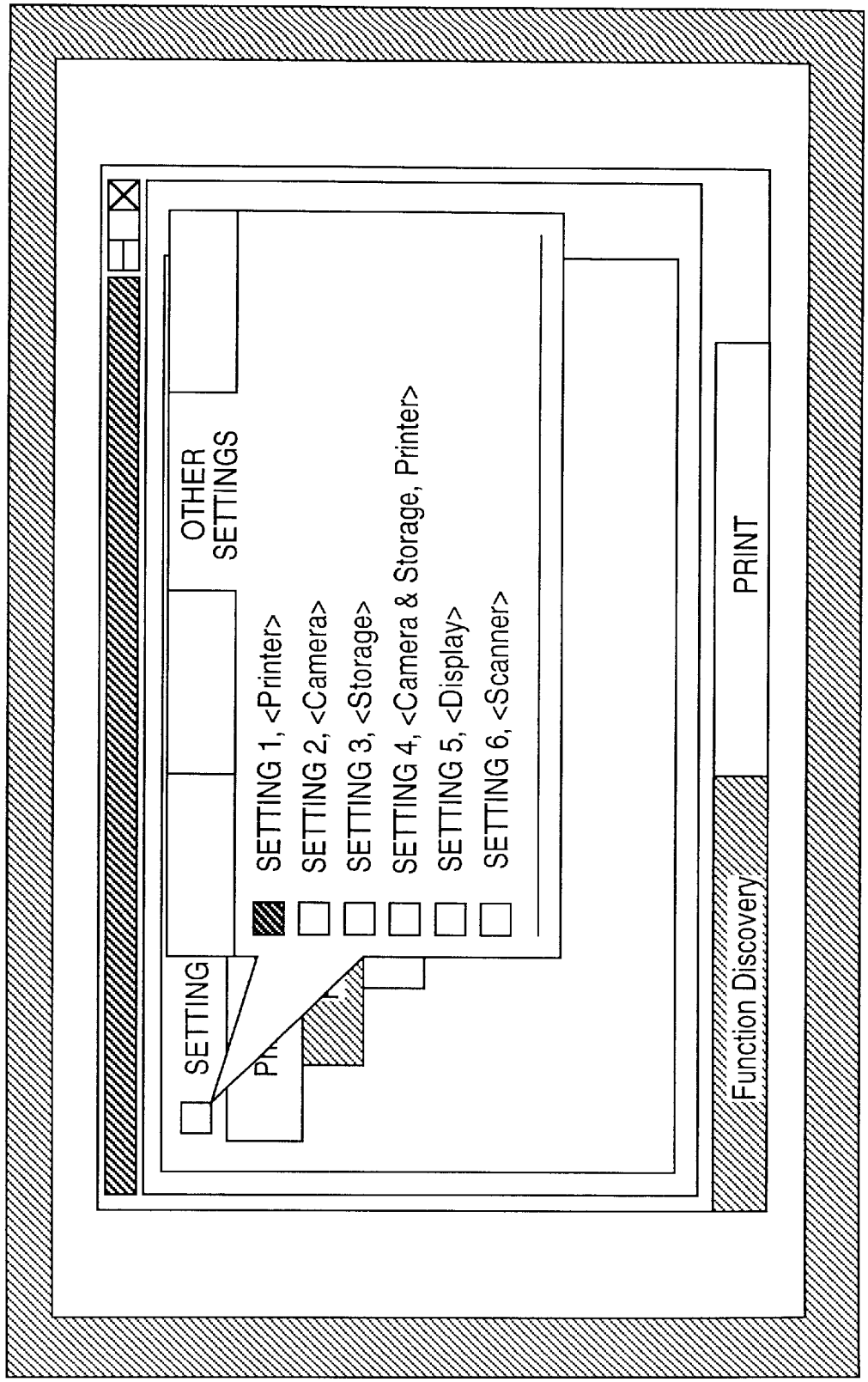
FIG. 34 is an example of a pop-up window showing an item of other settings.

If a "Other settings" tag is selected, items for other settings are displayed at step S83 (See FIG. 34). At step S84, function-based setting number (#) is selected by the user. If a position out of the tag area is selected at step S85, the process proceeds to step S89. Unless a position out of the tag area is selected, the processing at steps S83 to S85 is repeated.

Note that in the example of the "other settings" tag in FIG. 34, a list of setting numbers and corresponding specific hardware type information is displayed. A currently selected "setting number 1" is indicated with an adjacent check box in checked status.

If a "default" tag is selected, default setting items are displayed at step S86 (See FIG. 35), and the items are changed by the user at step S87. If a position out of the tag area is selected at step S88, the process proceeds to step S89. Unless a position out of the tag area is selected, the processing at steps S86 to S89 is repeated.

Figure 35:
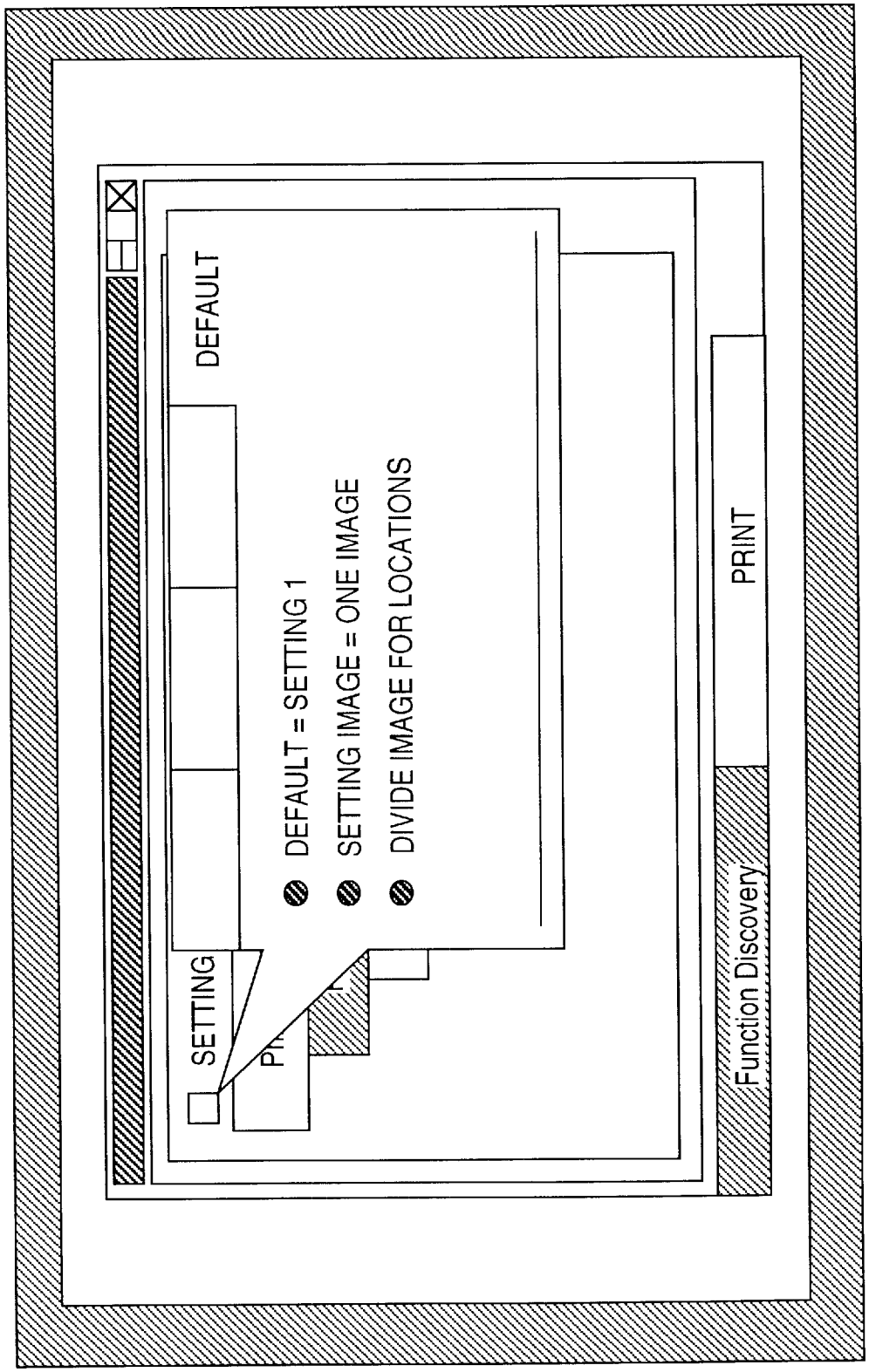
FIG. 35 is an example of a pop-up window showing an item of default settings.

Note that in the example of the "default" tag in FIG. 35, various default settings are displayed. In this default example, "setting 1" is selected. As a setting image, a single image is selected, and division of image for places (for window boxes) is selected.

Further, when an "ESC" key, for example, is depressed, if termination of setting condition changing is instructed from the user, the setting-condition changing processing ends by the determination at step S76.

Next, the user is asked whether or not setting conditions are further changed, and if the user instructs to further change the setting conditions, the process returns to step S72, otherwise, proceeds to step S90 and the subsequent steps, to perform processing for reflection and storage of changed settings (See FIG. 35).

Figure 36:
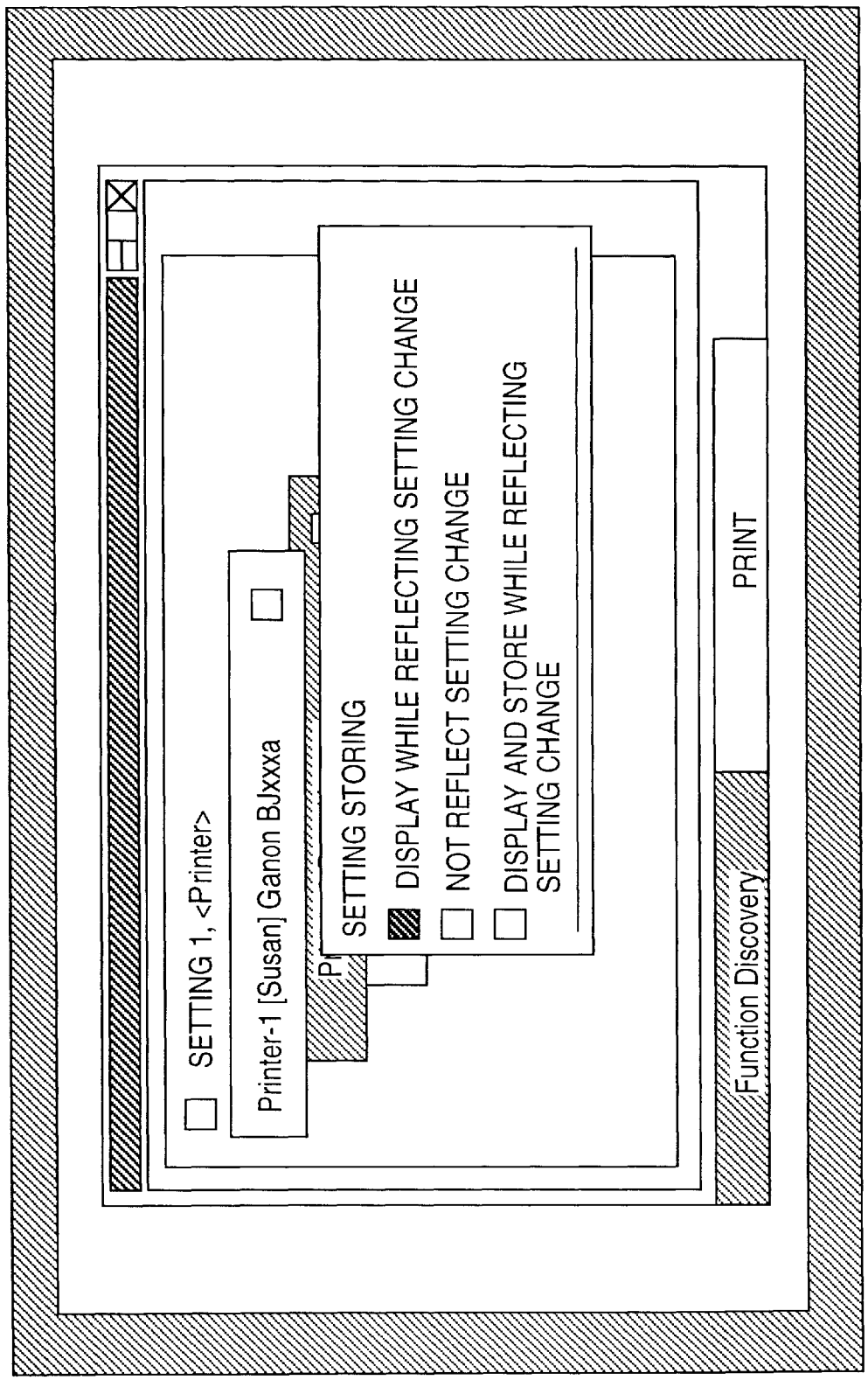
FIG. 36 is an example of a pop-up window showing a setting storing dialog.

That is, in a setting storing dialog as shown in FIG. 36, if "Not reflect setting change" is selected by the user, the setting-condition changing processing is terminated, and the process returns to the routine as shown in FIG. 25. If "display while reflecting setting change" or "display and store while reflecting setting change" is selected, the contents of setting condition list on a work memory area are updated at step S91. If "display and store while reflecting setting change" is selected, the setting condition list on the work area is stored into a storage area 24*a* of the HD 24 at step S93.

When these processings have been completed, the process returns to the routine as shown in FIG. 25.

Display of Device Function

Figure 37:
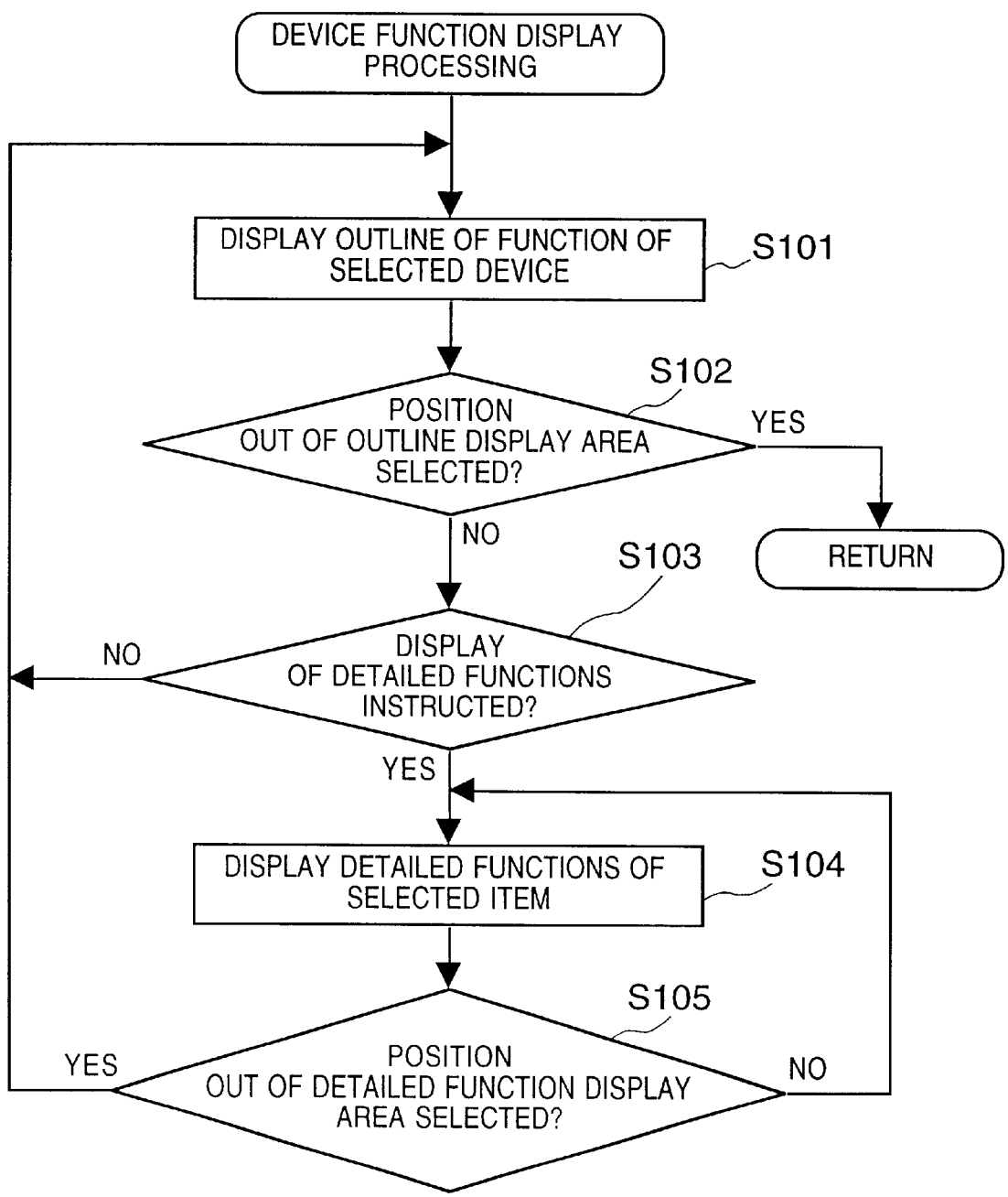
FIG. 37 is a flowchart showing details of function display processing.

In the device list window displaying selection candidates as shown in FIG. 26, if "Printer-#" is clicked, the function of the device is displayed. FIG. 37 is a flowchart showing details of the device function display processing at step S28 in FIG. 25.

Figure 38:
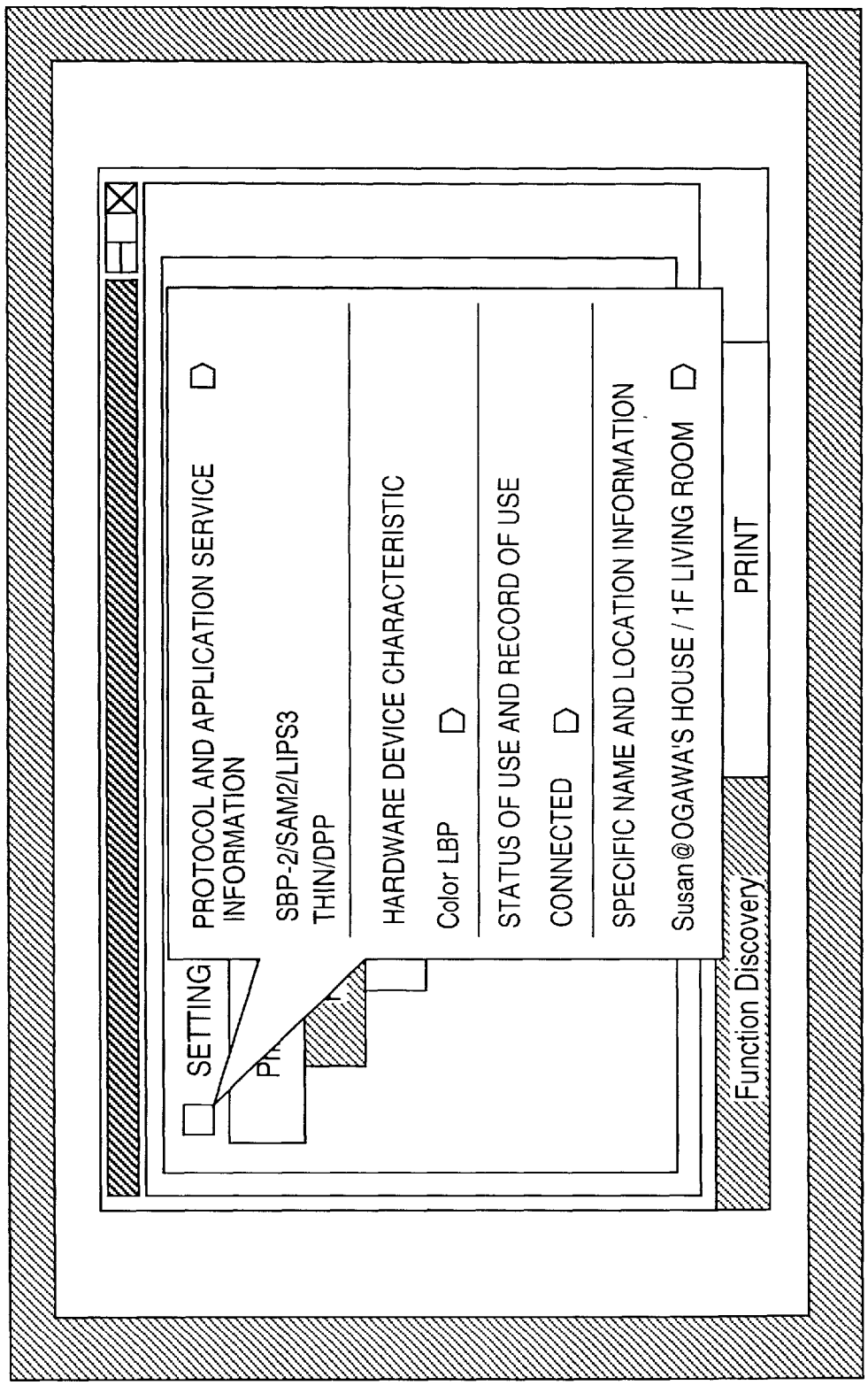
FIG. 38 is an example of a pop-up window showing the outline of functions of a selected device.

At step S101, the outline of the function of a selected device is displayed (See FIG. 38). In a pop-up window as shown in FIG. 38, "protocol and application service information", "hardware device characteristic", "status of use and record of use" and "specific name and location information" are displayed.

In FIG. 38, as the "protocol and application service information", two layer models "SBP-2/SAM2//LIPS3" and "Thin/DPP" are displayed. The former "SBP-2/SAM2/LIPS3" is a layer model using an SCSI SAM2 command on the lower protocol layer SBP-2 and a printer command LIPS3 as A higher application command. The latter "Thin/DPP" is a layer model using a lower protocol layer Thin and a higher application command DPP. The above two layer models are both available in connection with a printer. More specifically, when a printer is specified and print processing is started, one of the layer models is selectively introduced in accordance with application software. Further, in FIG. 37, as the "hardware device characteristic", "Color LBP (color laser-beam printer)" is displayed.

A check box on the right of each item such as "Color LBP" means that further detailed information on the item can be displayed. If the check box is clicked, display of detailed function of the device is selected at step S102, then the unit list table is referred to at step S103, and detailed functions of the designated item is displayed (See FIG. 39).

Figure 39:
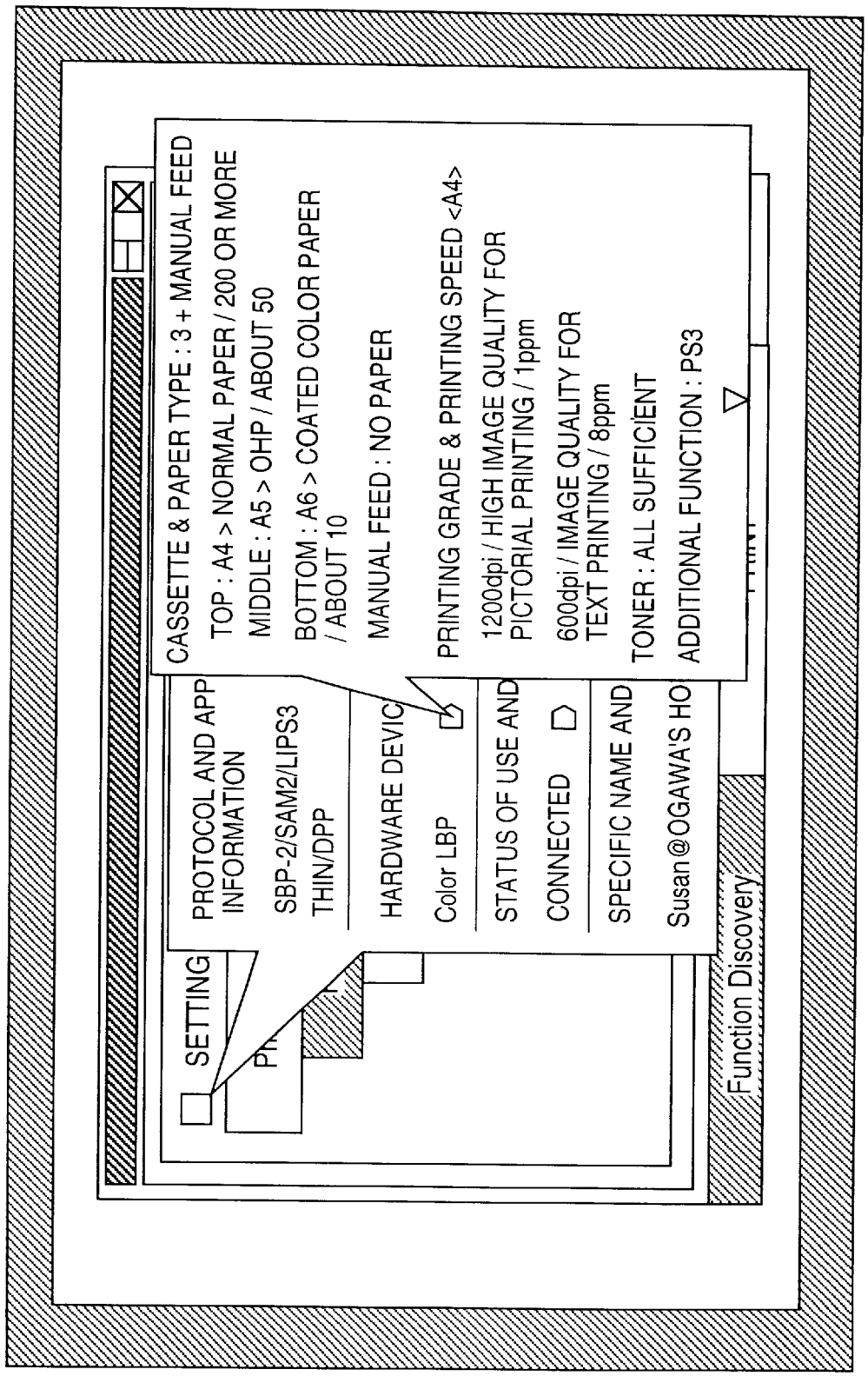
FIG. 39 is an example of a pop-up window showing detailed functions" of a designated item.

FIG. 39 shows a pop-up window in a case where display of detailed functions of the item "Color LBP" is selected. Detailed information on cassettes, printing grade, handling of additional function and the like, are displayed on the pop-up window.

Figure 40:
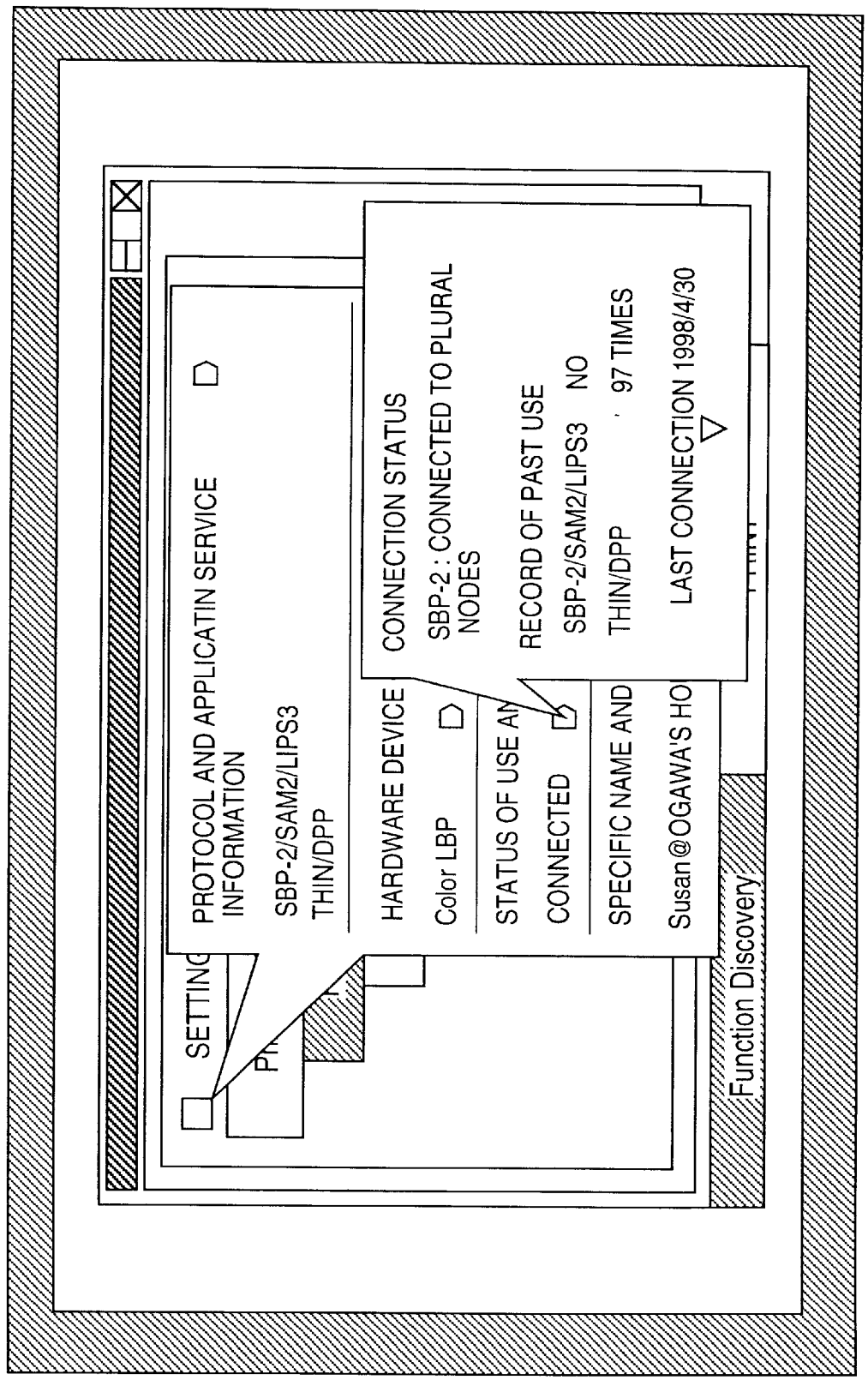
FIG. 40 is a pop-up window showing detailed connection status and record of past use.

Further, in FIG. 38, as "status of use and record of use", the status of the printer is displayed. If a check box adjacent to the status display "connected" is checked, detailed connection situation and the record of past use is displayed on the pop-up window as shown in FIG. 40. Note that if a part of such information cannot be displayed within the pop-up window, a triangle sign "∇" is displayed indicating that there is undisplayed information.

In FIG. 38, as the "specific name and location information", the name of the printer "Susan" and the location "Ogawa's house/1F living" where the printer is set are displayed. Further, If a check box adjacent to this information is checked, the maker of the device, the device model and the like are displayed on the pop-up window, although not shown in FIG. 38.

Note that if a position out of the pop-up window area is clicked, a previous pop-up window is restored or the process returns to the routine as shown in FIG. 25.

Selection of Device

Figure 41:
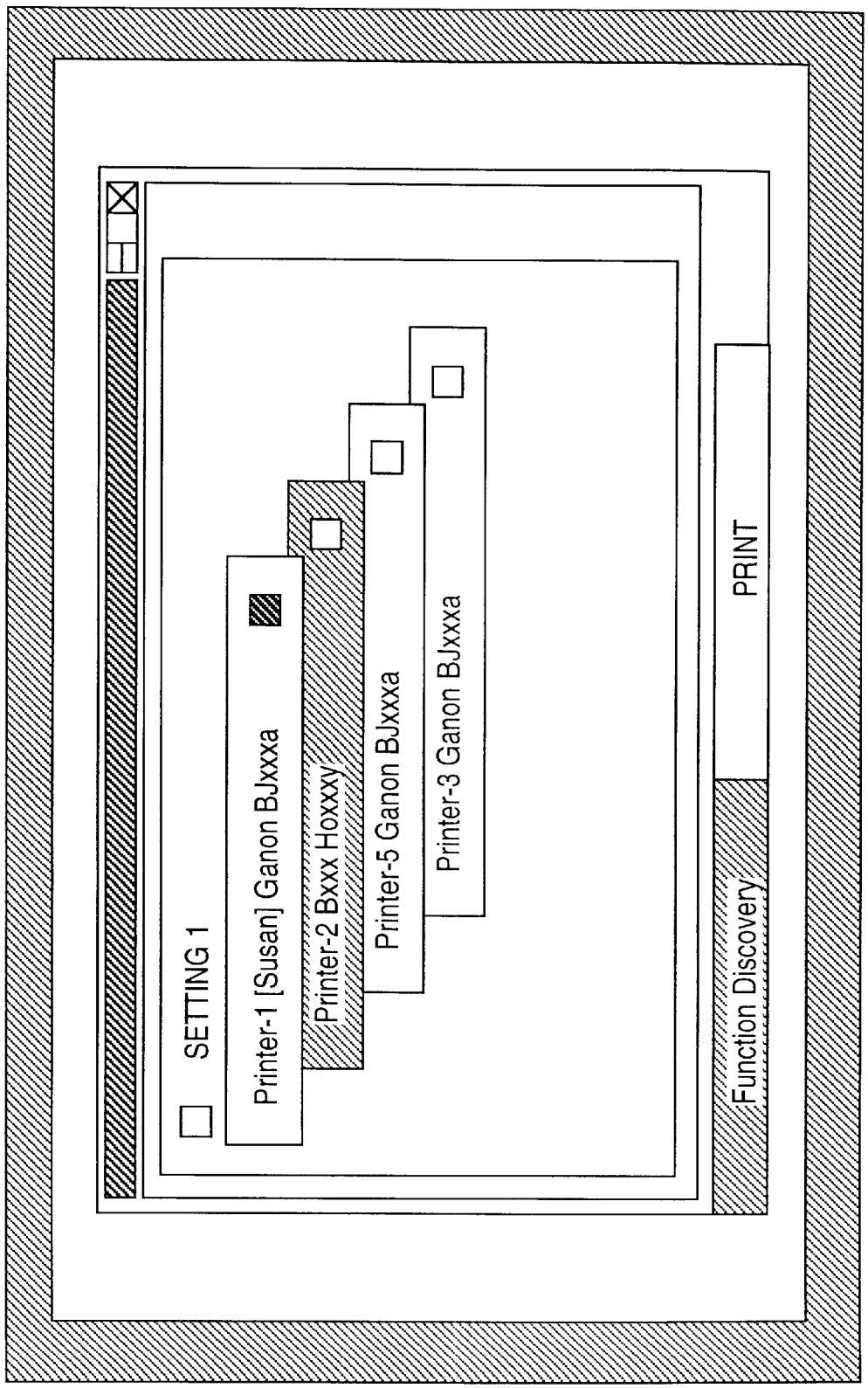
FIG. 41 is an example of window when "Printer-1" is finally selected.

FIG. 41 shows a display example when "Printer-1" is finally selected. If a check box in a right position of the "Printer-1" window box is checked, this device is selected. When print processing is performed in this status, connection is established between the device "Printer-1", then print application software is started, to perform a print procedure.

Display of Selection Candidates

Figure 42:
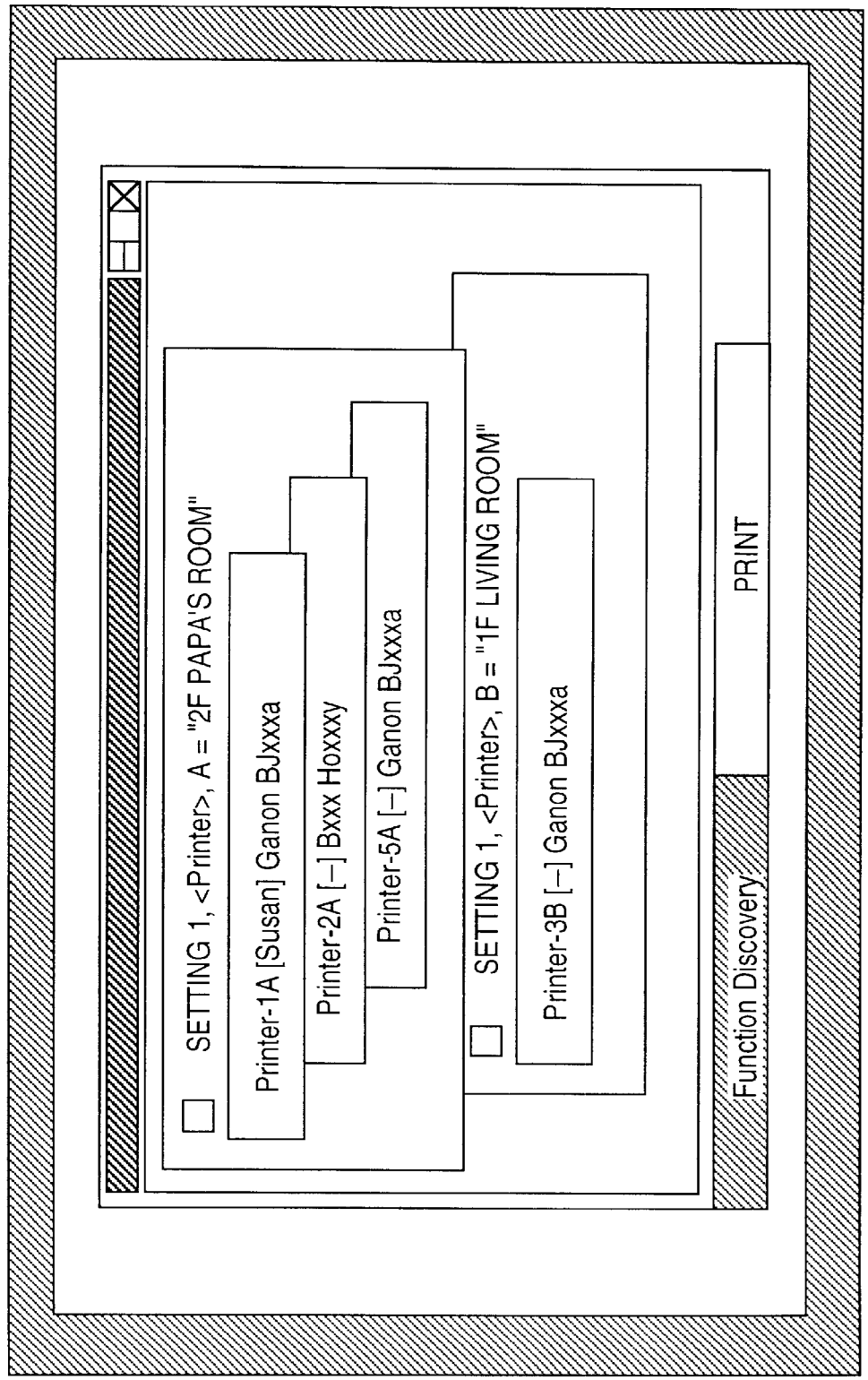
FIG. 42 is an example of window showing selection candidates in setting 1.

FIG. 42 is an example of display of selection candidates in "setting 1". In this example, with respect to the display of selection candidates as shown in FIG. 26, in the display setting tag in FIG. 33, "place specifying information" is changed to "Ogawa's house/1F living room; B or Ogawa's house/2F papa's room; A". That is, as shown in FIG. 35, "divide image for places" is set to default setting, the selection condition in the same setting 1 is used, however, as the location specifying information is separated into "1F living room" and 2F papa's room", the display of selection candidates is divided for locations.

It is understood from the display of selection candidates for "papa's room" in the setting 1 that three printers "Printer-1", "Printer-2" and "Printer-5" are provided in "2F papa's room". Further, it is understood from the display of selection candidates for "1F living room" in the setting 1 that the printer "Printer-3" is provided in "1F living room".

Configuration ROM

Figure 43:
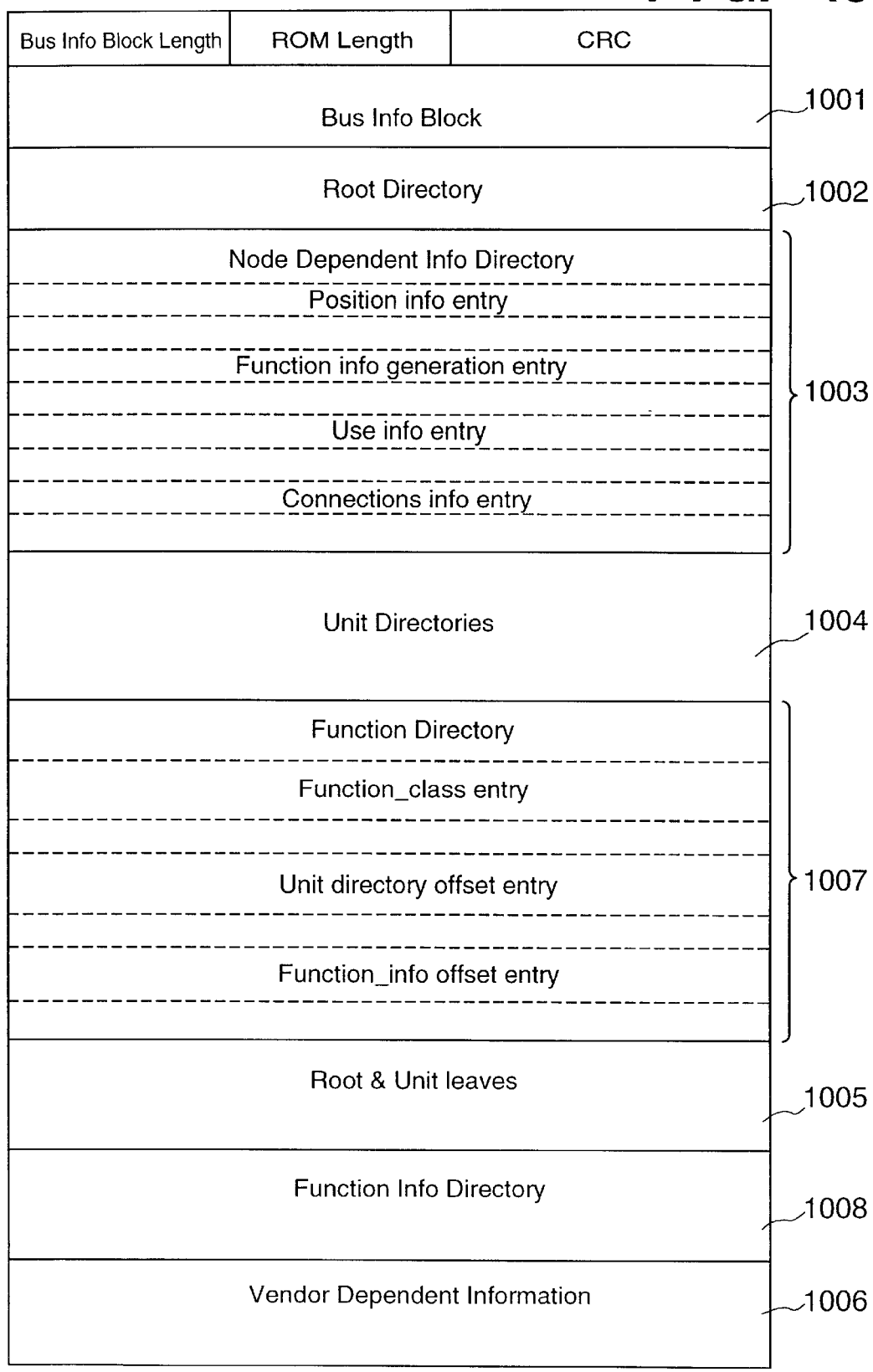
FIG. 43 is a table showing more detailed construction of the general-format configuration ROM.

FIG. 43 is an example of a window displaying more detailed construction of the general-format configuration ROM.

In the configuration ROM, software unit information of each device is stored in the unit directories (Unit Directories) 1004, and node unique information, the node dependent information directory (Node Dependent Info Directory) 1003. Accordingly, information on transport of the device, higher layer and the like is obtained from the software unit information in the unit directories (Unit Directories) 1004.

Further, information on functions such as printer function and scanner function, supported by each device, is stored in a function directory (Function Directory) 1007 as a subdirectory offset from the Root Directory 1002. In the function directory (Function Directory) 1007, pointer information to classification information of pre-classified function category (Function_class entry), pointer information to the unit directories (Unit Directories) 1004 storing the software information corresponding to the respective functions (unit directory offset entry), and information unique to respective functions are stored. Device capability information, i.e., information included in function information (func info.) and lower level information as shown in FIG. 44 are also stored in this directory. Note that FIG. 44 is an example of information of a device included in a function list.

Each of devices according to/corresponding to the present embodiment can store and hold location information of the node, with its node unique information, in a predetermined format, into a position information entry (Position info entry) of the node dependent information directory (Node Dependent Info Directory) 1003 of the configuration ROM.

As shown in FIG. 43, each node can store and hold function change information, with its node unique information, in a predetermined format, in a function information generation entry (Function info generation entry) of the node dependent information directory (Node Dependent Info directory) 1003 of the configuration ROM.

FIGS. 45 and 46 show function list tables in a case where change information is read from the function information generation entry (Function info generation entry) of the node and is listed with other information, based on function IDs.

As shown in FIG. 45, the function information generation entry (Function info generation entry) of each node is set to an initial value "000" after reset. The function information generation entry (Function info generation entry) is rewritable, and the value is updated with change of the function information. That is, referring to FIGS. 45 and 46, in the "Printer-3" as an ink-jet printer, the printer function can be changed to a scanner function by replacing the color print head with a scanner head. At this time, the "Printer-3" changes the function information in its configuration ROM, and increments the Function info generation entry from "000" to "000".

On the other hand, it is understood from another point of view that in FIG. 45, the "Printer-3" and "Scanner-4" have the same OUI-64 value indicative of the same node. Further, as the "Printer-3" is available, while the "Scanner-4" is unavailable and its function information generation entry (Function info generation entry) is "000", the function information is unupdated and the printer function is available.

Next, in FIG. 46, the "Printer-3" and the "Scanner-4", having the same OUI-64 value, both have the function information generation entry (Function info generation entry) "001", meaning that the available function has been changed to the scanner function by function change.

Note that if a function, location and the like are changed, update information notifying the change may be broadcasted to other devices connected to the 1394 network. In this case, a device which has received the update information can update the device map and the function list table only by obtaining device information of the device that has issued the update information.

As shown in FIG. 43, each node can store the status of use and connection status of itself, in a predetermined format, into the use information entry (Use info entry) and the connection information entry (Connection info entry) of the node dependent information directory (Node Dependent Info Directory) 1003 of its configuration ROM. The status of use, connection status and record of use of the node can be obtained by reading these information.

As described above, the configuration ROM as shown in FIG. 43 includes, as well as the device information, location information stored in a position information entry (Position info entry), status of use, connection status and record of use stored in the use information entry (Use info entry) and connection information entry (Connection info entry), protocol and application service information stored in the unit directories (Unit Directories), function change information stored in the function information generation entry (Function info generation entry).

As described above, the function list table managed on the HD 42 and/or RAM 16 can be updated by reading information from the configuration ROM. Further, the function list table as shown in FIGS. 45 and 46 shows details of information actually managed based on function IDs in hierarchical structure.

As described above, according to the present embodiment, if printing is to be performed, a desired printer can be easily and quickly selected.

As described above, according to the present embodiment, in an environment where a plurality of devices are connected to a network using a 1394 serial bus or the like, desired devices can be found and listed by search based on conditions with priorities. Further, on the list, as the devices can be handled with names respectively unique to these devices, even if a plurality of devices of the same model by the same maker are connected to the network, the correspondence between the displayed devices and real devices can be easily obtained.

Further, upon search based on conditions with priorities, a list of devices can be generated and displayed by searching for devices with a plurality of items from the highest priority and arranging the devices from a device which meets the maximum number of items. Accordingly, a user can easily select a device with a higher priority.

Further, as a search range can be designated, the user can easily list up devices upon selection of desired device, and efficiently select a device.

Further, upon search condition setting and display of search results, as devices can be specified by model-based serial numbers and the numbering by the serial numbers can be maintained for a predetermined period, the user can use the same serial number upon device selection, thus can easily select a device.

Further, when the device information, location information or the like is updated, the update information is stored in a predetermined area of the configuration ROM. As it is unnecessary to read all the information from the configuration ROM, the change of device function, condition or the like can be known by only reading the update information, or reading device information, location information or the like indicated by the update information.

Further, when a device map is updated, if device information of a device has been updated, the device map can be updated only by reading the updated device information. This reduces device map update period and greatly reduces the network traffic.

As described above, the first embodiment provides information processing apparatus and method in a network environment where a plurality of devices are connected, which easily and quickly search for a desired device. Further, the embodiment provides information processing apparatus and method which display devices found by search such that a user can easily recognize the devices and easily select a device in accordance with his/her purpose.

Further, information processing apparatus and method, which enable recognition of devices as search results with the same recognition method, can be provided.

Further, information processing apparatus and method in a network environment where a plurality of devices are connected, which enable recognition of change of device function or the like by a simple manner, can be provided. Further, information processing apparatus and method capable of communicating update information upon change of device function or the like can be provided.

Second Embodiment

Figure 47:
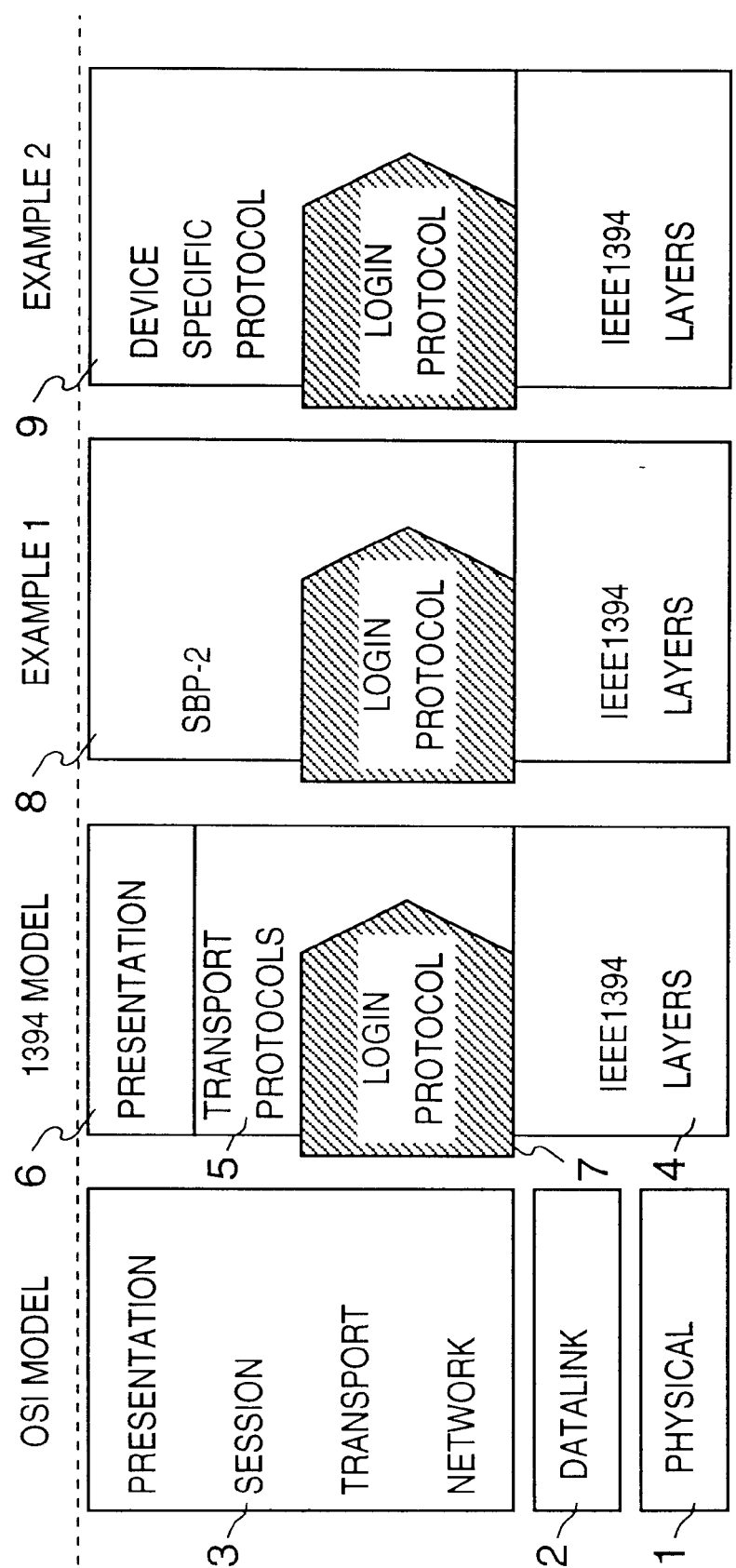
FIG. 47 is a schematic view showing the 1394 interface in comparison with an OSI model.

FIG. 47 shows the 1394 interface in comparison with respective layers of an OSI model often used in a LAN. In the OSI model, a physical layer 1 and a data link layer 2 respectively correspond to the physical layer 811 and the link layer 812 in a lower layer 4 of the 1394 interface. In the 1394 interface, a transport protocol layer 5 and a presentation layer 6 as upper layers correspond to an upper layer 3 of OSI model including a network layer, a transport layer, a session layer and a presentation layer. Further, a LOGIN protocol 7, which is the feature of the present invention, operates between the lower layer 4 and the transport protocol layer 5 of the 1394 interface.

In Example 1 in FIG. 47, by providing the LOGIN protocol 7 to a device based on a serial bus protocol (SBP-2) 8 for a peripheral device such as a printer, the peripheral device uses a protocol based on the protocol SBP-2 to notify a target device of data transfer with the target device. In Example 2, with respect to a device protocol 9 specialized on the 1394 interface, by providing the LOGIN protocol 7 to respective devices, the devices can determine whether or not the target device supports their protocol, with each other.

Figure 48:
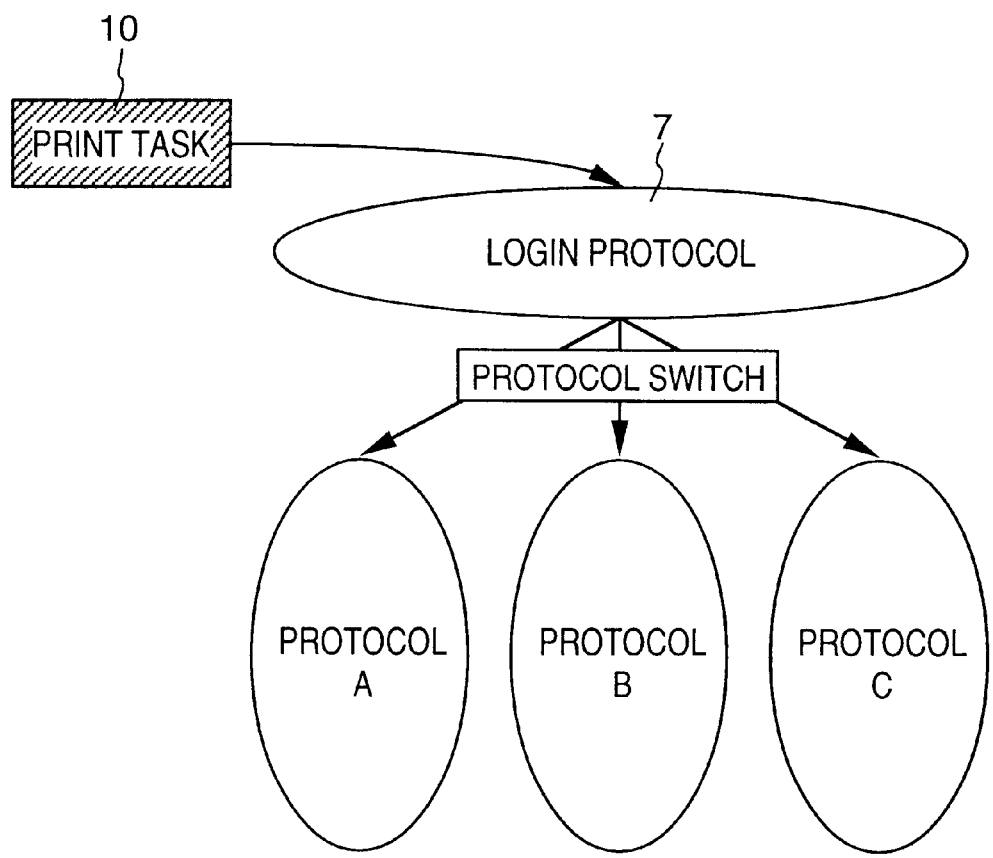
FIG. 48 is an explanatory view showing the basic operation of a LOGIN protocol.

FIG. 48 shows the basic operation of the LOGIN protocol. When a printer device executes a print task 10 from a host device, the printer device first selects one of printer protocols A to C for data communication, based on communication by the LOGIN protocol 7. Thereafter, the printer device performs print data transfer in accordance with the selected printer protocol. That is, upon connection between the printer device which supports a plurality of printer-protocols and a host device, the printer device first judges the transport protocol 5 of the host device based on the LOGIN protocol 7, selects a printer protocol corresponding to the transport protocol 5 of the host device, and performs transfer/reception of print data or commands in accordance with the selected printer protocol, thus performs the print task 10.

Figure 49:
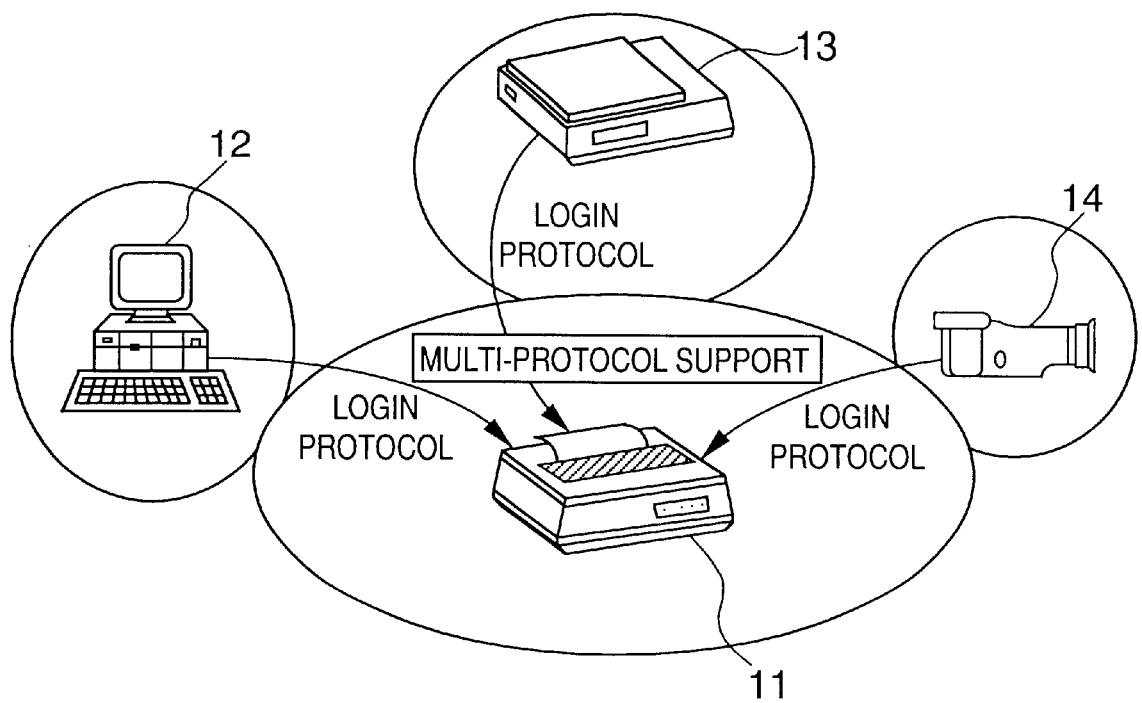
FIG. 49 is an explanatory view showing connection status of the 1394 serial bus.

FIG. 49 shows connection status in the 1394 serial bus, where devices (PC 12, scanner 13 and VCR 14 etc.) with the LOGIN protocol 7 are connected to a printer 11 corresponding to plurality of printer protocols. The printer 11 can process print tasks from the respective devices by changing the printer protocol in accordance with the transport protocol 5 of a device that requests connection with the printer device.

Figure 50:
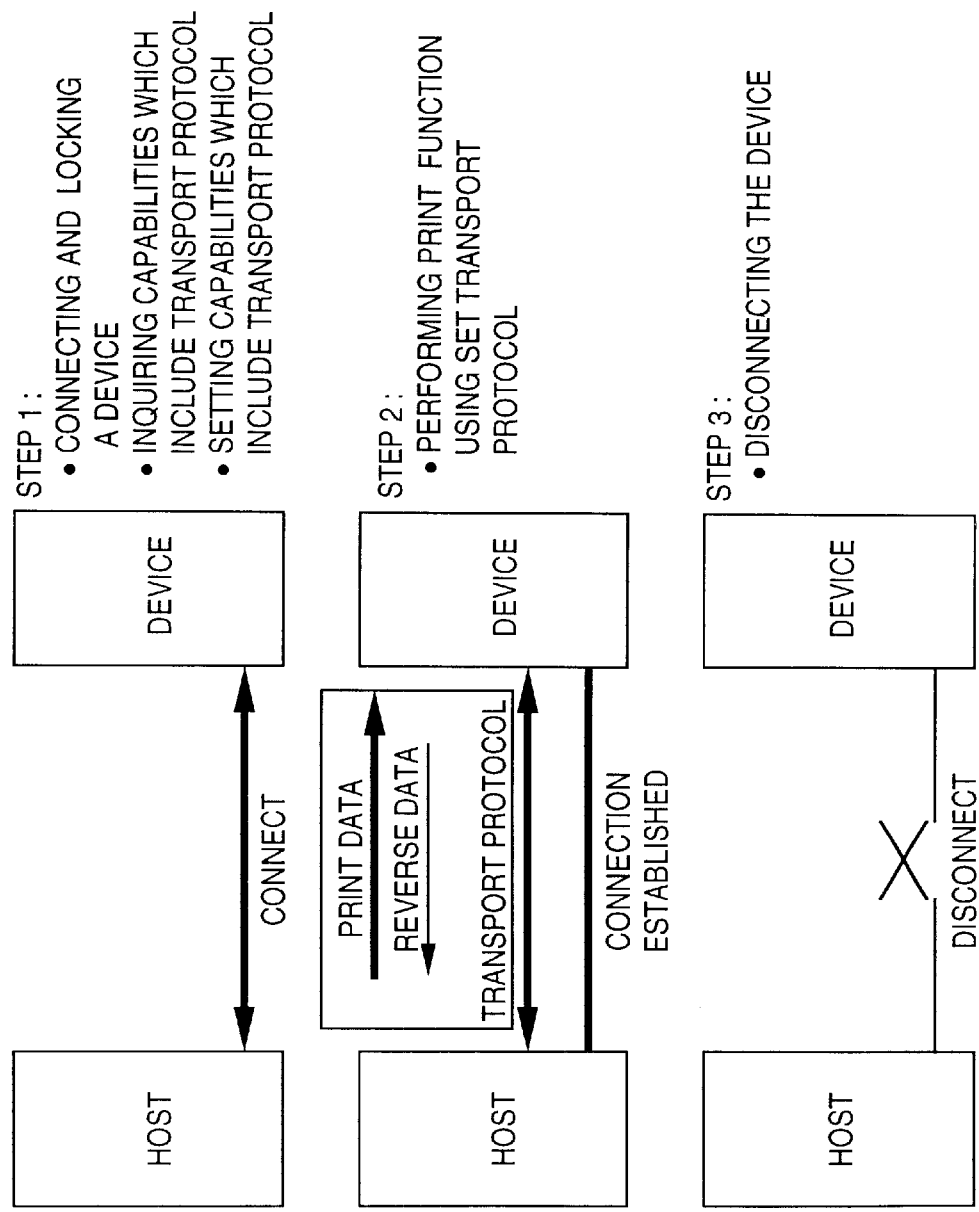
FIG. 50 is a timing chart showing the flow of log-in operation.

FIG. 50 shows the flow of log-in operation.

At STEP 1:

The host device locks a target device (a multi-protocol printer in this case).

The target device examines the capability of the host device (including the transport protocol), and the capability is stored into a register 503 (to be described later).

The target device sets the capability (including the transport protocol) of the host device.

At STEP 2:

Print data is transferred by the protocol determined at the STEP 1.

At STEP 3:

The host device disconnects the connection with the target device.

Figure 51:
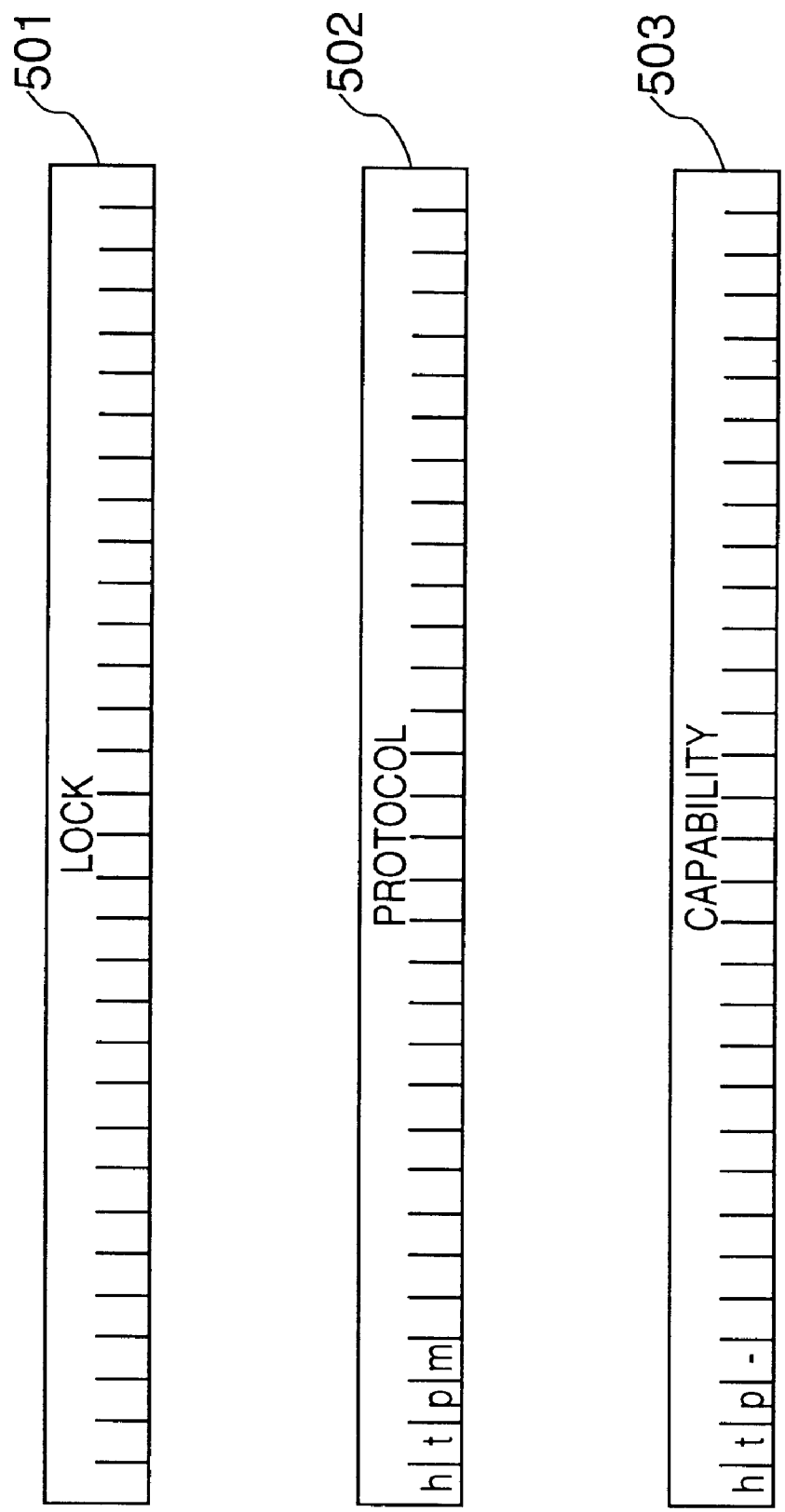
FIG. 51 is a schematic view showing a CSR prepared in a printer for LOGIN processing.

FIG. 51 shows Command-and Status (CSR) which is prepared by a printer as the target device so that the LOGIN protocol is installed, including a lock register 501, a protocol register 502 and the capability register 503. These registers are provided in predetermined addresses in initial unit space in the address space of the 1394 serial bus. That is, as shown in FIG. 5, within the 48-bit address area provided to the devices, "0xFFFFF" in the first 20-bits is called "register space", wherein a register (CSR core) as the core of the CSR architecture is arranged in the first 512 bytes. Note that information common to devices connected via the bus is provided in this register space. Further, "0xFFFFD" is called "memory space", and "0xFFFFE", "private space". The private space is an address which can be freely used in the device for communication among the devices.

The lock register 501 indicates a locked status (exclusively-used status) of a resource, with a value "0" indicative of log-in enable status, and any value but "0", an already-logged-in and locked status. The capability register 503 indicates a protocol which can be set by each bit, with a value "1" bit indicating that a corresponding protocol can be set, while a value "0" bit, that a corresponding protocol cannot be set. The protocol register 502 indicates a currently set protocol, where the value of a bit corresponding to the capability register 503 corresponding to the set protocol is "1".

FIG. 52 shows the format of a printer map (or printer table) in a network constructed with the 1394 serial bus. The printer map contains a unique ID, a node ID, the status and capability of each printer node which has returned a response. The status indicates, e.g., the content of the protocol register 502 in FIG. 51, and the capability, e.g., the content of the capability register 503 in FIG. 51.

FIG. 53 shows the format of the unique ID of a node in the CSR architecture. FIG. 54 shows the format of a printer-map (FIG. 52) generation command. The command is notified to a target device by write transaction of asynchronous packet. The command as shown in FIG. 55 is arranged in this protocol at a predetermined address in the unit space of the target in the 1394 address space.

Figure 55:
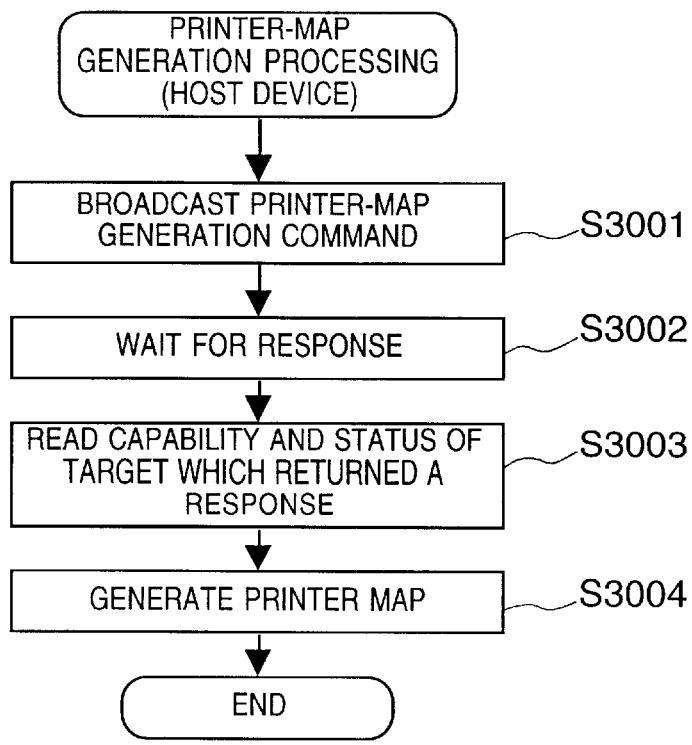
FIG. 55 is a flowchart showing printer-map generation processing performed by a host device.

FIG. 55 is a flowchart showing the printer-map generation processing performed by the host device when a plurality of multi-protocol printers are connected to the network.

Generally, various devices are connected to the network. In this situation, when an initiator (host device) tries printing, it is necessary to find nodes connected to the printer. Further, to obtain appropriate print output, it is very convenient to know the physical position, capability and reserve power of the printer. Then, in this embodiment, the host device examines printers connected to the same network. For example, upon print output, the initiator (host device) obtains information on the physical positions, the capabilities and reserve powers of the printers on the network, (hereinafter also referred to as "topology/capability information") and generates a printer map in advance, then selects a target printer based on the printer map.

Hereinbelow, the printer-map generation processing by the host device will be described with reference to FIG. 55. First, the host device broadcasts the printer-map generation command (FIG. 54) (step S3001) to generate the printer map (FIG. 52), and becomes into waiting status to wait for reception of response commands from the printers as target devices (step S3002).

When the host device receives the response commands from the target devices, it reads the contents of the protocol register 502 and the capability register 503 of the target devices which returned the response commands (step S3003). Then, the host device generates a printer map for the printers currently constructing the network (step S3004), based on the information obtained at step S3003.

Figure 56:
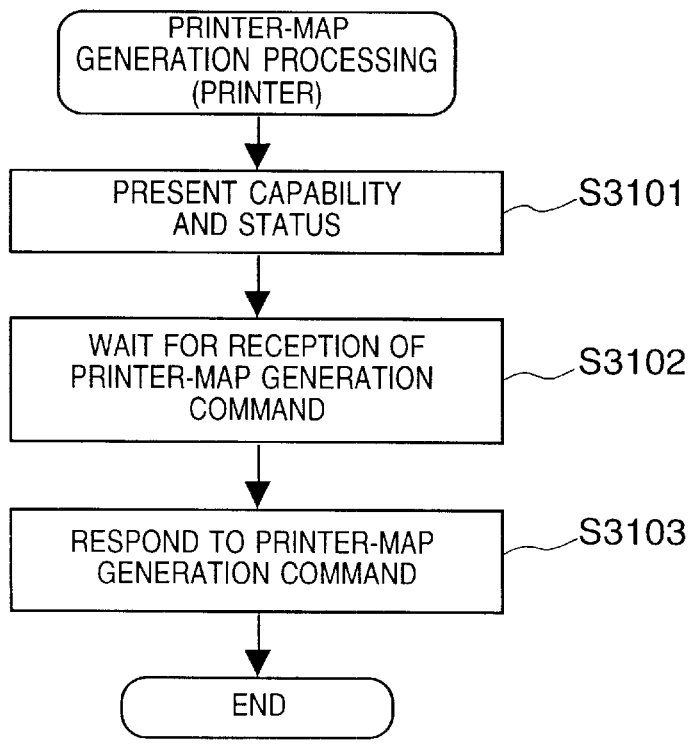
FIG. 56 is a flowchart showing processing in the printer corresponding to the printer map generation processing.

FIG. 56 is a flowchart showing processing in the target device corresponding to the printer-map generation processing by the host device, i.e., the printer. First, the power of the printer is turned on, then the printer presents its status and capability (step S3101). More specifically, the printer sets the protocol register 502 and the capability register 503 in accordance with the current capability and status. Accordingly, the change of the status and the capability within the printer is reflected on the status and capability presented at this step.

Next, the printer becomes into waiting status to wait for reception of the printer-map generation command from the host device (step S3102). Then, when the printer receives the printer-map generation command from the host device, returns the response command to the host device (step S3103.).

Figure 57:
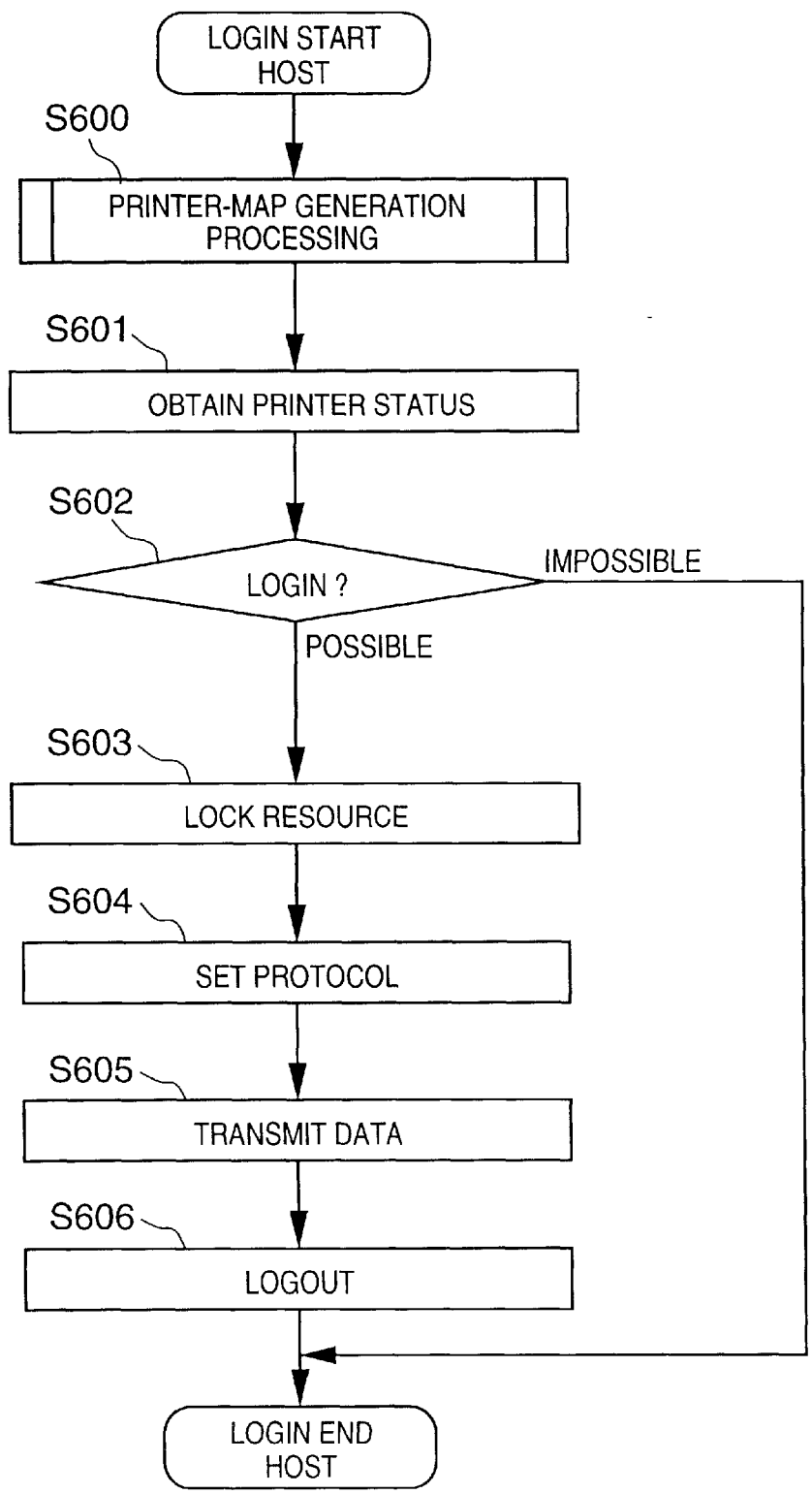
FIG. 57 is a flowchart showing LOGIN processing in a host device.

FIG. 57 is a flowchart showing the LOGIN processing in the host device. To start the LOGIN processing, the printer-map generation processing (step S600) shown in FIG. 55 is performed, then data of a log-in target device, i.e., data in the lock register 501, the protocol register 502 and the capability register 503 of the printer is checked by read transaction. At this time, it is checked from the data in the capability register 503 whether or not a protocol device used by the host device is supported by the target device (step S601). If the protocol of the host device is not supported by the target device, the LOGIN processing is stopped at the next step S602. Further, if the data in the lock register 501 is not "0", it is regarded that another device logs-in the target device and the LOGIN processing is stopped. If the data value of the lock register 501 is "0", it is determined that the LOGIN processing can be performed now (step S602).

If the LOGIN processing can be performed, resource-lock processing is started, to write a value "1" into the lock register 501 to set LOGIN (step S603). In this status, the target device is locked, and it is not controlled from another device. Further, the register change cannot be made.

In the status where the resource of the target device is locked as described above, a protocol is set. The printer as the target device, supporting a plurality of printer protocols, must be informed of a protocol available for the host device before it receives print data. In the present embodiment, the available protocol is notified to the printer by setting a corresponding bit in the protocol register 502 of the printer by write transaction by the host device (step S604).

At this point, as the protocol to be used by the host device for communication is notified to the target device and the target device is in locked status, the host device currently logs-in the target device performs data transmission, i.e., transmission of print data in this case (step S605).

When the data transmission has been completed, the host device clears the lock register 501 and the capability register 503 of the target device, whereby logs-out from the printer (step S606).

Figure 58:
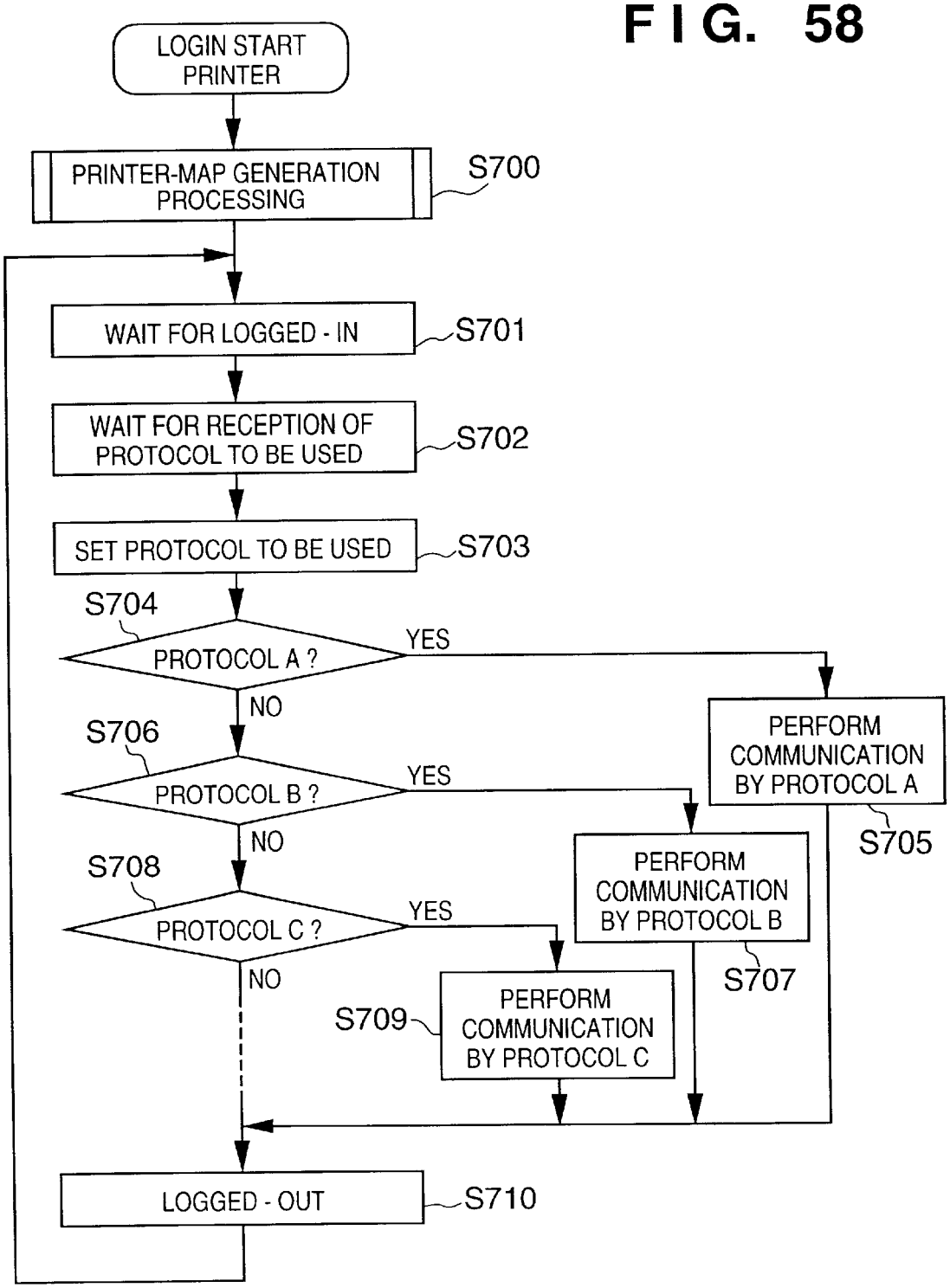
FIG. 58 is a flowchart showing LOGIN processing in the printer (target device)

FIG. 58 is a flowchart showing the LOGIN processing in the printer. The printer first performs the printer-map generation processing (step S700) as shown in FIG. 56, then becomes into waiting status to wait for log-in from the host device. As a print request from the host device is started by reading the lock register 501, the protocol register 502 and the capability register: 503 of the printer, the registers must be always readable from another device. In this example, the host device to perform printing has locked the printer (step S701).

The printer waits for notification of available protocol from the host device (step S702). The printer, in locked status, waits for the notification of protocol to be used, so as to prevent the data in the protocol register 502 from being rewritten by a request from another device during the LOGIN processing.

When the notification of protocol to be used is received (step S703), the printer switches its protocol to the notified protocol (steps S704, S707 and S708), and performs communication in accordance with the protocol used by the host device (steps S705, S707 and S708).

When the communication has been completed, the printer checks that the lock register 501 and the capability register 503 have been cleared (step S710), and returns to the log-in waiting status (step S701).

Third Embodiment

Next, a third embodiment of the present invention will be described. In the second embodiment, as described with reference to FIGS. 55 and 56, when a plurality of printers are connected to a network, a host device generates a printer map on the printers connected to the network, and selects a target printer based on the printer map. In the third embodiment, in a case where a host device, and a printer support a plurality of protocols on a network, further, a plurality of printers each supporting a plurality of protocols are connected to the network, the host device examines protocols available for the respective printers, and determines a protocol supported by the greatest number of printers, as a protocol to be used.

Note that the processing in the third embodiment is the same as that in the second embodiment except the processing shown in FIGS. 55 and 56, therefore, detailed explanation of the processing in the second embodiment will be omitted, and hereinbelow, only the difference from the second embodiment will be described.

Figure 59:
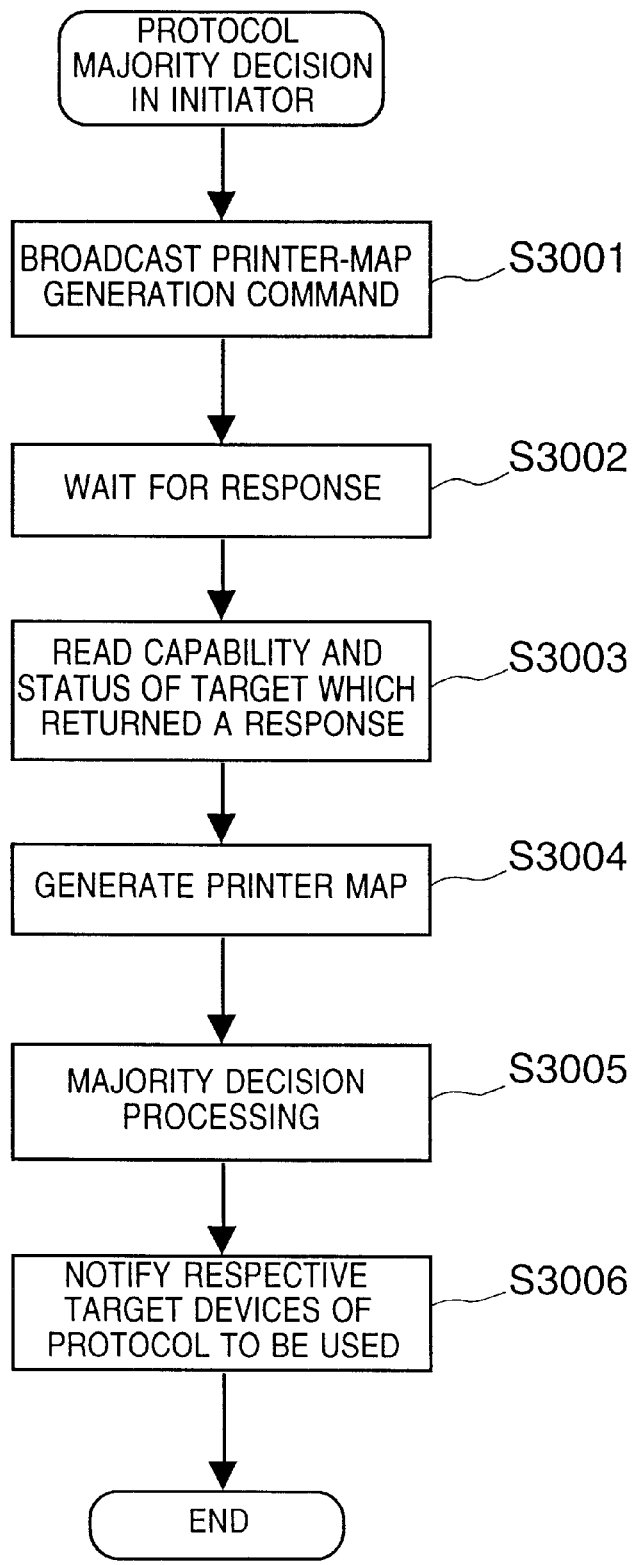
FIG. 59 is a flowchart showing the printer map generation processing by the host device in a third embodiment.
Figure 60:
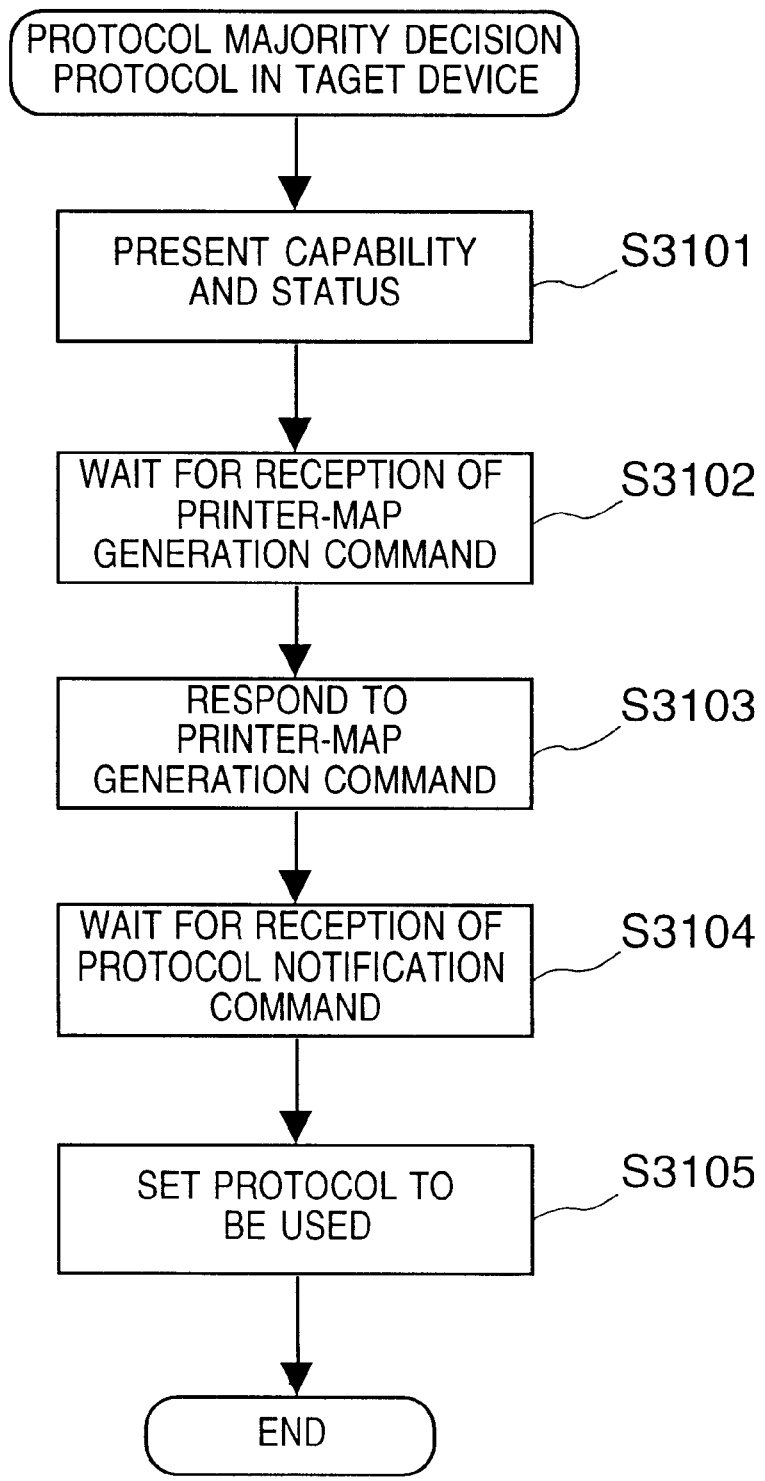
FIG. 60 is a flowchart showing processing in the printer corresponding to the printer map generation processing.

FIG. 59 is a flowchart showing the printer-map generation processing by the host device according to the sixth embodiment. FIG. 60 is a flowchart showing processing corresponding to that in FIG. 59. Note that the steps identical to those in FIGS. 55 and 56 have the same step numbers and detailed explanations of these steps will be omitted.

The processing in FIG. 59 is performed at step S600 in the LOGIN processing in the host device shown in FIG. 57. The processing in FIG. 60 is performed at step S700 in the LOGIN processing in the printer shown in FIG. 58.

As described;above, both initiator (host device) and target device (printer) support a plurality of protocols, further, a plurality of printers each supporting a plurality of protocols are connected to the same network. In this case, the initiator and the target devices must use the same protocol. To determine a protocol to be used, the initiator examines protocols available for the respective printers, and determines a protocol supported by the greatest number of printers as a protocol to be used. This processing is referred to as majority decision processing. In this manner, by performing the majority decision processing in the situation where a number of protocols are available, the types of protocols to be actually used is reduced. As a result, load due to protocol switching by the initiator can be reduced.

Next, the printer-map generation processing by the initiator (host device) and the target device (printer), and the majority decision processing by the initiator will be described with reference to FIGS. 59 and 60.

When the printer-map generation has been completed (step S3004), the host device examines protocols available for the multi-protocol printers currently connected to the network, based on the generated printer map, and selects a protocol supported by the greatest number of printers (step S3005). Then the host device notifies the respective printers of the selected protocol as a protocol notification command (step S3006).

On the other hand, the printer returns a response to the printer-map generation command to the host device (step S3103), and becomes in a waiting status to wait for reception of the notification command indicating the protocol to be used, from the host device (step S3104). When the printer receives the protocol notification command from the host device, it returns a response to the notification command to the host device, and sets the notified protocol to be used (step S3105).

Fourth Embodiment

Figure 61:
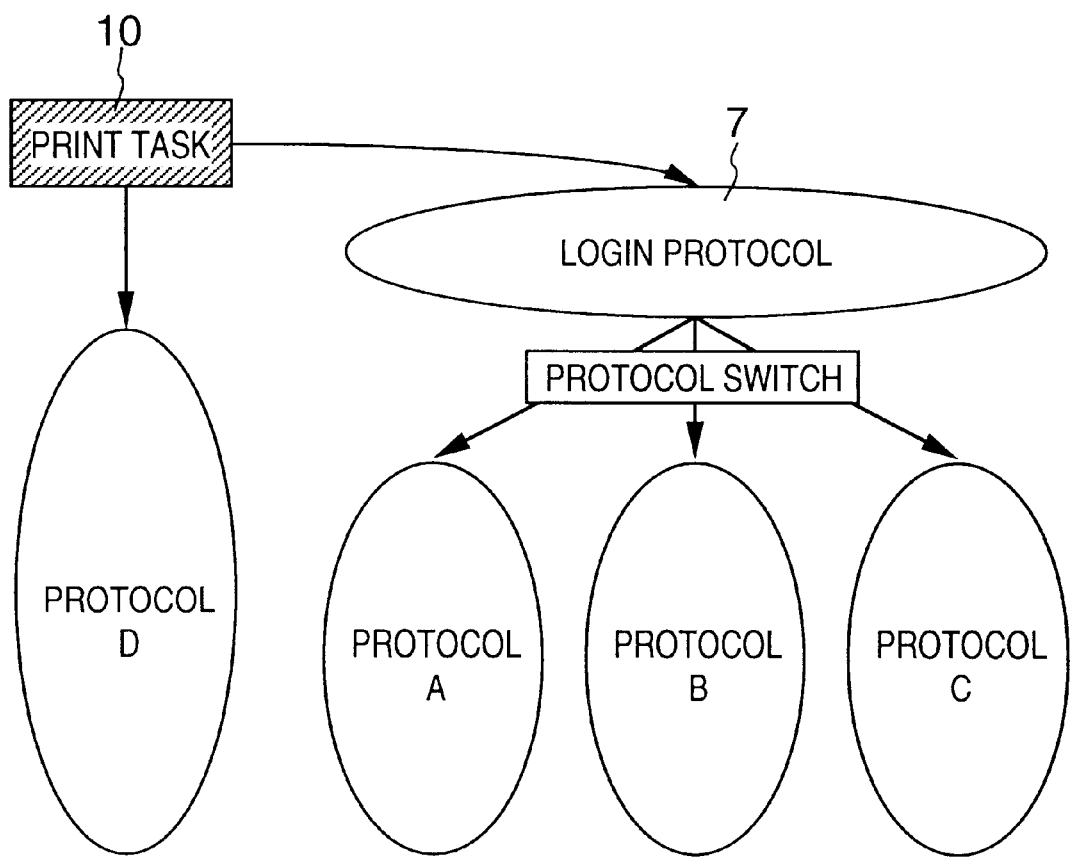
FIG. 61 is an explanatory view showing system operation according to a fourth embodiment.

FIG. 61 shows the operation according to a fourth embodiment of the present invention. Compared with the second embodiment as shown in FIG. 48, the fourth embodiment is applicable to a device having a protocol D in which the LOGIN protocol 7 is not installed. That is, to assure the device only corresponding to the conventional protocol D (e.g., AV/C protocol) of print operation, as well as devices having the LOGIN protocol 7, the printer side has the protocol D.

In this case, if the printer recognizes, by a print request performed at the beginning of connection, that the host device does not correspond to the LOGIN protocol 7, the printer tries communication with the host device by using the protocol D, and if the communication can be established, the printer executes the print task 10 in accordance with the protocol D.

Figure 62:
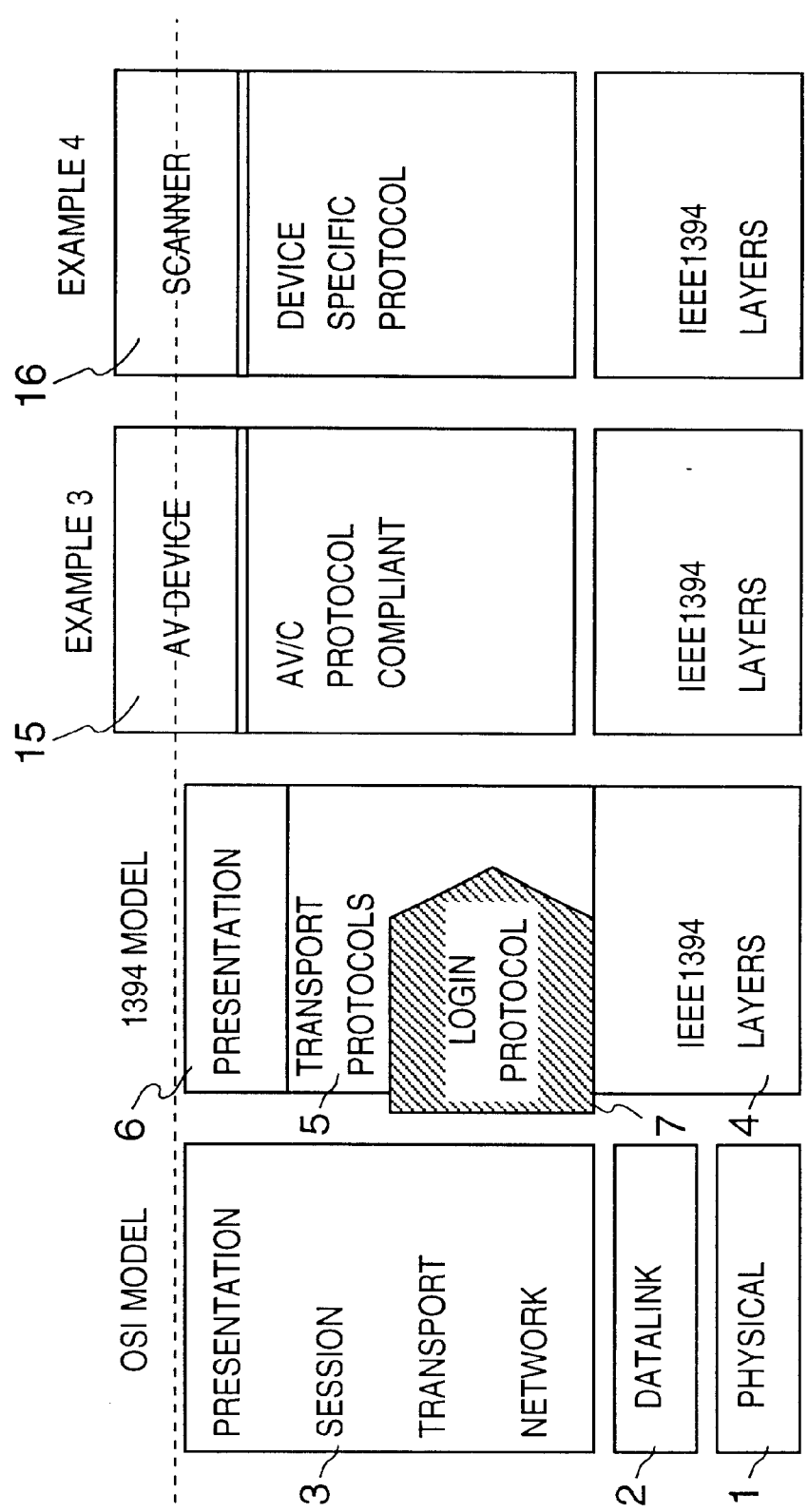
FIG. 62 is a schematic view showing the fourth embodiment in comparison with the OSI model.

FIG. 62 shows the IEEE 1394 serial interface according to the fourth embodiment in comparison with the OSI model. Example 3 uses, as a model, an AV device 15 based on the AV/C protocol. In the AV device 15, the LOGIN protocol 7 is not installed. Example 4 uses, as a model, a scanner 16, in which the LOGIN protocol 7 is not installed, but a non-standard protocol for scanner is installed.

That is, regarding a device in which the LOGIN protocol 7 is not installed, if the printer can perform communication using the protocol of the device, the printer can perform. print task from the device. This increases the types of devices that can use the printer.

Fifth Embodiment

As described with reference to FIGS. 56 and 57, the above-described second embodiment provides a technique, in a network where various devices including a plurality of printers are connected to a 1394 serial bus, to enable a host device (initiator) to generate a printer map of the respective printers as target devices, and select a target printer.

In the present embodiment, a printer as an output device on the network is regarded as a host device, and image input devices such as a digital video camera, a digital still camera, a scanner, a monitor, a computer and the like, are regarded as target devices. Accordingly, provided is a technique enabling the printer to generate a map of the image input devices corresponding to the above-described printer map to log-in an image input device and obtain image information, and select a target image input device based on the generated map.

Note that in the present embodiment, processings other than the printer-map generation processing in FIG. 56 and the LOGIN processing in FIG. 57 are identical to those in the second embodiment, therefore, detailed description of the corresponding processings will be omitted, and only the difference from the second embodiment will be described.

Generally, various devices are connected to the network. In this situation, for communication between a printer (initiator) and an image input device as a target device, the printer must recognize a device corresponding to the target image input device. Further, to obtain appropriate print output, it is convenient to preliminarily recognize the physical position (location), capability and reserve power of an image input device corresponding to the desired print output.

Then, the printer as the initiator examines image input devices on the same network in advance. More specifically, the printer obtains information on the physical positions, the capabilities and reserve powers (topology/capability information) of the image input devices, by examining the image input devices on the network in advance, and generates a map corresponding to the printer map as shown in FIG. 52. Then the printer selects a target image input device based on the map.

Figure 63:
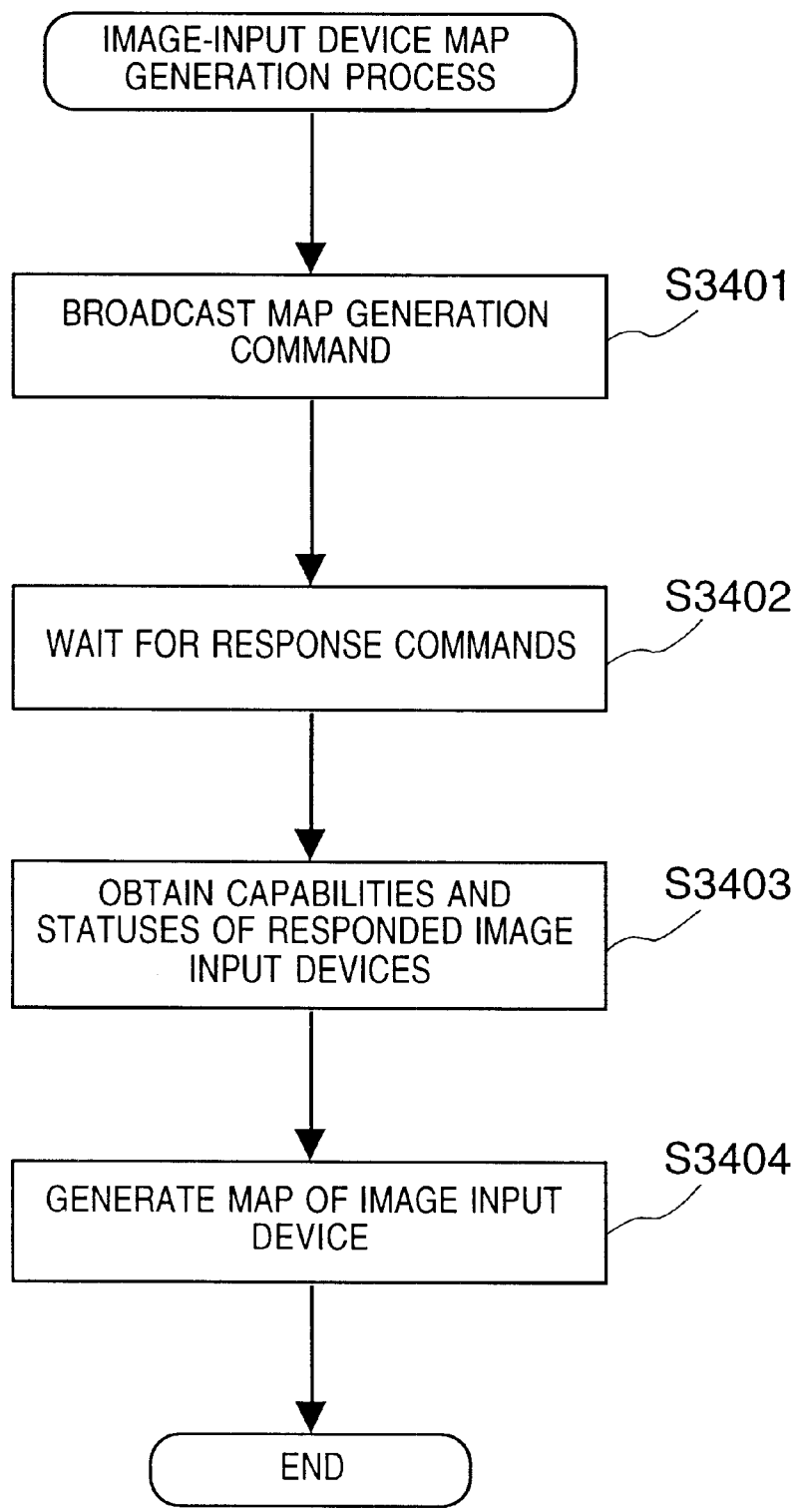
FIG. 63 is a flowchart showing map generation processing for an image input device, performed by the printer (host device) in a fifth embodiment.

Upon generation of image input device map, as shown in FIG. 63, the printer broadcasts a command to generate a map (generation command) (step S3401). The generation command is transmitted to all the devices on the network. Then the printer waits for responses (response commands) from devices including the image input devices on the network (step S3402).

When the printer receives the response commands from the devices including the image input devices, it reads the contents of the protocol register 502 and the capability register 503 of the image input devices which returned the response commands (step S3403). By the information, the printer recognizes the capabilities, statuses and the like of the image input devices.

Then, the printer generates a map of the image input devices currently existing on the network (step S3404), based on the information obtained at step S3403. Then the process ends.

Figure 64:
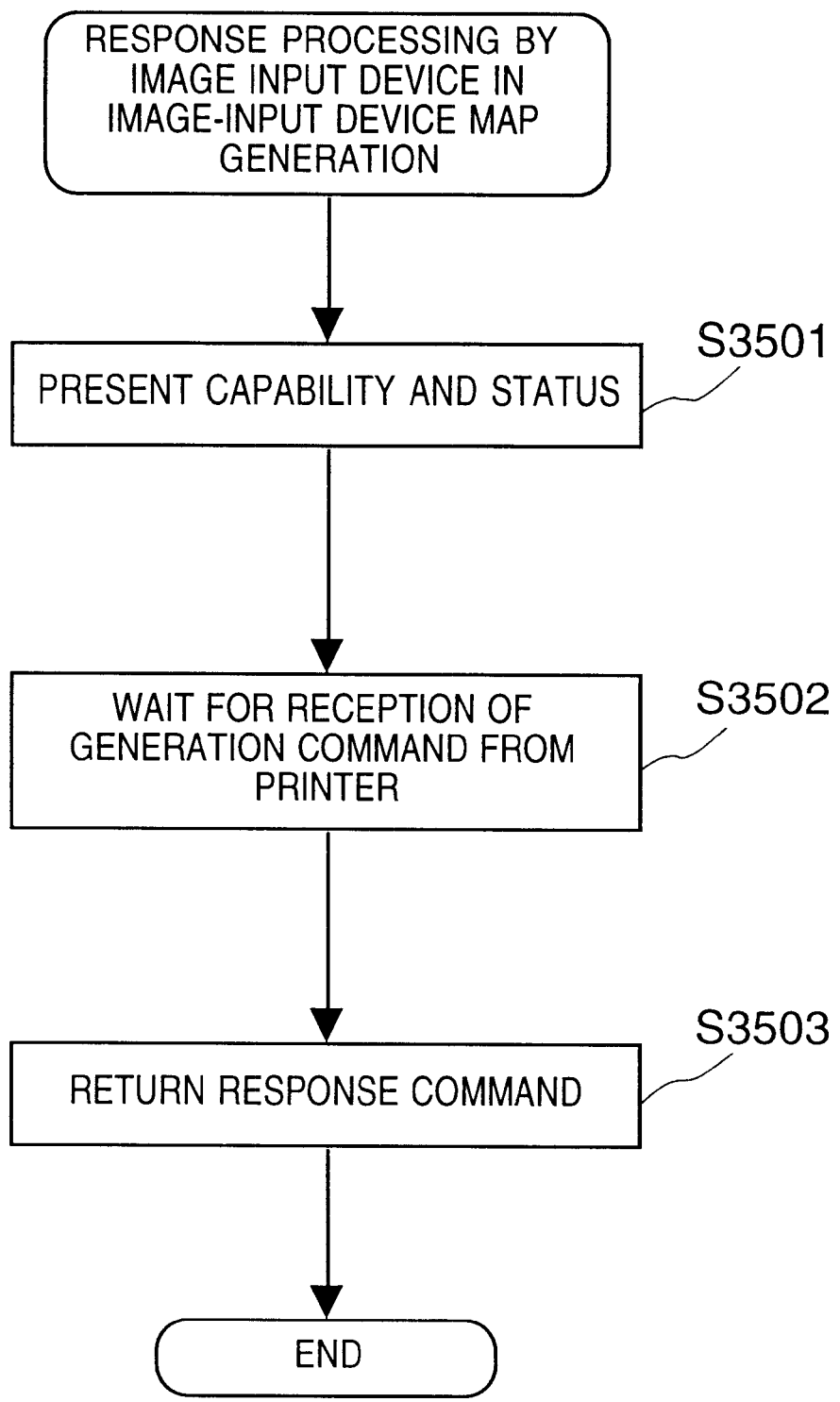
FIG. 64 is a flowchart showing processing by the image input device corresponding to the map generation processing.

FIG. 64 is a flowchart showing processing in the target device that has received the generation command from the above-described printer, i.e., the image input device.

First, immediately after the power of the image input device is turned on, the image input device presents its status and capability. More specifically, the image input device sets the protocol register 502 and the capability register 503 in accordance with the current capability and status. Accordingly, change in the status and the capability within the device is reflected on the status and capability presented at this step S3501.

Next, the image input device waits for reception of the map generation command from the printer (step S3502). When the image input device receives the map generation command from the printer, it returns the response command to the printer (step S3503). Then the process ends.

As described above, when the printer has generated the map of image input devices, the LOGIN processing as shown in FIGS. 57 and 58 is performed. As a result, the printer performs print-outputs image information obtained from an image input device selected from the image input devices on the network.

Note that in the above embodiments, the network is constructed by using the IEEE 1394 serial bus, however, the present invention is not limited to the 1394 serial bus. For example, the present invention is applicable to a network constructed by using an arbitrary serial interface such as a Universal Serial Bus (USB).

Further, as a host device, a computer, a digital still camera, a digital video camera, a scanner, a DVD, a Set-top-Box, a digital television unit, a conference camera, a digital video recorder, a combination unit including these devices and the like can be employed. On the other hand, as a target device, a monitor, a computer, a storage device, a Set-top-Box, a printer, a combination unit including these devices and the like can be employed.

Further, in the printer map generation performed at step S600 in FIG. 57, step S700 in FIG. 58 and step S3004 in FIG. 59, and the map generation performed at step S3404 in FIG. 63, the topology connection status is examined, and a map as shown in FIG. 52 is generated. By obtaining such topology connection status, a protocol to be actually used is determined, not simply by majority decision, but in consideration of the topology connection status.

Further, in the above embodiments, the respective devices on the network are devices to output or input image data, however, the present invention is not limited to this arrangement. For example, it may be arranged such that an arbitrary device among devices on the network is a device not related to image-data output/input, and it has a function to simply detect the status on the network and examine relation between other devices and the network.

As described above, according to the second to fifth embodiment, information processing apparatus and method with high versatility, which avoid limitation on a communication protocol by a target device upon communication between a host device and the target device, can be provided. Especially, the versatility can be extremely increased since protocols for plural types of target devices (printers, image input devices and the like) can be handled.

Further, optimum output (printer output and the like) can be easily obtained since a target device corresponding to or more suitable for a purpose can be selected by examining target devices connected to the same network. Especially, a printer appropriate for print output (a first type of target device) can be selected, and further, an image input device appropriate to the printer (a second type of target device based on the first type of device as a host device) can be selected. Accordingly, extremely excellent print output can be obtained.

Further, even if many protocols are available, the number of types of actually-used protocols can be reduced by selecting a protocol supported by the most target devices from those protocols. Accordingly, the load on the host device due to protocol switching can be reduced.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM. can be used for providing the program code.

Furthermore, besides aforesaid functions according to the above embodiments are realized by executing the program code read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   acquisition means for acquiring device information from a memory of a device connected to a serial bus, wherein the device information is related to the device and is read only through the serial bus;
   setting means for setting search conditions for searching for devices connected to the serial bus; and
   control means for generating a list of devices meeting the set search conditions, based on the device information acquired by said acquisition means,
   wherein the device information includes at least capability information indicative of a capability of the device,
   wherein the capability information includes at least information on a range of handled capability information, transfer capability information in function-based communication, and function-based application capability information, and
   wherein the transfer capability information in function-based communication is information indicative of communication protocols of the device, and information indicating whether or not a plurality of communication protocols can be simultaneously supported or information indicative of use priority of the protocols.

2. An information processing apparatus comprising:
   acquisition means for acquiring device information from a memory of a device connected to a serial bus, wherein the device information is related to the device and is read only through the serial bus;
   setting means for setting search conditions for searching for devices connected to said serial bus and priorities of the search conditions; and
   control means for generating a list of devices meeting the set search conditions, in descending order of the set priorities, based on the device information acquired by said acquisition means.

3. The apparatus according to claim 2, wherein, in the list, names respectively unique to the devices are used.

4. An information processing apparatus comprising:
   acquisition means for acquiring device information from a memory of a device connected to a serial bus, wherein the device information is related to the device and is read only through the serial bus;
   setting means for setting search conditions for searching for devices connected to the serial bus, priorities of the search conditions, and a search range; and
   control means for acquiring the device information within the set search range by using said acquisition means, and generating a list of devices meeting the set search conditions, in descending order of the set priorities.

5. The apparatus according to claim 4, wherein, in the list, names respectively unique to the devices are used.

6. The apparatus according to claim 4, wherein, in the list, model-based serial numbers of the devices are used.

7. The apparatus according to claim 4, wherein the device information includes at least information indicative of location of the device and information indicative of a hierarchical position of the device.

8. The apparatus according to claim 4, further comprising display means for displaying said list, wherein, if a device is selected from the list displayed by said display means, said control means causes said display means to display detailed information of the selected device.

9. The apparatus according to claim 6, wherein, in the list, among the devices with the serial numbers, a serial number of a device connected to the serial bus after reset of the serial bus is not changed.

10. The apparatus according to claim 6, wherein, in the list, the serial numbers of the devices are not changed, even if a device disconnected from the serial bus after reset of the serial bus exists, in a predetermined number of bus reset operations.

11. The apparatus according to claim 6, wherein, in the list, the serial numbers of the devices are not changed, even if a device disconnected from the serial bus after reset of the serial bus exists, for a predetermined period.

12. The apparatus according to claim 8, wherein information indicative of a location of the device included in the device information is displayed.

13. The apparatus according to claim 8, wherein information indicative of a capability of the device included in the device information is displayed.

14. The apparatus according to claim 8, wherein information indicative of a function of the device included in the device information is displayed.

15. The apparatus according to claim 8, wherein transport information of the device included in the device information is displayed.

16. The apparatus according to claim 8, wherein information indicative of a status of use of the device included in the device information is displayed.

17. The apparatus according to claim 8, wherein information indicative of a connection status of the device included in the device information is displayed.

18. An information processing method, comprising the steps of:
    acquiring device information from a memory of a device connected to a serial bus, wherein the device information is related to the device and is read only through the serial bus;
    setting search conditions for searching for devices connected to the serial bus and priorities of the search conditions; and
    generating a list of devices meeting the set search conditions, in descending order of the set priorities, based on the device information at acquired in said acquiring step.

19. An information processing method, comprising the steps of:
    acquiring device information from a memory of a device connected to a serial bus, wherein the device information is related to the device and is read only through the serial bus;
    setting search conditions for searching for devices connected to the serial bus, priorities of the search conditions, and a search range; and
    acquiring the device information within the set search range set, and generating a list of devices meeting the set search conditions, in descending order of the set priorities.

20. A computer program product, comprising a computer-readable medium with computer program code for executing an information processing method, said program product comprising:
    acquiring process procedure code for acquiring device information from a memory of a device connected to a serial bus, wherein the device information is related to the device and is read only through the serial bus;
    setting process procedure code for setting search conditions for searching for devices connected to the serial bus and priorities of the search conditions; and
    generating process procedure code for generating a list of devices meeting the set search conditions, in descending order of the set priorities, based on the device information acquired by said acquiring process.

21. A computer program product, comprising a computer-readable medium with computer program code for executing an information processing method, said program product comprising:
    acquiring process procedure code for acquiring device information from a memory of a device connected to a serial bus, wherein the device information is related to the device and is read only through the serial bus;
    setting process procedure code for setting search conditions for searching for devices connected to the serial bus, priorities of the search conditions, and a search range; and
    generating process procedure code for acquiring the device information within the set search range by using acquisition means, and generating a list of devices meeting the set search conditions, in descending order of the set priorities.

22. An information processing method that switches a protocol for a plurality of types of devices, said method comprising the steps of:
    executing an initial protocol regardless of a switched protocol; and
    executing protocols unique to the plurality of types of devices, subsequent to the initial protocol,
    wherein the initial protocol includes a first process for examining a topology map of a first type of devices on a serial bus, and a second process for examining a topology map of a second type of devices to output data to the first type of devices on the serial bus,
    wherein the first process includes a process for obtaining information indicative of at least a status and a capability of a printer device, and
    wherein the second process includes a process for obtaining information indicative of at least a status and a capability of an image input device.

23. The method according to claim 22, wherein the printer device is an ink-jet printer.

24. The method according to claim 22, wherein, when a protocol unique to the printer device has been executed, image data of an image to be printed is transmitted from the image input device to the printer device.

25. The method according to claim 22, wherein the image data is obtained by photoelectric conversion by image-sensing means of the image input device.

26. A printer device that switches a protocol in accordance with a host device, said printer device comprising:
    protocol execution means for executing an initial protocol regardless of a switched protocol, and a protocol unique to a printer device subsequent to the initial protocol; and
    reception means for receiving image data for printing after execution of the protocol unique to the printer device,
    wherein the initial protocol includes a first process for examining a topology map of printer devices on a serial bus, and a second process for examining a topology map of image input devices to output data to the printer devices on the serial bus,
    wherein the first process includes a process for obtaining information indicative of at least a status and a capability of the printer devices, and
    wherein the second process includes a process for obtaining information indicative of at least a status and a capability of the image input devices.

* * * * *

UNITED STATES PATENT AND TRADEMARK OFFICE
CERTIFICATE OF CORRECTION

PATENT NO.    : 6,477,589 B1
DATED         : November 5, 2002
INVENTOR(S)   : Naohisa Suzuki et al.

It is certified that error appears in the above-identified patent and that said Letters Patent is hereby corrected as shown below:

<u>Drawings,</u>
Sheet 27, Figure 27, "RETRUN" should read -- RETURN --.

<u>Column 1,</u>
Line 13, "types," should read -- types --.
Line 39, "IEEE1394" should read -- IEEE 1394 --.

<u>Column 2,</u>
Line 42, "recognizes" should read -- recognize --.

<u>Column 5,</u>
Line 15, "processing,;" should read -- processing; --.

<u>Column 6,</u>
Line 41, "G and;" should read -- G, and --.

<u>Column 7,</u>
Line 38, "81d" should read -- 810 --.

<u>Column 8,</u>
Line 47, "is" should be deleted.

<u>Column 9,</u>
Line 6, "bust" should read -- bus --.
Line 7, "conrfimation:" should read -- confirmation --; and "confirm." should read -- confirm --.
Line 8, "request:" should read -- request --.
Line 9, "(3)SB_CONTROL.indiication:" should read -- (3)SB_CONTROL.indication: --.

<u>Column 10,</u>
Line 29, "show" should read -- shows --.
Line 31, "system" should read -- systems --.
Line 32, "type," should read -- types, --.
Line 63, "1394," should read -- 1394 --.

<u>Column 11,</u>
Line 10, "in;network" should read -- in network --.

UNITED STATES PATENT AND TRADEMARK OFFICE
CERTIFICATE OF CORRECTION

PATENT NO. : 6,477,589 B1
DATED : November 5, 2002
INVENTOR(S) : Naohisa Suzuki et al.

It is certified that error appears in the above-identified patent and that said Letters Patent is hereby corrected as shown below:

Column 12,
Line 7, "node" should read -- nodes --.
Line 60, ""child"" should read -- "child" --.

Column 13,
Line 32, "anode" should read -- a node --.
Line 52, "width" should read -- with an --.
Line 65, "own," should read -- own --.

Column 14,
Line 18, "broadcasts" should read -- broadcasted --.
Line 50, "these" should read -- this --.

Column 15,
Line 18, "transmits" should read -- transmit --; and "timing" should read -- time --.
Line 30, "provide" should read -- provided --.
Line 65, "of" should read -- of a --.

Column 16,
Line 7, "uniformly," should read -- uniformly --.
Line 49, "an" should read -- a --.

Column 17,
Line 7, "a, destination_offset" should read -- a destination_offset --.

Column 18,
Line 25, "software," should read -- software --.
Line 35, "lithe" should read -- the --.
Line 39, "like." should read -- like --.
Line 54, "made" should read -- made, --.
Line 55, "but" should read -- but is --.

Column 19,
Line 17, ""and"" should read -- "end" --.

Figure 30:
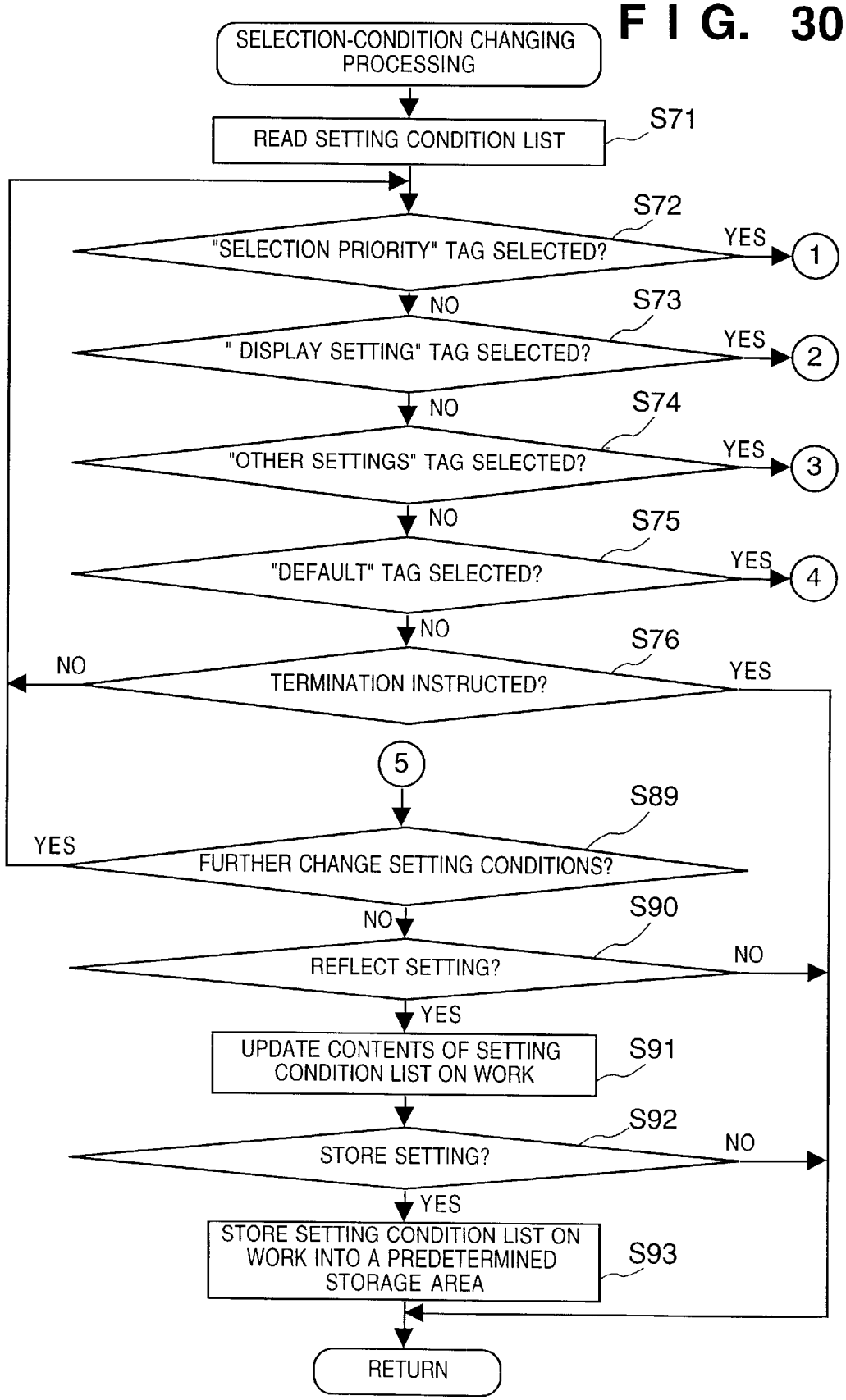
FIGS. 30 and 31 are flowcharts showing setting-condition changing processing.

Column 21,
Line 26, ""printer-5"" should read -- "Printer-5" --.
Line 43, "FIGS. 31and 31" should read -- FIGS. 30 and 31 --.
Line 50, "priority." should read -- priority --; and "of." should read -- of --.
Line 64, "use," should read -- use", --.
Line 66, "all," should read -- all --.

UNITED STATES PATENT AND TRADEMARK OFFICE
CERTIFICATE OF CORRECTION

PATENT NO. : 6,477,589 B1
DATED : November 5, 2002
INVENTOR(S) : Naohisa Suzuki et al.

It is certified that error appears in the above-identified patent and that said Letters Patent is hereby corrected as shown below:

Column 22,
Line 1, ""display," should read -- "display --.
Line 12, "Vendor" should read -- "Vendor --.

Column 23,
Line 9, "A" should read -- a --.
Line 40, "If" should read -- if --.
Line 67, "three printers" should read -- three printers: --.

Column 24,
Line 24, "(unit" should read -- (Unit --.
Line 59, ""000"." should read -- "001". --.

Column 29,
Line 20, "register: 503" should read -- register 503 --.
Line 46, "device," should read -- device --.

Column 30,
Line 3, "described;above," should read -- described above, --.
Line 65, "perform." should read -- perform --.

Column 33,
Line 21, "ROM." should read -- ROM --.

Column 35,
Line 16, "at" should be deleted.

Signed and Sealed this

Twentieth Day of April, 2004

JON W. DUDAS
*Acting Director of the United States Patent and Trademark Office*